US012810485B2

(12) United States Patent
Alshina et al.

(10) Patent No.: US 12,810,485 B2
(45) Date of Patent: Nov. 24, 2026

(54) METHOD AND APPARATUS FOR ENCODING OR DECODING A PICTURE USING A NEURAL NETWORK COMPRISING SUB-NETWORKS

(71) Applicant: HUAWEI TECHNOLOGIES CO., LTD., Shenzhen (CN)

(72) Inventors: Elena Alexandrovna Alshina, Munich (DE); Han Gao, Shenzhen (CN); Semih Esenlik, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 670 days.

(21) Appl. No.: 18/338,105

(22) Filed: Jun. 20, 2023

(65) Prior Publication Data

US 2024/0013446 A1 Jan. 11, 2024

Related U.S. Application Data

(63) Continuation of application No. PCT/EP2020/087334, filed on Dec. 18, 2020.

(51) Int. Cl.

*G06K 9/00* (2022.01)
*G06T 3/4046* (2024.01)
*G06T 9/00* (2006.01)

(52) U.S. Cl.

CPC ............ *G06T 9/002* (2013.01); *G06T 3/4046* (2013.01)

(58) Field of Classification Search

CPC .............................. G06T 9/002; G06T 3/4046
See application file for complete search history.

(56) References Cited

U.S. PATENT DOCUMENTS 5,892,847 A 4/1999 Johnson
10,432,953 B2 * 10/2019 Wierstra ................ G06T 9/002
2019/0297326 A1 * 9/2019 Reda ...................... G06N 20/10

FOREIGN PATENT DOCUMENTS

CN 109672885 A 4/2019
WO 2022128137 A1 6/2022
(Continued)

OTHER PUBLICATIONS

Guo, Zongyu, et al. "3-D context entropy model for improved practical image compression." Proceedings of the IEEE/CVF Conference on Computer Vision and Pattern Recognition Workshops. 2020. (Year: 2020).*

(Continued)

*Primary Examiner* — Avinash Yentrapati
(74) *Attorney, Agent, or Firm* — Leydig, Voit & Mayer, Ltd.

(57) ABSTRACT

A method for encoding a picture and decoding a bitstream that represents a picture using a neural network (NN) that comprises a plurality of sub-networks is provided. The method includes applying, before processing an input with the at least one sub-network comprising at least two downsampling layers, a rescaling to the input, wherein the rescaling comprises changing the size $S_1$ in the at least one dimension to be $\overline{S_1}$ so that $\overline{S_1}$ is an integer multiple of a combined downsampling ratio $R_k$ of the at least one sub-network, after the rescaling, processing the input by the at least one sub-network comprising at least two downsampling layers and providing an output with the size $S_2$, wherein $S_2$ is smaller than $S_1$, and providing, after processing the picture using the NN, a bitstream as output.

15 Claims, 28 Drawing Sheets

10

(56) References Cited

FOREIGN PATENT DOCUMENTS

| | | | |
|---|---|---|---|
| WO | 2022128138 | A1 | 6/2022 |
| WO | 2022128139 | A1 | 6/2022 |

OTHER PUBLICATIONS

Guo et al., "3-D Context Entropy Model for Improved Practical Image Compression," 2020 IEEE/CVF Conference on Computer Vision and Pattern Recognition Workshops (CVPRW), Total 4 pages (Jun. 2020).

Hashemi., "Enlarging smaller images before inputting into convolutional neural network: zero-padding vs. interpolation," Journal of Big Data, Total 13 pages (Nov. 2019).

Theis et al., "Lossy Image Compression with Compressive Autoencoders,".arXiv.org, arXiv:1703.00395v1 [stat. ML],, Cornell University Library, 201 Oline Library Cornell University Ithaca, NY 14853, Total 19 pages (Mar. 2017).

Guo et al., "3-D Context Entropy Model for Improved Practical Image Compression," IEEE/CVF Conference on Computer Vision and Pattern Recognition Workshops (CVPRW), Total 4 pages (Apr. 2020).

Sze et al., "High Efficiency Video Coding (HEVC): Algorithms and Architectures," Integrated Circuits and Systems, Springer, Total 384 pages (Sep. 2014).

Hashemi, "Enlarging smaller images before inputting into convolutional neural network: zero-padding vs. interpolation," Journal of Big Data, vol. 6, Springer Open, XP055725533, Total 14 pages (Nov. 14, 2019).

Hassaballah et al., "Recent Advances in Computer Vision," Theories and Applications, Springer, Studies in Computational Intelligence, Total 14 pages (Nov. 2, 2018).

Theis et al., "Lossy Image Compression with Compressive Autoencoders," Published as a conference paper at ICLR 2017, arxiv.org, Cornell University Library, 201 Online Library Cornell University Ithaca, NY 14853, XP080753545, Total 19 pages (Mar. 1, 2017).

Balle et al., "Variational Image Compression With a Scale Hyperprior," arXiv:1802.01436v2 [eess.IV], Total 23 pages (May 1, 2018).

Cui et al.,, "An Efficient Deep Quantized Compressed Sensing Coding Framework of Natural Images," Session: FF-6, MM'18, Seoul, Republic of Korea, Total 9 pages (Oct. 22-26, 2018).

* cited by examiner

10

METHOD AND APPARATUS FOR ENCODING OR DECODING A PICTURE USING A NEURAL NETWORK COMPRISING SUB-NETWORKS

CROSS-REFERENCE TO RELATED APPLICATIONS

This application is a continuation of International Application No. PCT/EP2020/087334, filed on Dec. 18, 2020, the disclosure of which is hereby incorporated by reference in its entirety.

The present disclosure relates to a method for encoding a picture using a neural network comprising at least two sub-networks and a method for decoding a picture using a neural network comprising at least two sub-networks. Furthermore, the disclosure presented here refers to an encoder implementing a neural network for encoding a picture and a decoder implementing a neural network for decoding a picture as well as a computer-readable storage medium with computer-executable instructions.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Neural networks and deep-learning techniques making use of neural networks have now been used for some time, also in the technical field of encoding and decoding of videos, images and the like.

In such cases, the bitstream usually represents or is data that can reasonably be represented by a two-dimensional matrix of values. For example, this holds for bitstreams that represent or are images, video sequences or the like data. Apart from 2D data, the neural network and the framework referred to in the present disclosure may be applied to further source signals such as audio signals, which are typically represented as a ID signal, or other signals.

For example, neural networks comprising a plurality of downsampling layers may apply a downsampling (convolution, in the case of the downsampling layer being a convolution layer) to an input to be encoded, like a picture. By applying this downsampling to the input picture, its size is reduced and this can be repeated until a final size is obtained. Such neural networks can be used for both, image recognition with deep-learning neural networks and encoding of pictures. Correspondingly, such networks can be used to decode an encoded picture. Other source signals such as signals with less or more than two dimensions may be also processed by similar networks.

It may be desirable to provide a neural network framework which may be efficiently applied to various different signals possibly differing in size.

SUMMARY

Embodiments of the disclosure presented here may allow for reducing a size of a bitstream obtained from an encoder that encodes a picture input where this bitstream carries information of the encoded picture while, at the same time, ensuring that the original picture can be reconstructed with as few losses of information as possible.

Some embodiments presented herein provide a method of encoding a picture using a neural network as well as a method for decoding a bitstream using a neural network as well as an encoder for encoding a bitstream as well as a decoder for decoding a bitstream and a computer-readable storage medium comprising computer-executable instructions.

The present disclosure provides a method for encoding a picture using a neural network, NN, wherein the NN comprises at least two sub-networks, wherein at least one sub-network of the at least two sub-networks comprises at least two downsampling layers, wherein the at least one sub-network applies a downsampling to an input representing a matrix having a size $S_1$ in at least one dimension, the method comprising:

- applying, before processing the input with the at least one sub-network comprising at least two downsampling layers, a rescaling to the input, wherein the rescaling comprises changing the size $S_1$ in the at least one dimension to be $\overline{S_1}$ so that $\overline{S_1}$ is an integer multiple of a combined downsampling ratio $R_1$ of the at least one sub-network;
- after the rescaling, processing the input by the at least one sub-network comprising at least two downsampling layers and providing an output with the size $S_2$, wherein $S_2$ is smaller than $S_1$;
- providing, after processing the picture using the NN (e.g. after processing with each sub-network of the NN), a bitstream as output (e.g. as output of the NN).

In the context of the present disclosure, the picture may be understood as a still picture or a moving picture in the sense of a video or a video sequence or portions thereof. Specifically, a picture may refer to a part of a total or bigger picture or a total or bigger or longer video sequence. In this regard, the invention is not limited. Additionally, a picture may also be referred to as an image or a frame in the context of the present disclosure. A picture may in any case be considered to be representable by a two- or more dimensional array of values. These values are typically referred to as "samples". This two- or more dimensional array may specifically have the form of a matrix that can then be processed by a neural network including downsampling layers of the neural network in the manner as specified above and as will be specified further below.

In the present disclosure, a sub-network or specifically a sub-network of an encoder may be considered a part of the neural network where this part comprises a subset of the layers of the neural network. In this regard, the sub-networks of the neural network are not restricted to only comprising downsampling layers or to all comprise the same number of downsampling layers. Specifically, one sub-network may comprise two downsampling layers whereas another sub-network may only comprise one downsampling layer and another layer that does not apply a downsampling to the input but transforms it in another way. A further sub-network may comprise even more than two downsampling layers, for example 3, 5 or 10 downsampling layers.

In the context of the present disclosure, the combined downsampling ratio of a sub-network may be an integer value that corresponds to or represents a product of the downsampling ratios of all downsampling layers in a sub-network. It may be obtained by calculating the product of all downsampling ratios of a given sub-network or it may be a preset value that is available (for example to an encoder) in addition to the downsampling ratios of the downsampling layers of a sub-network. The combined downsampling ratio of a sub-network may be a predetermined number that represents the ratio between the sizes of the input of the sub-network and the output of the sub-network.

The bitstream according to the present disclosure may be or may comprise the encoded picture. Additionally, the bitstream output by the neural network may comprise additional information, also referred to as side information herein below. This additional information may refer to information that is necessary for decoding the bitstream to reconstruct the image that is encoded by the bitstream. For example, this information may comprise the combined downsampling ratio as already mentioned above or the downsampling ratios of the respective downsampling layers of the sub-networks.

The bitstream may generally be considered to be reduced in size or to comprise a representation of the original picture that is reduced in size compared to the original picture in at least one dimension. This may, for example, mean that a two-dimensional representation (for example in the form of a matrix) of the encoded picture is only half of the size of the original picture in, for example, the height or the width. The bitstream may be considered as the representation of the input image in a binary format (comprising "0"s and "1"s). The goal of the video compression is to reduce the size of the bitstream as much as possible while keeping the quality of the reconstructed picture that can be obtained based on or from the bitstream at an acceptable level.

In the context presented herein, the term "size" may refer to, for example, a number of samples in one or more dimensions (the width or the height of the picture) and/or to the number of pixels that represent the picture. Additionally, the size may represent a resolution of the picture. The resolution is usually specified in terms of number of samples per picture or picture area where this picture area might be one-dimensional or two-dimensional.

In general terms, the output of the neural network (or in general an output of one or more of the layers of the network) may have a third dimension. This third dimension may have a bigger size than the corresponding dimension of the input picture. The third dimension can represent the number of feature maps that may also be referred to as channels. In a specific example, the size of the third dimension might be three at the input (the original picture input of the neural network, e.g. with 3 color components) and 192 at the output (i.e. the feature maps before binarization (encoding into the bitstream)). The size of feature maps is typically increased by the encoder in order to classify the input efficiently.

The downsampling applied by a downsampling layer of the neural network can be achieved in any known or technically reasonable way. Specifically, this may comprise a downsampling by applying a convolution to an input of the respective downsampling layer of the neural network. The downsampling can be performed in one dimension only or it can also be performed on two dimensions of the input picture or input in general when represented in the form of a matrix. This pertains to both, the downsampling applied by a sub-network in total and the downsampling applied by each downsampling layer of a respective sub-network. For example, while a sub-network might apply a downsampling to an input in two dimensions, a first downsampling layer of this sub-network might only apply a downsampling in one dimension whereas another downsampling layer of the sub-network applies a downsampling to the input in another dimension or in two dimensions.

In general, the disclosure presented herein is not limited to particular ways of downsampling. One or more of the layers of the neural network discussed below may apply downsampling in a way that is different from convolutions for example by deleting (removing) every second, third or the like row and/or column of the input picture or input feature map (when seen in the representation of the two-dimensional matrix).

Embodiments presented herein are to be understood as referring to a rescaling that is applied immediately before the processing of an input by a sub-network comprising downsampling layers but not within the sub-network. This means, as regards the rescaling, the sub-network is, although comprising a plurality of layers and potentially a large number of downsampling layers, considered as one entity that applies a downsampling with a combined downsampling ratio to an input and the rescaling of the input is applied so that a size S of the rescaled input matches an integer multiple of the combined downsampling ratio of the sub-network by which this input is to be processed.

As will be explained further below, the rescaling that is applied to an input of a sub-network is not necessarily applied before each sub-network. Specifically, some embodiments may comprise that a determination is made, before applying any rescaling to an input of a sub-network, whether this input or the size of the input already matches an integer multiple of the combined downsampling ratio of the respective sub-network. If this is the case, the rescaling may not be applied to the input or an "identical rescaling" may be applied whereby the size S of the input is not changed. The term "rescaling" herein is used in the same meaning as "resizing".

By applying the rescaling to the input on a per-sub-network basis, it can be accounted for each sub-network potentially providing an "intermediate output" or intermediate bitstream that is output by a sub-network. Considering, for example, a case where the output provided when encoding a picture does not only comprise a single bitstream but is made up of a plurality of bitstreams that are obtained when having processed an input picture by only a first number of sub-networks of a neural network and a second bitstream by having processed the original input by all sub-networks of the neural network. In this case, the rescaling applied on a per sub-network basis can result in a reduced size of at least one of the bitstreams, consequently resulting in a reduced size of the combined bitstream, thereby allowing for keeping the quality of the encoded picture high (when decoded again) while keeping the size of the bitstream comparably low.

It is noted that the combined downsampling ratio may be determined according to all downsampling ratios of the downsampling layers of the at least one sub-network in isolation without regard to other downsampling layers of other sub-networks. Specifically, when obtaining the size $\overline{S}$, this may be determined so that it equals an integer multiple of the combined downsampling ratio of the respective sub-network. More specifically, the combined downsampling ratio $R_k$ of a sub-network k, k being a natural number and denoting the position of the sub-network in the processing order of the input, may be obtained by calculating the product of the downsampling ratios r of all downsampling layers of the sub-network k. This may be represented as $R_k=\Pi_m r_{k,m}$, $r_{k,m}$, $k,m\in\mathbb{N}$, $r_{k,m}>1$ for the sub-network k. Here, the term $r_{k,m}$ indicates a downsampling ratio of a downsampling layer m of the sub-network k. The sub-network may comprise a total number of M (M being a natural number larger than 0) downsampling layers. When the index m in $r_{k,m}$ is used to enumerate the downsampling layers of the sub-network k in the order they process an input, then m may begin with 1 and may take values up to M. Also other ways of enumerating the downsampling layers and their respective downsampling ratios $r_{k,m}$ may be used. M may take values beginning with 0 or −1. Generally, a downsampling layer m of the sub-network k may have an associated downsampling ratio $r_{k,m}$ so as to provide information to which sub-network k and which downsampling layer k within the sub-network k this downsampling ratio belongs. It is noted that the index k may only be provided in order to enumerate the sub-networks. It may be of integer value beginning with 0. It may also comprise integer values larger than or equal to −1 or may start at any reasonable starting point, for example also k=−10. Regarding the value of the index k and also the value of the index m, the invention is not limited though natural numbers larger than or equal to 0 or larger than or equal to −1 are preferred.

It is noted that the product mentioned above for obtaining the combined downsampling ratio may be explicitly calculated or may, for example, be obtained by using the downsampling ratios of the downsampling layers and a look-up table where the look-up table might, for example, comprise entries that represent a combined downsampling ratio and the respective combined downsampling ratio of a sub-network may be obtained by using the downsampling ratios of the of the sub-network as indices to the table. Likewise, the index k may act as an index to the lookup table. Alternatively, the combined downsampling ratio may be a preset or pre-calculated value that is stored for and/or associated with each sub-network.

In one embodiment, the NN comprises a number of $K\in\mathbb{N}$ sub-networks k, $k\leq K$, $k\in\mathbb{N}$, that each comprise at least two downsampling layers, wherein the method further comprises:

before processing an input representing a matrix having a size $S_k$ in at least one dimension with a sub-network k, applying, if the size $S_k$ is not an integer multiple of the combined downsampling ratio $R_k$ of the sub-network, a rescaling to the input, wherein the rescaling comprises changing the size $S_k$ in the at least one dimension so that $\overline{S_k}=nR_k$, $n\in\mathbb{N}$.

The index k may begin with 0 and may thus be larger than or equal to 0. Also other starting values may be chosen, for example k being larger than or equal to −1 or k may begin with 1, i.e. k being larger than or equal to 1. Regarding the selection of the index k, the invention is not limited and any way of differentiating between the respective sub-networks is encompassed by the present disclosure.

With this embodiment, the rescaling before each sub-network is only applied as necessary and only as necessary for the respective sub-network, which may result in a further reduction of the size of the bitstream.

In a further embodiment, at least two of the sub-networks each provide a sub-bitstream as output. A sub-bitstream may be regarded as a complete bitstream on its own. Nevertheless, the output of the neural network, which is referred to as a "bitstream" as well, may be made up from or may comprise at least some of the sub-bitstreams that are obtained by the respective sub-networks. In line with this embodiment, at least two of all sub-networks provide a respective sub-bitstream as output. This may have advantages in combination with the rescaling being applied on a per-sub-network basis.

In one embodiment, before applying the rescaling to the input with the size $S_k$, a determination is made whether $S_k$ is an integer multiple of the combined downsampling ratio $R_k$ of the sub-network k and, if it is determined that $S_k$ is not an integer multiple of the combined downsampling ratio $R_k$ of the sub-network k, the rescaling is applied to the input so that the size $S_k$ is changed in the at least one dimension so that $\overline{S_k}=n\cdot R_k$, $n\in\mathbb{N}$.

This means that $\overline{S_k}$ is an integer multiple of the combined downsampling ratio of the sub-network k. This determination allows for avoiding unnecessary rescaling, for example if $S_k$ already is an integer multiple of the combined downsampling ratio.

In one embodiment it is provided that, if the size $S_k$ of the input is an integer multiple of the combined downsampling ratio $R_k$ of the sub-network k, no rescaling to a size $\overline{S_k}\neq S_k$ is applied to the input before processing the input by the sub-network k. This embodiment may comprise that this results in a "neutral" or "identical" rescaling where a formal step of rescaling is nevertheless applied by default while, in the case the input size is already an integer multiple of the combined downsampling ratios of the sub-network, this rescaling does not actually result in a change of the size of the input. Thereby, the processing of the inputting can be designed in a computationally efficient manner by not having to omit steps depending on specific conditions in total.

In one embodiment, the determination whether $S_k$ is an integer multiple of the combined downsampling ratio $R_k$ comprises comparing the size $S_k$ to an allowed input size of the sub-network k.

The allowed input size may, for example, be obtained from a look-up table or may be calculated by obtaining a series of potential integer multiples of the combined downsampling ratio.

In a more specific embodiment, the allowed input size of the sub-network k is calculated based on at least one of the combined downsampling ratio $R_k$ and the size $S_k$. This calculation allows for obtaining the appropriate allowed input size for the respective sub-network specifically depending on the actual size of the input that is to be processed by the sub-network, making it applicable also to varying input sizes.

In a further embodiment, the comparing comprises calculating a difference between $S_k$ and the allowed input size of the sub-network k.

Calculating the difference may be done by subtracting the size $S_k$ of the input to the sub-network k from the allowed input size to this sub-network. In this context, the allowed input size may be considered to be identical to $\overline{S_k}$. Alternatively or additionally, also the absolute value of this difference may be obtained and the sign of this difference may be used to determine whether increasing of the size or decreasing of the size is to be applied. This allows for reliably determining whether a rescaling is indeed necessary.

In one embodiment, the allowed input size is determined according to $$\text{ceil}\left(\frac{S_k}{R_k}\right)\cdot R_k \text{ or } \text{floor}\left(\frac{S_k}{R_k}\right)\cdot R_k.$$

By using these operations, it is possible to determine those sizes that are closest to the actual size $S_k$ of the input to the sub-network k depending on the combined downsampling ratio $R_k$. Specifically, it can thus be determined what the closest larger integer multiple of the combined downsampling ratio is (using the ceil function) and what the closest smaller integer multiple of the combined downsampling ratio is (using the floor function). Thereby, if at all rescaling is to be applied, it is done in a way that requires the least amount of modifications to the original size of the input, resulting in as little as possible additional information being added to the input or being removed from the input.

In one embodiment, $$\text{ceil}\left(\frac{S_k}{R_k}\right)\cdot R_k - S_k$$

determined and, if $$\text{ceil}\left(\frac{S_k}{R_k}\right)\cdot R_k - S_k \neq 0,$$

the rescaling is applied to the input with the size $S_k$. In an alternative or additional embodiment, $$\text{floor}\left(\frac{S_k}{R_k}\right)\cdot R_k - S_k$$

is determined and, if $$\text{floor}\left(\frac{S_k}{R_k}\right)\cdot R_k - S_k \neq 0,$$

the rescaling is applied to the input with the size $S_k$.

If these values were (both) equal to 0, this would mean that the input size $S_k$ to the sub-network k is already an integer multiple of the respective combined downsampling ratio $R_k$ of this sub-network, making a rescaling to a different size $\overline{S_k}$ not necessary.

In a further embodiment, the size $\overline{S_k}$ is determined using at least one of the combined downsampling ratio $R_k$ or the size $S_k$. In this context, the size $\overline{S_k}$ may be considered to be the allowed input size of a sub-network.

More specifically, the size $\overline{S_k}$ may be determined using a function comprising at least one of ceil, int, floor.

In specific cases, the determination of the size $\overline{S_k}$ may be done in any one of the following ways:

the size $\overline{S_k}$ is determined using $$\text{floor}\left(\frac{S_k}{R_k}\right)\cdot R_k = \bar{S}_k; \text{ or}$$

the size $\overline{S_k}$ is determined using $$\text{ceil}\left(\frac{S_k}{R_k}\right)\cdot R_k = \bar{S}_k;$$

the size $\overline{S_k}$ is determined using $$\text{int}\left(\frac{S_k}{R_k}\right)\cdot R_k = \bar{S}_k;$$

the size S is determined using $$\text{int}\left(\frac{S_k + R_k - 1}{R_k}\right)\cdot R_k = \bar{S}_k.$$

With these embodiments, the size $\overline{S_k}$ is obtained in a way that is closest to the original input size $S_k$, resulting in potentially only small or minor modifications to the input.

In a further embodiment, the rescaling applied to an input of a sub-network k is independent from the combined downsampling ratios $R_l$, l≠k of other sub-networks of the NN and/or the rescaling applied to an input of a sub-network k is independent from downsampling ratios $r_{l,m}$, l≠k of downsampling layers of other sub-networks of the NN. By considering each sub-network k in isolation from the other sub-networks or their downsampling layers and applying a corresponding rescaling only depending on the values of the sub-network k itself to an input $S_k$ to this sub-network, the advantage in the reduction in size of bitstreams may be increased further.

It can further be provided that the input to a sub-network k has a size $S_k$ in the at least one dimension that has a value that is between a closest smaller integer multiple of the combined downsampling ratio $R_k$ of the sub-network k and a closest larger integer multiple of the combined downsampling ratio $R_k$ of the sub-network k and wherein, depending on a condition, the size $S_k$ of the input is changed during the rescaling to either match the closest smaller integer multiple of the combined downsampling ratio $R_k$ or to match the closest larger integer multiple of the combined downsampling ratio $R_k$. The condition can, for example, depend on characteristics of the sub-network or an intention to, for example, only add information to an original input size when applying the rescaling (i.e. always increasing the size of the input if a rescaling is necessary) or to make as few as possible changes to the input by either removing information (for example by cropping) or adding information (for example by padding).

With this, only modifications to the input with the size $S_k$ that are helpful in ensuring that the rescaling results in a rescaled input that can be processed by the sub-network are applied.

In one embodiment, the input to a sub-network k has a size $S_k$ in the at least one dimension that has a value that is not an integer multiple of the combined downsampling ratio $R_k$ of the sub-network k, wherein the size $S_k$ of the input is changed during the rescaling to either match the closest smaller integer multiple of the combined downsampling ratio $R_k$ or to match the closest larger integer multiple of the combined downsampling ratio $R_k$.

In a further embodiment, the input to a sub-network k has a size $S_k$ in the at least one dimension, wherein $lR_k \leq S_k \leq R_k(l+1)$, $l \in \mathbb{N}$ and $R_k$ is the combined downsampling ratio of the sub-network k and wherein the size $S_k$ is either rescaled to $\overline{S_k}=lR_k$ or to $\overline{S_k}=R_k(l+1)$ depending on a condition. This means that the size $S_k$ of the input to the sub-network k is between a closest smaller integer multiple of the combined downsampling ratio of this sub-network (denoted with $lR_k$) and the closest larger inter multiple of the combined downsampling ratio of this sub-network (denoted with $R_k(l+1)$).

This constitutes a reasonable formulation for obtaining the closest larger and closest smaller integer multiples of the combined downsampling ratio to $R_k$ of the sub-network k for an input having a size $S_k$ and makes a flexible adaption of the rescaling also to varying input sizes possible.

In a further embodiment it may be provided that, if the size $S_k$ of the input is closer to the closest smaller integer multiple of the combined downsampling ratio $R_k$ of the sub-network k than to the closest larger integer multiple of the combined downsampling ratio $R_k$, the size $S_k$ of the input is reduced to a size $\overline{S_k}$ that matches the closest smaller integer multiple of the combined downsampling ratio $R_k$. Thereby, the modifications to the input are kept small.

Specifically, it may be provided that reducing the size $S_k$ of the input to the size $\overline{S_k}$ comprises cropping the input. Cropping is a computationally efficient way of reducing the size of an input and can, for example, be applied to a border of the input or to both borders of the input in the at least one dimension. Considering for example an input having a size $S_k$ with sample values that can be arranged from the value 1 to value S. In the representation of a picture, this may refer to the value 1 denotes the first sample at the left border of the picture whereas the value S denotes the sample at the right upper border of the picture. The cropping may comprise removing samples denoted with S up to S-M if a cropping is applied reducing the size of the input by M. Thereby, only samples from the right border of the input are moved and the rescaled input has a size of S-M. Alternatively, the samples denoted with 1 up to M−1 may be removed. Thereby, only values on the left border are removed. Alternatively, values of the left border and the right border may be removed by removing samples denoted with 1 up to $$\frac{M}{2}-1$$

and removing the samples denoted with S up to $$S-\frac{M}{2}.$$

This holds if M is an integer multiple of 2 and in other cases may, for example, comprise removing $$\frac{M\pm 1}{2}$$

samples from the left border and removing $$\frac{M\mp 1}{2}$$

samples from the right border if M is no integer multiple of 2. Removing samples from both borders may be preferred in order to not change information of the original input in a biased way by removing samples from a single border while removing samples from a single border. However, cropping by removing samples from only one border may be computationally more efficient in some cases.

In one embodiment, if the size $S_k$ of the input to the sub-network k is closer to the closest larger integer multiple of the combined downsampling ratio $R_k$ of the sub-network k than to the closest smaller integer multiple of the combined downsampling ratio $R_k$, the size $S_k$ of the input is increased to a size $\overline{S_k}$ that matches the closest larger integer multiple of the combined downsampling ratio $R_k$. The increasing may have the advantage that no information of the original input is lost.

Specifically, it can be provided that increasing the size $S_k$ of the input to the size $\overline{S_k}$ comprises padding the input with the size $S_k$ with zeros or with padding information obtained from the input with the size $S_k$. Padding with zeros adds no information to the input while padding with information that is obtained from the input may, for example, comprise reflection padding or repetition padding using the information from the input itself. While padding with information obtained from the input may result in the values of the derivation at the borders of the input not changing significantly, it may be computationally more complex compared to padding with zeros.

In a more specific embodiment, the padding information obtained from the input with the size $S_k$ is applied as redundant padding information to increase the size $S_k$ of the input to the size $\overline{S_k}$. Specifically, the padding with redundant padding information may comprise at least one of reflection padding and repetition padding. Reflection padding and repetition padding may provide the advantage that they use information that is closest to the respective border to which information is to be added in the padding process, resulting in fewer distortions.

It can also be provided that the padding information is or comprises at least one value of the input with the size $S_k$ that is closest to a region in the input to which the redundant padding information is to be added. Specifically, if for example a number of M samples is to be added to a border of an input, these M samples and their respective values may be taken from the M samples that are closest to this border of the input. Thereby, it may be avoided that unintentional relations to other portions of the input are artificially created.

In a further embodiment, the size $S_k$ of the input to the sub-network k is increased to a size $\overline{S_k}$ that matches the closest larger integer multiple of the downsampling ratio $R_k$. Increasing the size of the input by default to the closest larger integer multiple results in no loss of information of the original input.

In one embodiment, the condition referred to above makes use of $\mathrm{Min}(|S_k-lR_k|, |S_k-R_k(l+1)|)$ and the condition may comprise that, if Min throws $|S_k-lR_k|$, then the size $S_k$ of the input is reduced to $\overline{S_k}=lR_k$ and, if Min throws $|S_k-R_k(l+1)|$, then the size $S_k$ of the input is increased to $\overline{S_k}=(l+1)R_k$. Thereby, a comparison between increasing and decreasing the size to the respective closest larger and closest smaller integer multiple is provided that can be used to apply the computationally most efficient change to the input in the rescaling.

In a more specific embodiment, l is determined using at least one of the size $S_k$ of the input to the sub-network k and the combined downsampling ratio $R_k$ of the sub-network k. Because the number l for calculating the closest smaller and closest larger integer multiple may not be preset in view of varying input sizes $S_k$, it may be obtained in some way. By using the combined downsampling ratio $R_k$ and the input size $S_k$, l can be obtained in a way that depends on the actual input size, making it possible to obtain l in a flexible way.

Specifically, l may be determined by $$l = \text{floor}\left(\frac{S_k}{R_k}\right)$$

and/or l+1 may be determined by $$l + 1 = \text{ceil}\left(\frac{S_k}{R_k}\right).$$

This allows for a computationally efficient calculation l or l+1, respectively. l and l+1 can be calculated in two steps using both, floor and ceil. Alternatively, it is also possible to only calculate l using floor and then obtaining l+1 from this calculation. Alternatively, it can also be envisaged to calculate l+1 using the ceil function and then obtaining l from this value.

It may further be provided that at least one of the downsampling layers of at least one sub-network applies a downsampling to the input in the two dimensions and the downsampling ratio in the first dimension is equal to the downsampling ratio in the second dimension.

It can still further be provided that the downsampling ratios of all downsampling layers of a sub-network are equal. Specifically, the downsampling ratios could all be equal to 2.

In one embodiment, all sub-networks comprise the same number of downsampling layers. The number of downsampling layers of a sub-network k may be denoted with $M_k$, where $M_k$ is a natural number. $M_k$ may then have the same value M for all sub-networks k.

It can further be provided that the downsampling ratios of all downsampling layers of all sub-networks are equal.

The downsampling ratios of the respective downsampling layers m may be denoted with $r_m$, where m corresponds to the actual number of the downsampling layer specifically in the direction of the processing of the input through the sub-network. In this context, it may also be envisaged to denote the downsampling ratios with $r_{k,m}$ where k is a natural number and m is a natural number and k indicates the sub-network k to which the downsampling layer m with the downsampling ratio $r_{k,m}$ belongs.

It can further be provided that at least two sub-networks of the NN have different numbers of downsampling layers.

At least one downsampling ratio $r_{k,m}$ of at least one downsampling layer m of a sub-network k may further be different from at least one downsampling ratio $r_{l,n}$ of at least one downsampling layer n of a sub-network l. Specifically, the sub-networks k and l are different sub-networks. The downsampling layer m and the downsampling layer n may further be at different positions within the sub-networks k and l when seen in processing order of the input through the sub-networks.

It can be provided that, if it is determined that the size $S_k$ of an input to a sub-network k is no integer multiple of the combined downsampling ratio $R_k$, the rescaling comprises applying an interpolation filter. In this context, interpolation may be used to increase the size by calculating, using for example two neighboring sample values of the input with the size $S_k$, an intermediate sample value and adding it in between the neighboring samples as a new sample, thereby adding a sample to the input and increasing the size $S_k$ by 1. This can be done as often as necessary in order to increase the input size $S_k$ to the size $\overline{S_k}$. Alternatively, the interpolation can be used to reduce the size by, for example, obtaining a mean value of for example two neighboring sample values of the input with the size $S_k$ and using, instead of these two neighboring sample values, this mean value obtained by interpolation as one sample. Thereby, the size $S_k$ is reduced by 1.

The interpolation can be mathematically more complex than in the above example and can comprise, for example, not only the immediate neighbors but may be obtained by considering the values of at least four adjacent samples. Interpolation may also be done in a multi-dimensional manner to obtain, for example, an intermediate sample value from four sample values in a two-dimensional matrix that comprise four samples in two neighboring columns and rows. Thereby, an efficient increase or decrease of the size $S_k$ of the input may be obtained that makes use of the originally available information, resulting preferably in as few information losses as possible.

The present disclosure further provides a method for decoding a bitstream representing a picture using a neural network, NN, wherein the NN comprises at least two sub-networks, wherein at least one sub-network of the at least two sub-networks comprises at least two upsampling layers, wherein the at least one sub-network applies an upsampling to an input representing a matrix having a size $T_1$ in at least one dimension, the method comprising:

- processing the input by a first sub-network of the at least two sub-networks and providing an output of the first sub-network, wherein the output has a size $\overline{T_2}$ that corresponds to the product of the size $T_1$ with $U_1$, wherein $U_1$ is a combined upsampling ratio $U_1$ of the first sub-network;
- applying, before processing the output of the first sub-network by the proceeding sub-network in the processing order of the bitstream through the NN, a rescaling to the output of the first sub-network, wherein the rescaling comprises changing the size $\overline{T_2}$ of the output in the at least one dimension to a size $\hat{T}_2$ in the at least one dimension based on information obtained;
- processing the rescaled output by the second sub-network and providing an output of the second sub-network, wherein the output has a size $\overline{T_3}$ that corresponds to the product of $\hat{T}_2$ and $U_2$, wherein $U_2$ is the combined upsampling ratio of the second sub-network;
- providing, after processing the bitstream using the NN, a decoded picture as output, e.g. as output of the NN.

In this context, the upsampling may be considered an inverse to the downsampling applied according to the preceding embodiments. Thereby, when having processed the bitstream with the neural network, a reconstructed or decoded picture can be obtained as output of the neural network. The combined upsampling ratio $U_1$ of the first sub-network and the combined upsampling ratio $U_2$ of the second sub-network may be obtained in different ways or may, for example, be pre-calculated or the like.

The upsampling applied by an upsampling layer of the neural network can be achieved in any known or technically reasonable way. Specifically, this may comprise an upsampling by applying a de-convolution to an input of the respective upsampling layer of the neural network. The upsampling can be performed in one dimension only or it can also be performed on two dimensions of the input when represented in the form of a matrix. This pertains to both, the upsampling applied by a sub-network in total and the upsampling applied by each upsampling layer of a respective sub-network. For example, while a sub-network might apply an upsampling to an input in two dimensions, a first upsampling layer of this sub-network might only apply an upsampling in one dimension whereas another upsampling layer of the sub-network applies an upsampling to the input in another dimension or in two dimensions.

In general, the disclosure presented herein is not limited to particular ways of upsampling. One or more of the layers of the neural network discussed below may apply an upsampling in a way that is different from de-convolutions for example by adding intermediate rows or columns, like between every two or four rows and/or columns of the input (when seen in the representation of the two-dimensional matrix).

Embodiments presented herein are to be understood as referring to a rescaling that is applied immediately after the processing of an input by a sub-network comprising upsampling layers but not within the sub-network. This means, as regards the rescaling, the sub-network is, although comprising a plurality of layers and potentially a large number of upsampling layers, considered as one entity that applies an upsampling with a combined upsampling ratio to an input and the rescaling of the output of the sub-network is applied so that a size T of the rescaled output matches a size T that may, for example, be a target input size for the subsequent sub-network.

It is noted that the combined upsampling ratio may be determined according to all upsampling ratios of the upsampling layers of the at least one sub-network in isolation without regard to other upsampling layers of other sub-networks. More specifically, the combined upsampling ratio $U_k$ of a sub-network k, k being a natural number and denoting the position of the sub-network in the processing order of the input, may be obtained by calculating the product of the upsampling ratios u of all upsampling layers of the sub-network k. This may be represented as $U_k=\Pi_m u_{k,m}$, $u_{k,m}$, k, $m\in\mathbb{N}$, $u_{k,m}>1$ for the sub-network k. Here, the term $u_{k,m}$ indicates a upsampling ratio of an upsampling layer m of the sub-network k. The sub-network may comprise a total number of M (M being a natural number larger than 0) upsampling layers. When the index m in $u_{k,m}$ is used to enumerate the upsampling layers of the sub-network k in the order they process an input, then m may begin with 1 and may take values up to M. Also other ways of enumerating the upsampling layers and their respective upsampling ratios $u_{k,m}$ may be used. M may take values beginning with 0 or −1. Generally, an upsampling layer m of the sub-network k may have an associated upsampling ratio $u_{k,m}$ so as to provide information to which sub-network k and which upsampling layer m within the sub-network k this upsampling ratio belongs. It is noted that the index k may only be provided in order to enumerate the sub-networks. It may be of integer value beginning with 0. It may also comprise integer values larger than or equal to −1 or may start at any reasonable starting point, for example also k=−10. Regarding the value of the index k and also the value of the index m, the invention is not limited though natural numbers larger than or equal to 0 or larger than or equal to −1 are preferred.

It is noted that the product mentioned above for obtaining the combined upsampling ratio may be explicitly calculated or may, for example, be obtained by using the upsampling ratios of the upsampling layers and a look-up table where the look-up table might, for example, comprise entries that represent a combined upsampling ratio and the respective combined upsampling ratio of a sub-network may be obtained by using the upsampling ratios of the of the sub-network as indices to the table. Likewise, the index k may act as an index to the lookup table. Alternatively, the combined upsampling ratio may be a preset or pre-calculated value that is stored for and/or associated with each sub-network.

With this method, it is possible to obtain a decoded picture even from a bitstream encoding a picture that has reduced size and was, for example, obtained using one or more of the above embodiments.

In one embodiment the method further comprises receiving, by at least two sub-networks, a sub-bitstream. The sub-bitstreams received by each of these at least two sub-networks may be different. As was already indicated above, during encoding, a first sub-bitstream may be obtained by processing the originally input picture by only a subset of the available sub-networks and providing an output after this partial processing of the input picture. The second sub-bitstream or the second sub-bitstream is then, for example, obtained after having processed the input picture by the whole neural network and thus by all downsampling layers. For decoding the picture, the process can be in inverse order so that the sub-bitstream that was processed only by a subset of the sub-networks of the encoder is likewise only processed by the last few sub-networks before obtaining the decoded picture.

In a further embodiment, at least one upsampling layer of at least one sub-network comprises a transposed convolution or convolution layer. The transposed convolution may be implemented as the inverse of the convolution that has, for example, been applied in a corresponding encoder encoding the picture.

In a further embodiment, the information comprises at least one of a target size of the decoded picture comprising at least one of a height H of the decoded picture and a width W of the decoded picture, the combined upsampling ratio $U_1$, the combined upsampling ratio $U_2$, at least one upsampling ratio $u_{1m}$ of an upsampling layer of the first sub-network, at least one upsampling ratio $u_{2m}$ of an upsampling layer of the second sub-network, a target output size $\hat{T}_3$ of the second sub-network, the size $\hat{T}_2$. Using one or more of these pieces of information can result in a reliable reconstruction of the image.

It can be provided that the information is obtained from at least one of: the bitstream, a second bitstream, information available at a decoder. While some of the information can advantageously be included in the bitstream like, for example, the height and width of the original picture, some other information, like for example the upsampling ratios, can be already available at the decoder that performs the decoding method according to one of the above embodiments. This is because this information may usually not be known to the encoder but may be available at the decoder, making it more efficient to obtain this information from the decoder itself and not having to include it, as further information, in the bitstream provided to the decoder. An additional bitstream can also be used in order to, for example, separate the additional information on the one side from the information pertaining or constituting the encoded picture on the other side, making it computationally easier to distinguish between such information. The other benefit of including an additional bitstream may be to speed up the processing by means of parallel processing. If for example a sub-network only requires one part of the bitstream, and the second sub-network only requires the second part of the bitstream (each part being disjoint), it is advantageous to divide the single bitstream into two bitstreams. This way it is possible to start the processing of the first sub-network independently from the second subnetwork, increasing the parallel processing capability. In one embodiment, the rescaling for changing the size $\overline{T_2}$ in the at least one dimension to the size $\hat{T}_2$ is determined based on a formula depending on $\hat{T}_3$ and $U_2$, wherein $\hat{T}_3$ is a target output size of the output of the second sub-network and $U_2$ is the combined upsampling ratio of the second sub-network. The target output size $\hat{T}_3$ can be preset or can be calculated inversely for example based on an intended size of the decoded picture. With this embodiment, the size $\hat{T}_2$ can be determined based on information pertaining to the sub-networks and/or the output to be obtained.

It may further be provided the rescaling for changing the size $\overline{T_2}$ in the at least one dimension to the size $\hat{T}_2$ is determined based on a formula depending on $U_2$ and N, where N is the total number of sub-networks proceeding the first sub-network in processing order of the bitstream through the NN.

With this, the size $\hat{T}_2$ is depending on the number of proceeding sub-networks and further depends on the actual output size to be obtained for the decoded picture.

Specifically, the formula may be given by $$\hat{T}_2 = \text{ceil}\left(\frac{T_{output}}{U_2^N}\right),$$

wherein $T_{output}$ is the target size of the output of the NN. It can also be provided that the formula is given by $$\hat{T}_2 = \text{ceil}\left(\frac{T_{output}}{U^N}\right),$$

wherein $T_{output}$ is the target size of the output of the NN and U is a combined upsampling ratio. In this case, an indication for indicating the size $T_{output}$ may be included in the bitstream. By including the size $T_{output}$ in the bitstream, also varying output sizes to be obtained by the decoding can be signaled to the decoding.

In a further embodiment, the formula is given by $$\hat{T}_2 = \text{ceil}\left(\frac{\hat{T}_3}{U_2}\right)$$

or wherein the formula is given by $$\hat{T}_2 = \text{floor}\left(\frac{\hat{T}_3}{U_2}\right).$$

An indication may be provided in and obtained from the bitstream that indicates which of the multiple predefined formulas are selected. With this, it is possible to signal to the decoding what processing has been applied during encoding, thereby making a reconstruction of the picture possible in a reliable way.

The method may further comprise, before the rescaling the output with the size $\overline{T_2}$, determining whether the size $\overline{T_2}$ of the output matches the size $\hat{T}_2$. Thereby, unnecessary rescaling or calculations potentially involved in determining which rescaling is to be applied can be avoided.

In this regard it can be provided that, if it is determined that the size $\overline{T_2}$ matches the size $\hat{T}_2$, no rescaling changing the size $\overline{T_2}$ is applied. This encompasses the case where, for example by default, an identical rescaling is applied in the case that $\overline{T_2}$ matches $\hat{T}_2$. This "identical" rescaling does not applying a change to the size $\overline{T_2}$.

In one embodiment, the method further comprises determining whether $T_2$ is larger than $\hat{T}_2$ or whether $\overline{T_2}$ is smaller than $\hat{T}_2$. By determining whether $\overline{T_2}$ is smaller or larger than $\hat{T}_2$, further consequences on the rescaling to be applied can be made. Specifically, if it is determined that $\overline{T_2}$ is larger than $\hat{T}_2$, the rescaling may comprise applying a cropping to the output with the size $\overline{T_2}$ such that the size $\overline{T_2}$ is reduced to the size $\hat{T}_2$. Thereby, a computationally efficient reduction of the size of $\overline{T_2}$ to the size $\hat{T}_2$ is provided. Alternatively, if it is determined that $\overline{T_2}$ is smaller than $\hat{T}_2$, the rescaling may comprise applying a padding to the output with the size $\overline{T_2}$ such that the size $\overline{T_2}$ is increased to the size $\hat{T}_2$.

Specifically the cropping operation corresponds to discarding samples from the edges of the output such that the size $\overline{T_2}$ is reduced and made equal to $\hat{T}_2$. In the decoder, usually the cropping operation is applied at the end of a sub-network. The reason is that in an encoder it is usually preferable to apply padding for resizing before a sub-network, since padding ensures that no information is lost and that the information is not altered (just the size of the input comprising the information is increased). Since, in a decoder, the operations applied by an encoder are reverted, the cropping is applied after a sub-network.

Specifically, the padding may comprise padding the output with the size $\overline{T_2}$ with zeros or with padding information obtained from the output with the size $\overline{T_2}$. The padding with information using either zeros or information obtained from the output with a size $\overline{T_2}$ results in no information being added to the output that was not already part of the same or can be implemented in a computationally efficient manner by padding with 0s.

In a further embodiment, the padding information obtained from the output with the size $\overline{T_2}$ is applied as redundant padding information to increase the size $\overline{T_2}$ of the output to the size $\hat{T}_2$. Applying redundant padding does not add additional information but adds already present information to the output which may result in fewer distortions in the reconstructed image.

More specifically, the padding may comprise reflection padding or repetition padding.

It can further be provided that the padding information is or comprises at least one value of the output with the size $\overline{T_2}$ that is closest to a region in the output to which the redundant padding information is to be added.

In a further embodiment, if it is determined that $\overline{T_2}$ is not equal to $\hat{T}_2$, the rescaling comprises applying an interpolation filter. Applying interpolation can be useful to increase the quality of the reconstructed picture.

In a further embodiment, the information is provided in the bitstream or a further bitstream and comprises a combined downsampling ratio $R_k$ of at least one sub-network k that comprises at least one downsampling layer m of an encoder that encoded the bitstream, wherein the sub-network k corresponds, in the order of processing the input, to the sub-network of the decoder. Thereby, it can be ensured that the processing performed during the decoding is reversed by the encoding.

It may further be provided that at least one upsampling layer of at least one sub-network of the NN applies an upsampling in the two dimensions and the upsampling ratio in the first dimension is equal to the upsampling ratio in the second dimension.

Furthermore, the upsampling ratios of all upsampling layers of a sub-network may be equal. This can be implemented computationally efficient.

In one embodiment, all sub-networks comprise the same number of upsampling layers. The number of upsampling layers greater than or equal to 2.

It can also be provided that the upsampling ratios of all upsampling layers of all sub-networks are equal.

Alternatively, at least two sub-networks of the NN may have different numbers of upsampling layers. Optionally, at least one upsampling ratio $u_{k,m}$ of at least one upsampling layer m of a sub-network k may different from at least one upsampling ratio $u_{l,n}$ of at least one upsampling layer n of a sub-network l. The indices k, l, m, n may be integer values greater than 0 and may indicate the position of the sub-network or the upsampling layer in the processing order of the input to the NN, respectively.

It can be provided that the sub-networks k and l are different sub-networks. Furthermore, the upsampling layer m and the upsampling layer n may be at different positions within the sub-networks k and l when seen in processing order of the input through the sub-networks.

It can further be provided that the combined upsampling ratios of at least two different sub-networks are equal or the combined upsampling ratios of all sub-networks may be are pairwise disjoint.

In view of the above embodiments, it may be provided that the NN comprises, in the processing order of the bitstream through the NN, a further unit that applies a transformation to the input that does not change the size of the input in the at least one dimension, wherein the method comprises applying the rescaling after the processing of the input by the further unit and before processing the input by the following sub-network of the NN, if the rescaling results in an increase of the size of the input in the at least one dimension, and/or wherein the method comprises applying the rescaling before the processing of the input by the further unit, if the rescaling comprises a decrease of the size of the input in the at least one dimension. By applying the rescaling before or after the respective further unit, the rescaling can be implemented in a computationally efficient way avoiding, for example, a rescaling to an input that would, by the further unit, be changed anyway, potentially making, for example, an interpolation less reliable.

Specifically, the further unit may be or may comprise a batch normalizer and/or a rectified linear unit, ReLU. Such units are part of some neural networks nowadays and can increase the quality of the processing of an input through the neural network.

The bitstream may comprise sub-bitstreams corresponding to distinct color channels of the picture and wherein the NN comprises sub-neural networks, sNN, that are each adapted to apply a method according to any of the above embodiments to the sub-bitstream provided as input to the sNN. The applications of such sub-neural networks can be provided in a way that each of the sub-neural networks performs a rescaling and processing of an input in line with any of the above embodiments without the sub-networks influencing each other. They may thus be independent from each other and process their respective input independent from each other which can also comprise that a different rescaling is applied by one of the sub-neural networks compared to the rescaling that is applied during the processing of an input to another sub-neural network. Furthermore, the sub-neural networks are not necessarily identical with respect to their construction regarding the sub-networks or the respective layers or the structure of the layers within the sub-networks.

Regarding the encoding, it can be provided that, if the rescaling comprises increasing the size $S_m$ to the size $\overline{S_m}$, the size $\overline{S_m}$ is given by $$\overline{S_m} = \text{Int}\left(\frac{S_m + R_m - 1}{R_m}\right) R_m$$

and, if the rescaling comprises reducing the size $S_m$ to the size $\overline{S_m}$, the size $\overline{S_m}$ is given by $$\overline{S_m} = \text{Int}\left(\frac{S_m}{R_m}\right) R_m.$$

Regarding the decoding, it may further be provided that, if the rescaling comprises increasing the size $\overline{T_2}$ to the size $\hat{T}_2$, the size $\hat{T}_2$ is given by $$\hat{T}_2 = \text{Int}\left(\frac{\overline{T_2} + U_2 - 1}{U_2}\right) U_2$$

and, if the rescaling comprises reducing the size $\overline{T_2}$ to the size $\hat{T}_2$, the size $\hat{T}_2$ is given by $$\hat{T}_2 = \text{Int}\left(\frac{\overline{T_2}}{U_2}\right) U_2.$$

The present disclosure further provides an encoder for encoding a picture, wherein the encoder comprises a receiver for receiving a picture and one or more processors configured to implement a neural network, NN, the NN comprising, in a processing order of a picture through the NN, at least two sub-networks, wherein each sub-network comprises at least two layers, wherein the at least two layers of at least one sub-network of the at least two sub-networks comprise at least one downsampling layer that is adapted to apply a downsampling to an input, and a transmitter for outputting a bitstream, wherein the encoder is adapted to perform a method according to any of the above embodiments.

Further, an encoder for encoding a bitstream is provided, wherein the encoder comprises one or more processors for implementing a neural network, NN, wherein the one or more processors are adapted to perform a method according to any of the above embodiments.

Furthermore, an encoder for encoding a picture is provided, the encoder comprising one or more processors configured to implement a neural network, NN, the NN comprising, in a processing order of a picture through the NN, at least two sub-networks, wherein at least one sub-network of the at least two sub-networks comprises at least two downsampling layers and wherein the at least one sub-network is adapted to apply a downsampling to an input representing a matrix having a size $S_1$ in at least one dimension, wherein the encoder and/or the one or more processors are adapted to encode a picture by:

applying, before processing the input with the at least one sub-network comprising at least two downsampling layers, a rescaling to the input, wherein the rescaling comprises changing the size $S_1$ in the at least one dimension to be $\overline{S_1}$ so that $\overline{S_1}$ is an integer multiple of a combined downsampling ratio $R_1$ of the at least one sub-network;

after the rescaling, processing the input by the at least one sub-network comprising at least two downsampling layers and providing an output with the size $S_2$, wherein $S_2$ is smaller than $S_1$;

providing, after processing the picture using the NN, a bitstream as output, e.g. as output of the NN.

Further embodiments of the encoder are configured to implement the features of the encoding methods explained above.

These embodiments allow for implementing the advantages of the encoding method explained in the above embodiments in encoders.

Moreover, a decoder for decoding a bitstream representing a picture is provided, wherein the decoder comprises a receiver for receiving a bitstream and one or more processors configured to implement a neural network, NN, the NN comprising, in a processing order of a bitstream through the NN, at least two sub-networks, wherein each sub-network comprises at least two layers, wherein the at least two layers of each of the at least two sub-network comprise at least one upsampling layer, wherein each upsampling layer is adapted to apply upsampling to an input, and a transmitter for outputting a decoded picture, wherein the decoder is adapted to perform any of the methods of the above embodiments.

A decoder for decoding a bitstream representing a picture is also provided in the present disclosure, wherein the decoder comprises one or more processors for implementing a neural network, NN, wherein the one or more processors are adapted to perform a method according to any of the above embodiments.

Furthermore, a decoder for decoding a bitstream representing a picture is provided, wherein the decoder comprises a receiver for receiving a bitstream and one or more processors configured to implement a neural network, NN, the NN comprising, in a processing order of a bitstream through the NN, at least two sub-networks, wherein at least one sub-network of the at least two sub-networks comprises at least two upsampling layers, wherein the at least one sub-network is adapted to apply an upsampling to an input representing a matrix having a size $T_1$ in at least one dimension, wherein the encoder and/or the one or more processors are configured to decode a bitstream by:

processing the input by a first sub-network of the at least two sub-networks and providing an output of the first sub-network, wherein the output has a size $\overline{T_2}$ that corresponds to the product of the size $T_1$ with $U_1$, wherein $U_1$ is a combined upsampling ratio $U_1$ of the first sub-network;

applying, before processing the output of the first sub-network by the proceeding sub-network in the processing order of the bitstream through the NN, a rescaling to the output of the first sub-network, wherein the rescaling comprises changing the size $\overline{T_2}$ of the output in the at least one dimension to a size $\hat{T}_2$ in the at least one dimension based on information obtained;

processing the rescaled output by the second sub-network and providing an output of the second sub-network, wherein the output has a size $\overline{T_3}$ that corresponds to the product of $\hat{T}_2$ and $U_2$, wherein $U_2$ is the combined upsampling ratio of the second sub-network;

providing, after processing the bitstream using the NN, a decoded picture as output, e.g. as output of the NN.

Further embodiments of the decoder are configured to implement the features of the decoding methods explained above.

These embodiments advantageously implement the above embodiments for decoding a bitstream in a decoder.

Furthermore, a computer-readable (non-transitory) storage medium is provided that comprises computer executable instructions that, when executed on a computing system, cause the computing system to execute a method according to any of the above embodiments.

DETAILED DESCRIPTION

Figure 1A:
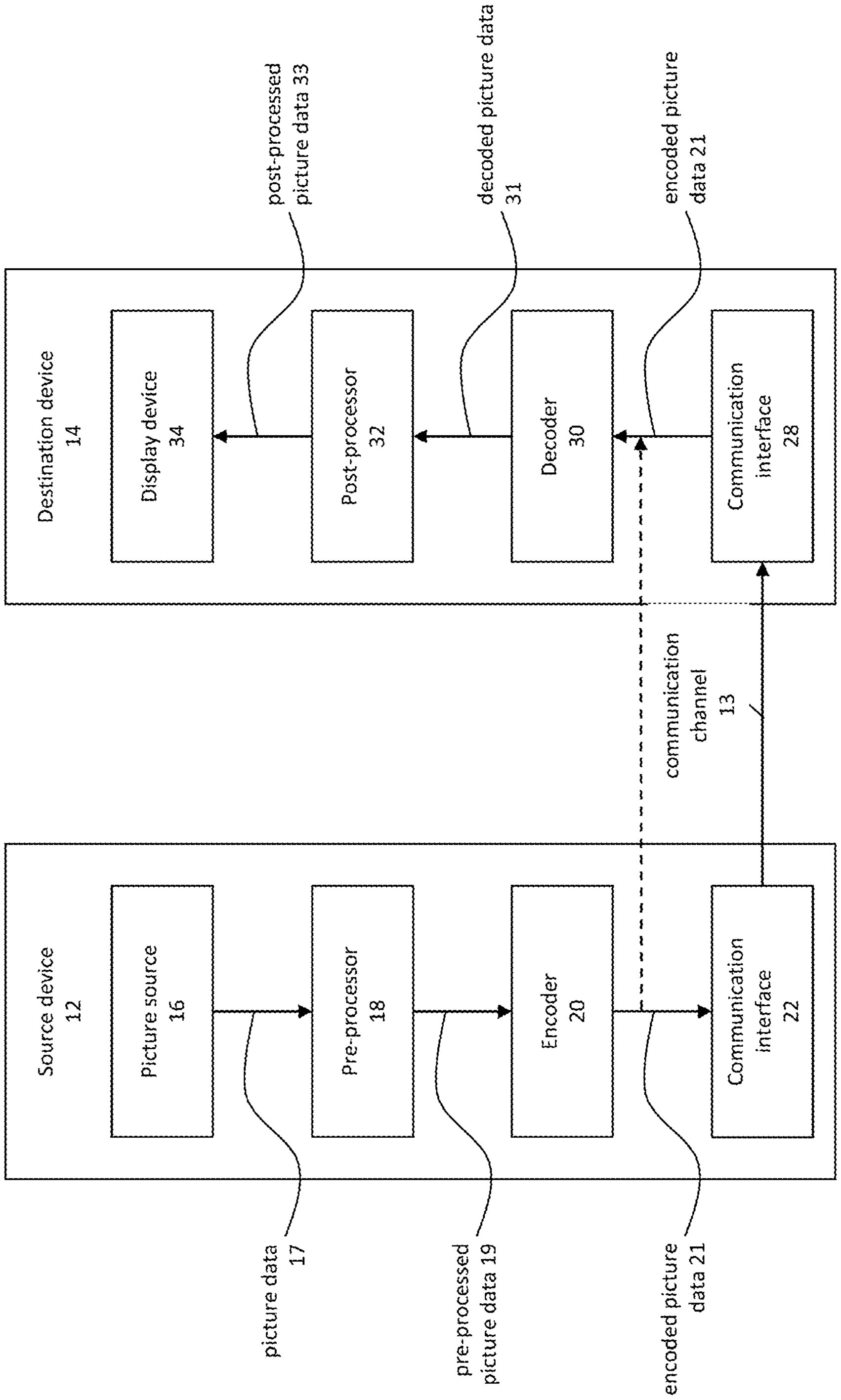
FIG. 1A is a block diagram showing an example of a video coding system configured to implement an embodiments of the present disclosure.

In the following, some embodiments are described with reference to the FIGS. The FIGS. 1 to 3 refer to video coding systems and methods that may be used together with more specific embodiments of the invention described in the further FIGS. Specifically, the embodiments described in relation to FIGS. 1 to 3 may be used with encoding/decoding techniques described further below that make use of a neural network for encoding a bitstream and/or decoding a bitstream.

In the following description, reference is made to the accompanying FIGS., which form part of the disclosure, and which show, by way of illustration, specific aspects of the present disclosure or specific aspects in which embodiments of the present disclosure may be used. It is understood that the embodiments may be used in other aspects and comprise structural or logical changes not depicted in the FIGS. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the FIGS. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the FIGS. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks. Recently, some parts or the entire encoding and decoding chain has been implemented by using a neural network or, in general, any machine learning or deep learning framework.

In the following embodiments of a video coding system 10, a video encoder 20 and a video decoder 30 are described based on FIG. 1.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22. Some embodiments of the present disclosure (e.g. relating to an initial rescaling or rescaling between two proceeding layers) may be implemented by the encoder 20. Some embodiments (e.g. relating to an initial rescaling) may be implemented by the picture pre-processor 18.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

Some embodiments of the disclosure may be implemented by the decoder 30 or by the post-processor 32.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
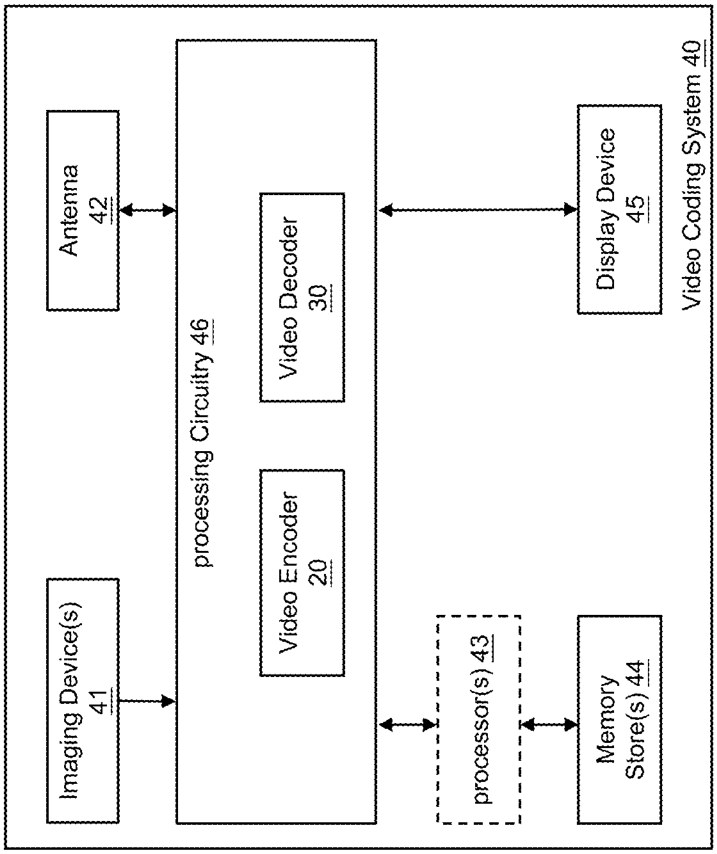
FIG. 1B is a block diagram showing another example of a video coding system configured to implement some embodiments of the present disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody various modules and/or any other encoder system or subsystem described herein. The decoder 30 may be implemented via processing circuitry 46 to embody various modules and/or any other decoder system or subsystem described herein. The processing circuitry may be configured to perform the various operations as discussed later. As shown in FIG. 3, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, some embodiments are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Figure 2:
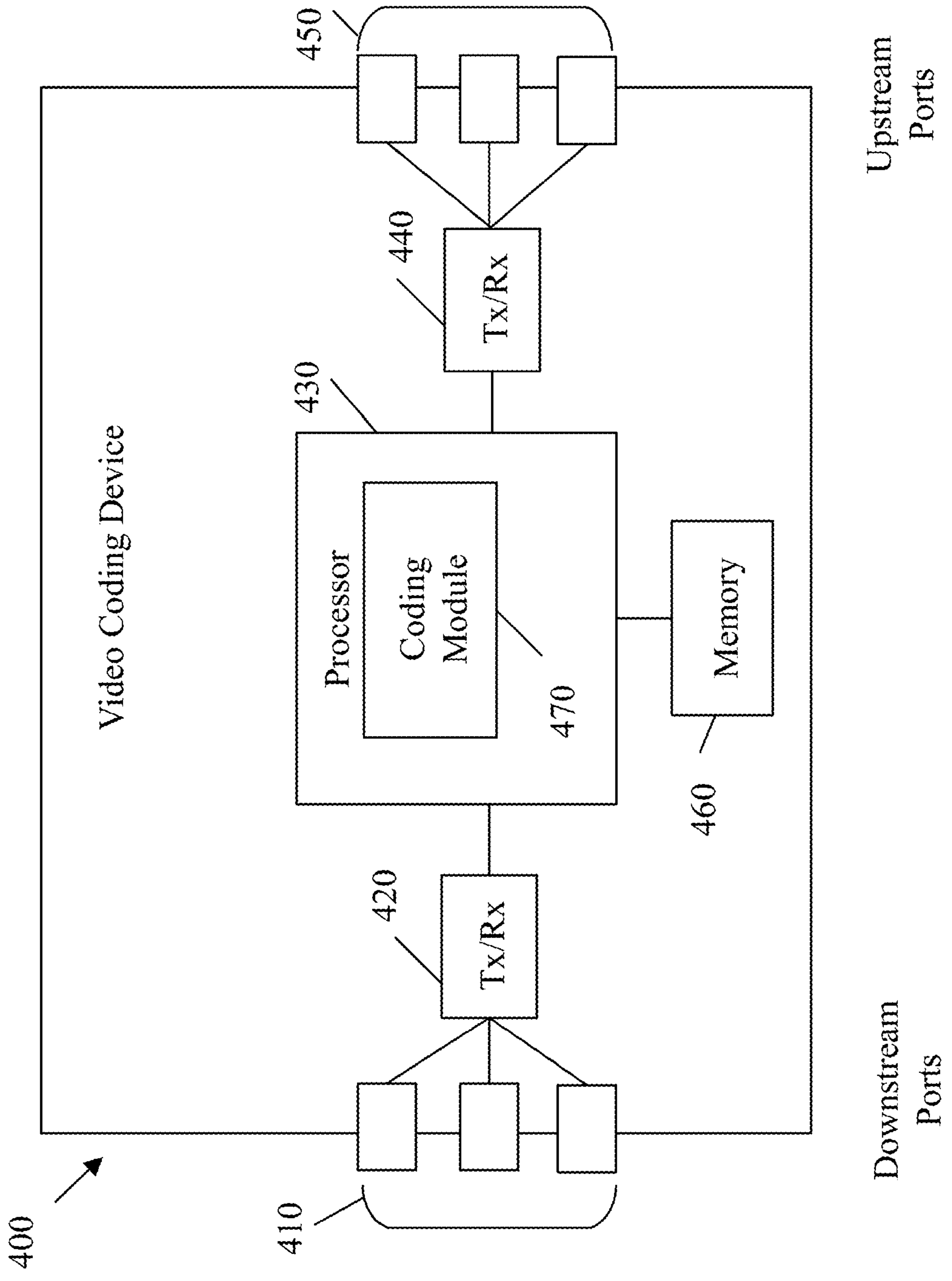
FIG. 2 is a block diagram illustrating an example of an encoding apparatus or a decoding apparatus.

FIG. 2 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 3:
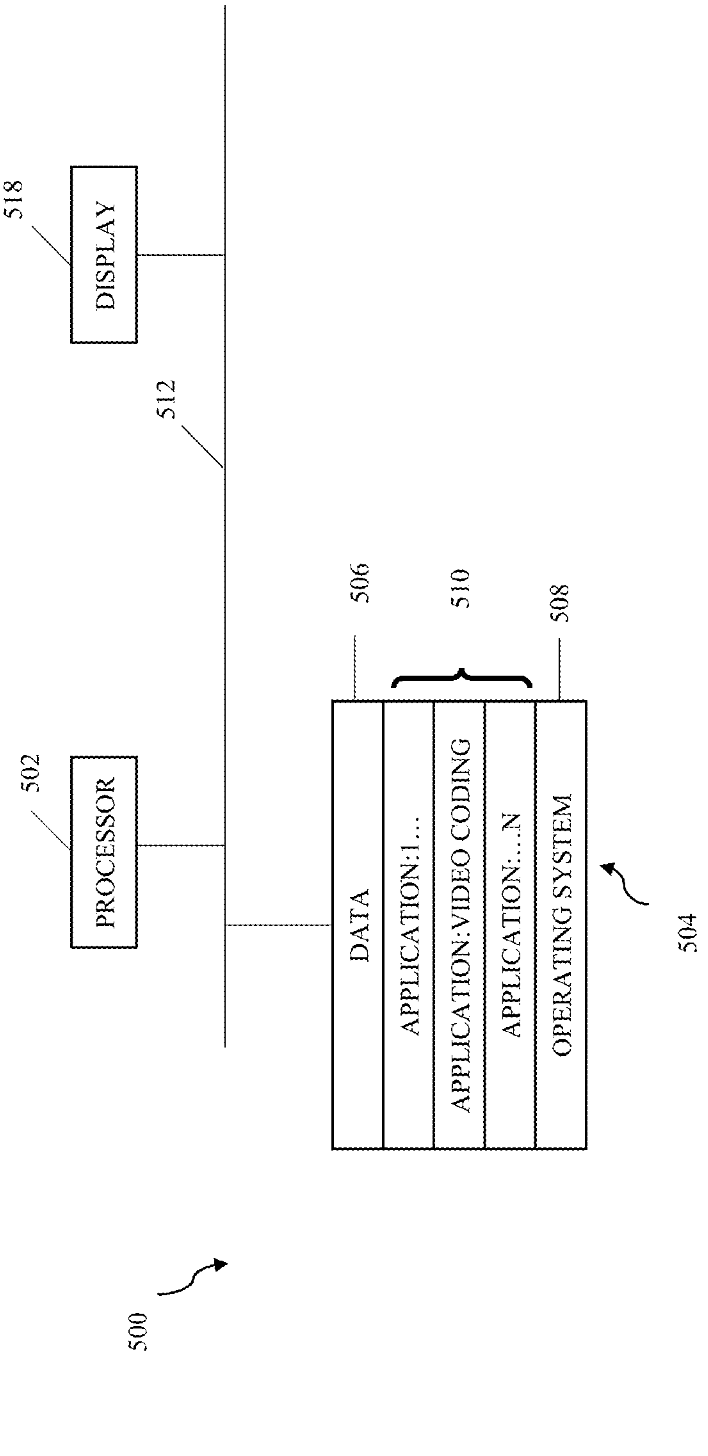
FIG. 3 is a block diagram illustrating another example of an encoding apparatus or a decoding apparatus.

FIG. 3 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In the following, more specific, non-limiting, and exemplary embodiments of the invention are described. Before that, some explanations will be provided aiding in the understanding of the disclosure:

Artificial neural networks (ANN) or connectionist systems are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. In ANN implementations, the "signal" at a connection is a real number, and the output of each neuron can be computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Over time, attention moved to performing specific tasks, leading to deviations from biology. ANNs have been used on a variety of tasks, including computer vision.

Figure 6:
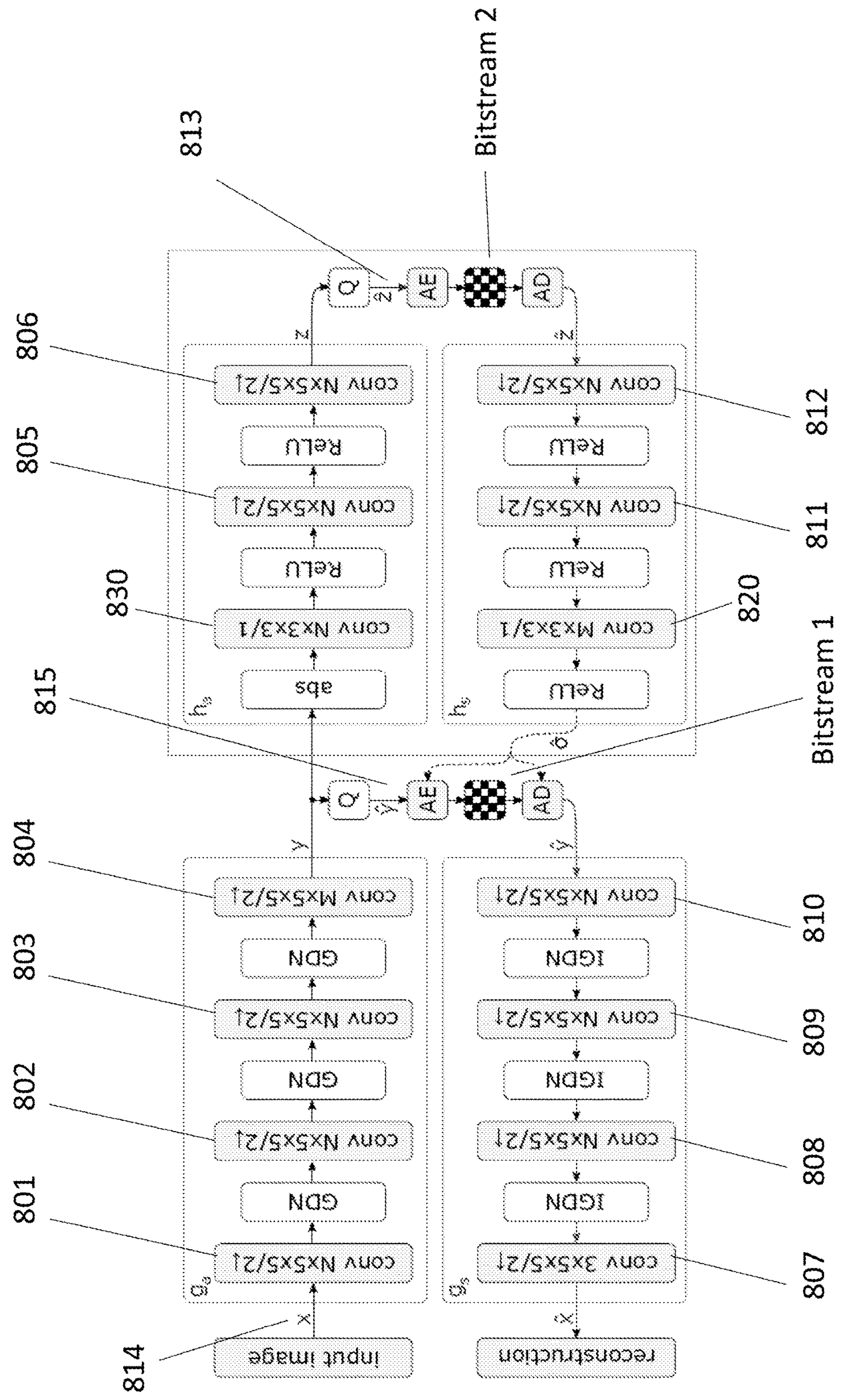
FIG. 6 shows an encoder and a decoder in line with a VAE framework.

The name "convolutional neural network" (CNN) indicates that the network employs a mathematical operation called convolution. Convolution is a specialized kind of linear operation. Convolutional networks are simply neural networks that use convolution in place of general matrix multiplication in at least one of their layers. A convolutional neural network consists of an input and an output layer, as well as multiple hidden layers. Input layer is the layer to which the input is provided for processing. For example, the neural network of FIG. 6 is a CNN. The hidden layers of a CNN typically consist of a series of convolutional layers that convolve with a multiplication or other dot product. The result of a layer is one or more feature maps, sometimes also referred to as channels. There may be a subsampling involved in some or all of the layers. As a consequence, the feature maps may become smaller. The activation function in a CNN may be a RELU (Rectified Linear Unit) layer or a GDN layer as already exemplified above, and is subsequently followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how weight is determined at a specific index point.

When programming a CNN for processing pictures or images, the input is a tensor with shape (number of images)×(image width)×(image height)×(image depth). Then, after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Also, such network architecture does not take into account the spatial structure of data, treating input pixels which are far apart in the same way as pixels that are close together. This ignores locality of reference in image data, both computationally and semantically. Thus, full connectivity of neurons is wasteful for purposes such as image recognition that are dominated by spatially local input patterns. CNN models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear downsampling. There are several non-linear functions to implement pooling among which max pooling is the most common. It partitions the input image into a set of non-overlapping rectangles and, for each such sub-region, outputs the maximum. Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

An autoencoder is a type of artificial neural network used to learn efficient data codings in an unsupervised manner. The aim of an autoencoder is to learn a representation (encoding) for a set of data, typically for dimensionality reduction, by training the network to ignore signal "noise". Along with the reduction side, a reconstructing side is learnt, where the autoencoder tries to generate from the reduced encoding a representation as close as possible to its original input, hence its name.

Picture size: refers to the width or height or the width-height pair of a picture. Width and height of an image is usually measured in number of luma samples.

Downsampling: Downsampling is a process, where the sampling rate (sampling interval) of the discrete input signal is reduced. For example if the input signal is an image which has a size of height h and width w (or H and W as referred to below likewise), and the output of the downsampling is a height h2 and a width w2, at least one of the following holds true:

h2<h w2<w

In one example implementation, downsampling can be implemented as keeping only each m-th sample, discarding the rest of the input signal (which, in the context of the invention, basically is a picture).

Upsampling: Upsampling is a process, where the sampling rate (sampling interval) of the discrete input signal is increased. For example if the input image has a size of h and w (or H and W as referred to below likewise), and the output of the downsampling is h2 and w2, at least one of the following holds true:

h<h2 w<w2

Resampling: downsampling and upsampling processes are both examples of resampling. Resampling is a process where the sampling rate (sampling interval) of the input signal is changed.

Interpolation filtering: During the upsampling or downsampling processes, filtering can be applied to improve the accuracy of the resampled signal and to reduce the aliasing affect. An interpolation filter usually includes a weighted combination of sample values at sample positions around the resampling position. It can be implemented as:

$$f(x_r,y_r)=\Sigma s(x,y)C(k)$$

Where f( ) is the resampled signal, ($x_r$, $y_r$) are the resampling coordinates, C(k) are interpolation filter coefficients and s(x,y) are or is the input signal. The summation operation is performed for (x,y) that are in the vicinity of ($x_r$, $y_r$).

Cropping: Trimming off the outside edges of a digital image. Cropping can be used to make an image smaller (in number of samples) and/or to change the aspect ratio (length to width) of the image.

Padding: padding refers to increasing the size of the input image (or image) by generating new samples at the borders of the image. This can be done, for example, by either using sample values that are predefined or by using sample values of the positions in the input image.

Resizing: Resizing is a general term where the size of the input image is changed. It might be done using one of the methods of padding or cropping. It can be done by a resizing operation using interpolation. In the following, resizing may also be referred to as rescaling.

Integer division: Integer division is division in which the fractional part (remainder) is discarded.

Convolution: convolution is given by the following general equation. Below f( ) can be defined as the input signal and g( ) can be defined as the filter.

$$(f*g)[n]=\sum_{m=-\infty}^{\infty} f[m]g[n-m]$$

Downsampling layer: A processing layer, such as a layer of a neural network that results in a reduction of at least one of the dimensions of the input. In general, the input might have 3 or more dimensions, where the dimensions might comprise number of channels, width and height. However, the present disclosure is not limited to such signals. Rather, signals which may have one or two dimensions (such as audio signal or an audio signal with a plurality of channels) may be processed. The downsampling layer usually refers to reduction of the width and/or height dimensions. It can be implemented with convolution, averaging, max-pooling etc. operations. Also other ways of downsampling are possible and the invention is not limited in this regard.

Upsampling layer: A processing layer, such as a layer of a neural network that results in an increase of one of the dimensions of the input. In general, the input might have 3 or more dimensions, where the dimensions might comprise number of channels, width and height. The upsampling layer usually refers to increase in the width and/or height dimensions. It can be implemented with de-convolution, replication etc. operations. Also, other ways of upsampling are possible and the invention is not limited in this regard.

Some deep learning based image and video compression algorithms follow the Variational Auto-Encoder framework (VAE), e.g. G-VAE: A Continuously Variable Rate Deep Image Compression Framework, (Ze Cui, Jing Wang, Bo Bai, Tiansheng Guo, Yihui Feng), available at: https://arxiv.org/abs/2003.02012.

The VAE framework could be counted as a nonlinear transforming coding model.

Figure 4:
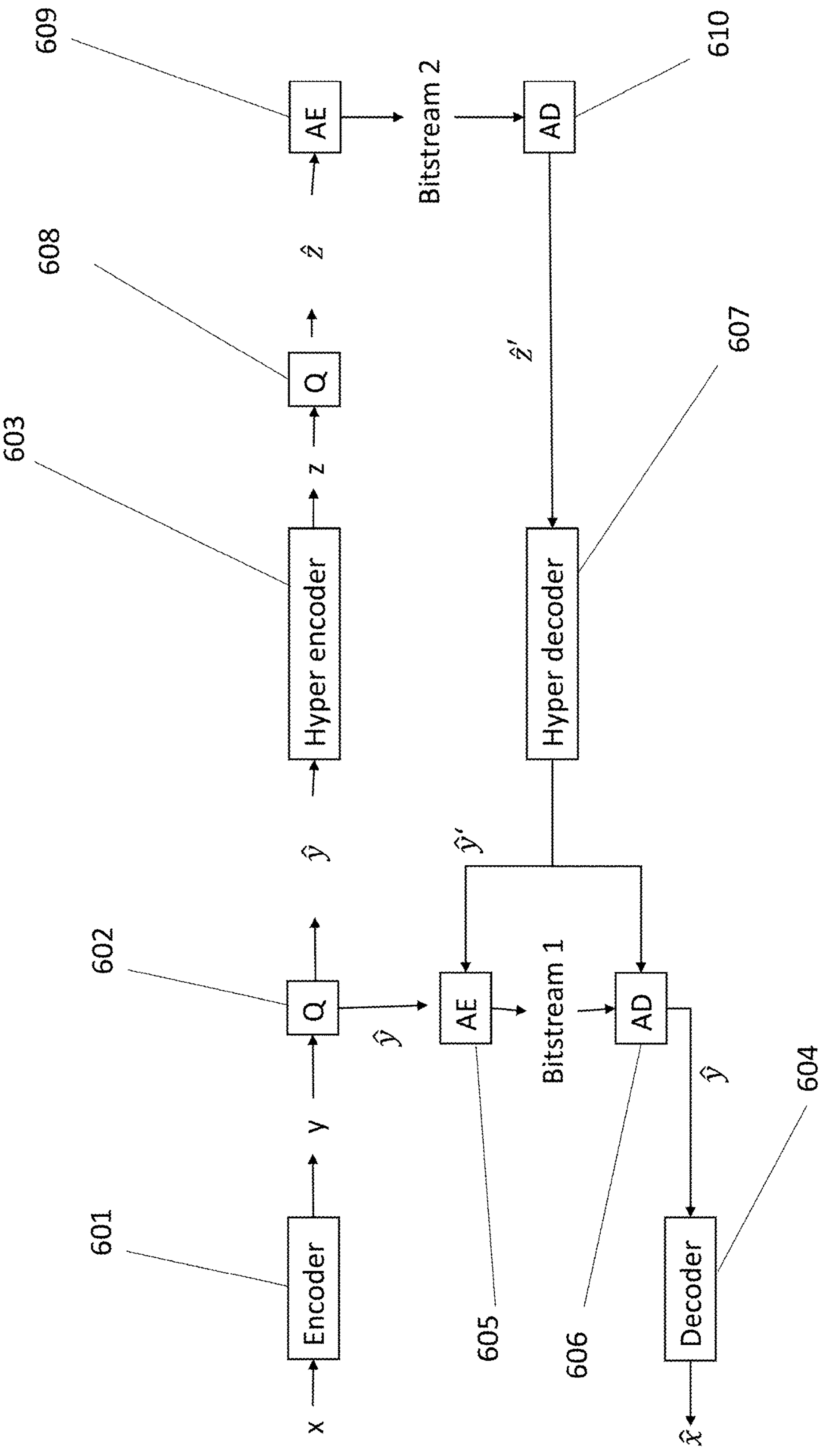
FIG. 4 shows an encoder and a decoder together according to one embodiment.

The transforming process can be mainly divided into four parts: FIG. 4 exemplifies the VAE framework. In the FIG. 4, the encoder 601 maps an input image x into a latent representation (denoted by y) via the function y=f(x). This latent representation may also be referred to as a part of or a point within a "latent space" in the following. The function f( ) is a transformation function that converts the input signal x into a more compressible representation y. The quantizer 602 transforms the latent representation y into the quantized latent representation $\hat{y}$ with (discrete) values by $\hat{y}=Q(y)$, with Q representing the quantizer function. The entropy model, or the hyper encoder/decoder (also known as hyperprior) 603 estimates the distribution of the quantized latent representation $\hat{y}$ to get the minimum rate achievable with a lossless entropy source coding.

The latent space can be understood as a representation of compressed data in which similar data points are closer together in the latent space. Latent space is useful for learning data features and for finding simpler representations of data for analysis.

The quantized latent representation T, $\hat{y}$ and the side information $\hat{z}$ of the hyperprior 3 are included into a bitstream 2 (are binarized) using arithmetic coding (AE).

Furthermore, a decoder 604 is provided that transforms the quantized latent representation to the reconstructed image $\hat{x}$, $\hat{x}=g(\hat{y})$. The signal $\hat{x}$ is the estimation of the input image x. It is desirable that x is as close to $\hat{x}$ as possible, in other words the reconstruction quality is as high as possible. However, the higher the similarity between $\hat{x}$ and x, the higher the amount of side information necessary to be transmitted. The side information includes bitstream1 and bitstream2 shown in FIG. 4, which are generated by the encoder and transmitted to the decoder. Normally, the higher the amount of side information, the higher the reconstruction quality. However, a high amount of side information means that the compression ratio is low. Therefore, one purpose of the system described in FIG. 4 is to balance the reconstruction quality and the amount of side information conveyed in the bitstream.

In FIG. 4 the component AE 605 is the Arithmetic Encoding (AE) module, which converts samples of the quantized latent representation $\hat{y}$ and the side information z into a binary representation bitstream 1. The samples of $\hat{y}$ and $\hat{z}$ might for example comprise integer or floating point numbers. One purpose of the arithmetic encoding module is to convert (via the process of binarization) the sample values into a string of binary digits (which is then included in the bitstream that may comprise further portions corresponding to the encoded image or further side information).

The arithmetic decoding (AD) 606 is the process of reverting the binarization process, where binary digits are converted back to sample values. The arithmetic decoding is provided by the arithmetic decoding module 606.

It is noted that the present disclosure is not limited to this particular framework. Moreover the present disclosure is not restricted to image or video compression, and can be applied to object detection, image generation, and recognition systems as well.

In FIG. 4 there are two sub networks concatenated to each other. A subnetwork in this context is a logical division between the parts of the total network. For example in the FIG. 4 the modules 601, 602, 604, 605 and 606 are called the "Encoder/Decoder" subnetwork. The "Encoder/Decoder" subnetwork is responsible for encoding (generating) and decoding (parsing) of the first bitstream "bitstream1". The second network in FIG. 4 comprises modules 603, 608, 609, 610 and 607 and is called "hyper encoder/decoder" subnetwork. The second subnetwork is responsible for generating the second bitstream "bitstream2". The purposes of the two subnetworks are different. The first subnetwork is responsible for:

- the transformation 601 of the input image x into its latent representation y (which is easier to compress than x),
- quantizing 602 the latent representation y into a quantized latent representation $\hat{y}$,
- compressing the quantized latent representation $\hat{y}$ using the AE by the arithmetic encoding module 605 to obtain bitstream "bitstream 1",".
- Parsing the bitstream 1 via AD using the arithmetic decoding module 606, and
- reconstructing 604 the reconstructed image ($\hat{x}$) using the parsed data.

The purpose of the second subnetwork is to obtain statistical properties (e.g. mean value, variance and correlations between samples of bitstream 1) of the samples of "bitstream1", such that the compressing of bitstream 1 by the first subnetwork is more efficient. The second subnetwork generates a second bitstream "bitstream2", which comprises the said information (e.g. mean value, variance and correlations between samples of bitstream1).

The second network includes an encoding part which comprises transforming 603 of the quantized latent representation $\hat{y}$ into side information z, quantizing the side information z into quantized side information $\hat{z}$, and encoding (e.g. binarizing) 609 the quantized side information $\hat{z}$ into bitstream2. In this example, the binarization is performed by an arithmetic encoding (AE). A decoding part of the second network includes arithmetic decoding (AD) 610, which transforms the input bitstream2 into decoded quantized side information $\hat{z}'$. The $\hat{z}'$ might be identical to $\hat{z}$, since the arithmetic encoding end decoding operations are lossless compression methods. The decoded quantized side information $\hat{z}'$ is then transformed 607 into decoded side information $\hat{y}'$. $\hat{y}'$ represents the statistical properties of $\hat{y}$ (e.g. mean value of samples of $\hat{y}$, or the variance of sample values or like). The decoded latent representation $\hat{y}'$ is then provided to the above-mentioned Arithmetic Encoder 605 and Arithmetic Decoder 606 to control the probability model of $\hat{y}$.

The FIG. 4 describes an example of VAE (variational auto encoder), details of which might be different in different implementations. For example in a specific implementation additional components might be present to more efficiently obtain the statistical properties of the samples of bitstream 1. In one such implementation a context modeler might be present, which targets extracting cross-correlation information of the bitstream 1. The statistical information provided by the second subnetwork might be used by AE (arithmetic encoder) 605 and AD (arithmetic decoder) 606 components.

The FIG. 4 depicts the encoder and decoder in a single figure. As is clear to those skilled in the art, the encoder and the decoder may be, and very often are, embedded in mutually different devices.

Figure 7:
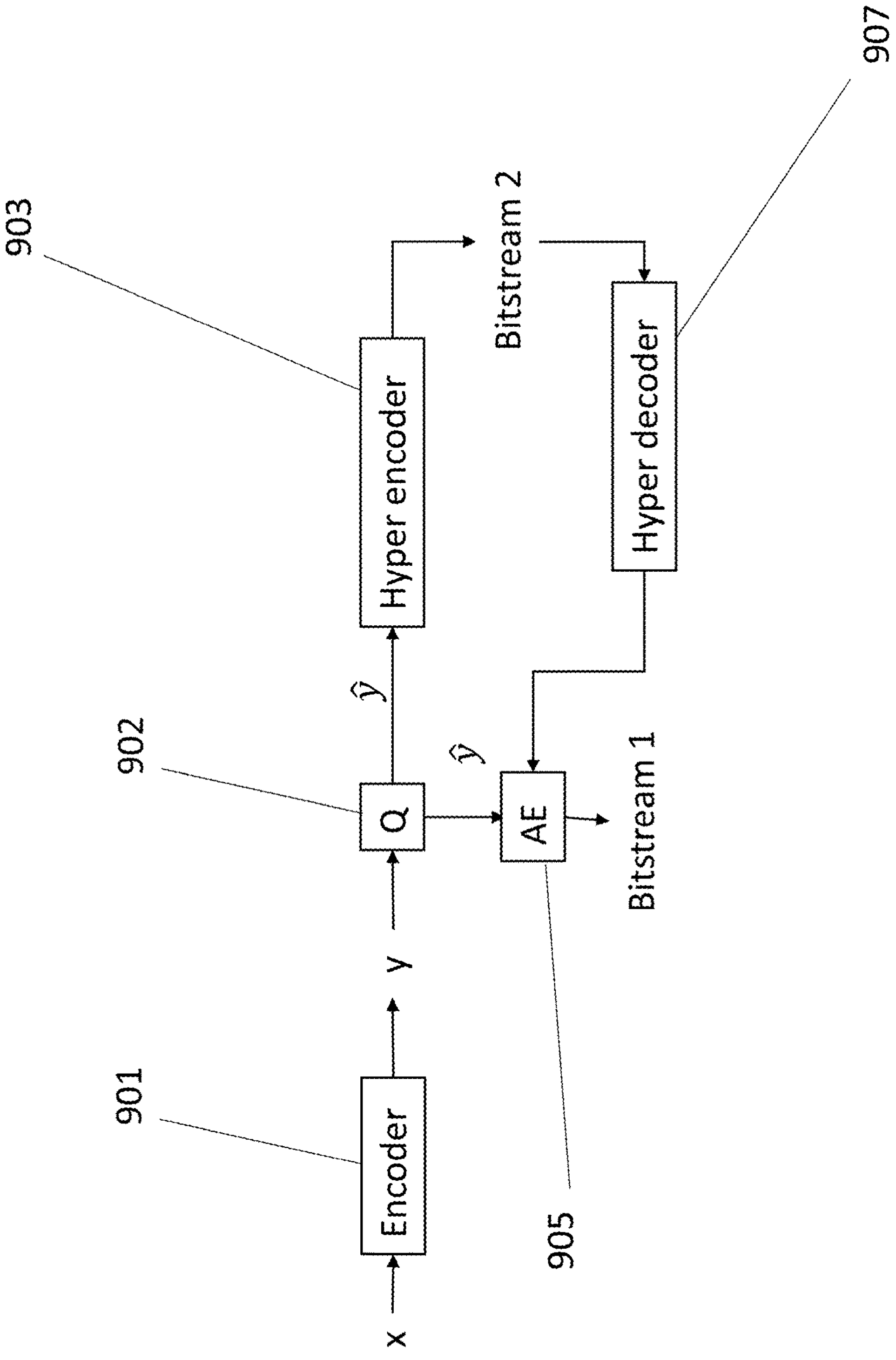
FIG. 7 shows components of an encoder according to FIG. 4 in accordance with one embodiment.
Figure 8:
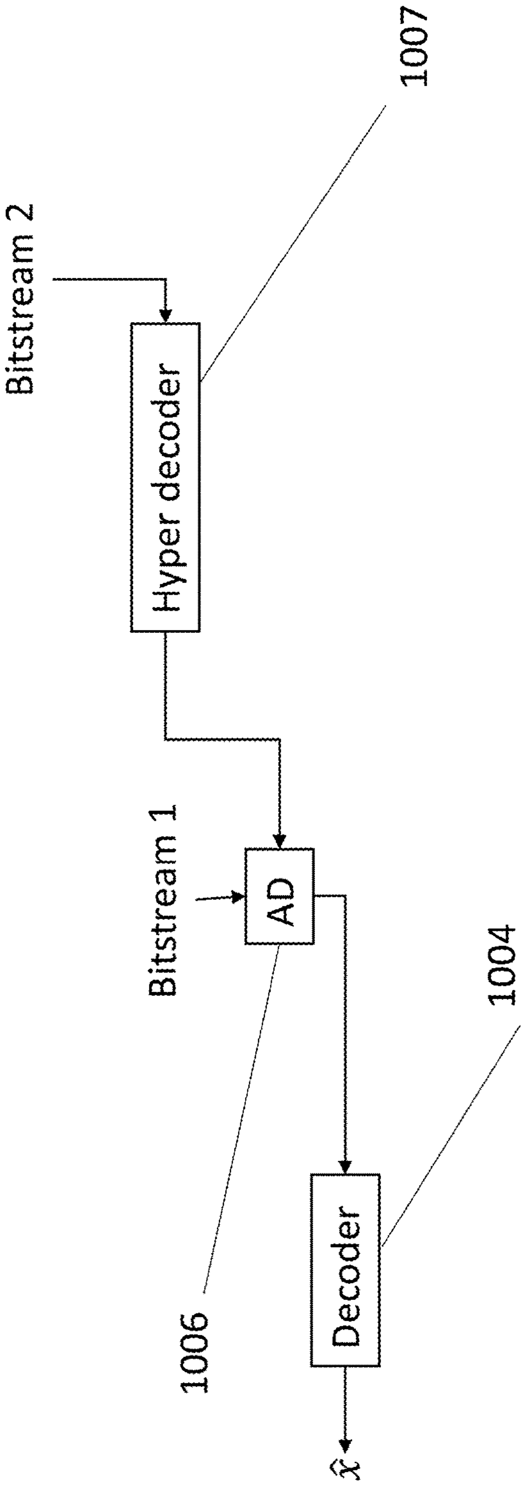
FIG. 8 shows components of a decoder according to FIG. 4 in accordance with one embodiment.

FIG. 7 depicts the encoder and FIG. 8 depicts the decoder components of the VAE framework in isolation. As input, the encoder receives, according to some embodiments, a picture. The input picture may include one or more channels, such as color channels or other kind of channels, e.g. depth channel or motion information channel, or the like. The output of the encoder (as shown in FIG. 7) is a bitstream1 and a bitstream2. The bitstream1 is the output of the first sub-network of the encoder and the bitstream2 is the output of the second subnetwork of the encoder. Both, bitstream 1 and bitstream2 may form together the bitstream as output by the NN.

Similarly in FIG. 8, the two bitstreams, bitstream1 and bitstream2, are received as input and $\hat{x}$, which is the reconstructed (decoded) image, is generated at the output.

As indicated above, the VAE can be split into different logical units that perform different actions. This is exemplified in FIGS. 7 and 8 so that FIG. 7 depicts components that participate in the encoding of a signal, like a video and provided encoded information. This encoded information is then received by the decoder components depicted in FIG. 8 for encoding, for example. It is noted that the components of the encoder and decoder denoted with numerals 9xx and 10xx may correspond in their function to the components referred to above in FIG. 4 and denoted with numerals 6xx.

Specifically, as is seen in FIG. 7, the encoder comprises the encoder 901 that transforms an input x into a signal y which is then provided to the quantizer 902. The quantizer 902 provides information to the arithmetic encoding module 905 and the hyper encoder 903. The hyper encoder 903 provides the bitstream2 already discussed above to the hyper decoder 907 that in turn signals information to the arithmetic encoding module 605.

The encoding can make use of a convolution, as will be explained in further detail below with respect to FIG. 19.

The output of the arithmetic encoding module is the bitstream1. The bitstream1 and bitstream2 are the output of the encoding of the signal, which are then provided (transmitted) to the decoding process.

Although the unit 901 is called "encoder", it is also possible to call the complete subnetwork described in FIG. 7 as "encoder". The process of encoding in general means the unit (module) that converts an input to an encoded (e.g. compressed) output. It can be seen from FIG. 7, that the unit 901 can be actually considered as a core of the whole subnetwork, since it performs the conversion of the input x into y, which is the compressed version of the x. The compression in the encoder 901 may be achieved, e.g. by applying a neural network, or in general any processing network with one or more layers. In such network, the compression may be performed by cascaded processing including downsampling which reduces size and/or number of channels of the input. Thus, the encoder may be referred to, e.g. as a neural network (NN) based encoder, or the like.

The remaining parts in the figure (quantization unit, hyper encoder, hyper decoder, arithmetic encoder/decoder) are all parts that either improve the efficiency of the encoding process or are responsible for converting the compressed output y into a series of bits (bitstream). Quantization may be provided to further compress the output of the NN encoder 901 by a lossy compression. The AE 905 in combination with the hyper encoder 903 and hyper decoder 907 used to configure the AE 905 may perform the binarization which may further compress the quantized signal by a lossless compression. Therefore, it is also possible to call the whole subnetwork in FIG. 7 an "encoder".

A majority of Deep Learning (DL) based image/video compression systems reduce dimensionality of the signal before converting the signal into binary digits (bits). In the VAE framework for example, the encoder, which is a non-linear transform, maps the input image x into y, where y has a smaller width and height than x. Since the y has a smaller width and height, hence a smaller size, the (size of the) dimension of the signal is reduced, and, hence, it is easier to compress the signal y. It is noted that in general, the encoder does not necessarily need to reduce the size in both (or in general all) dimensions. Rather, some exemplary implementations may provide an encoder which reduces size only in one (or in general a subset of) dimension.

Figure 5:
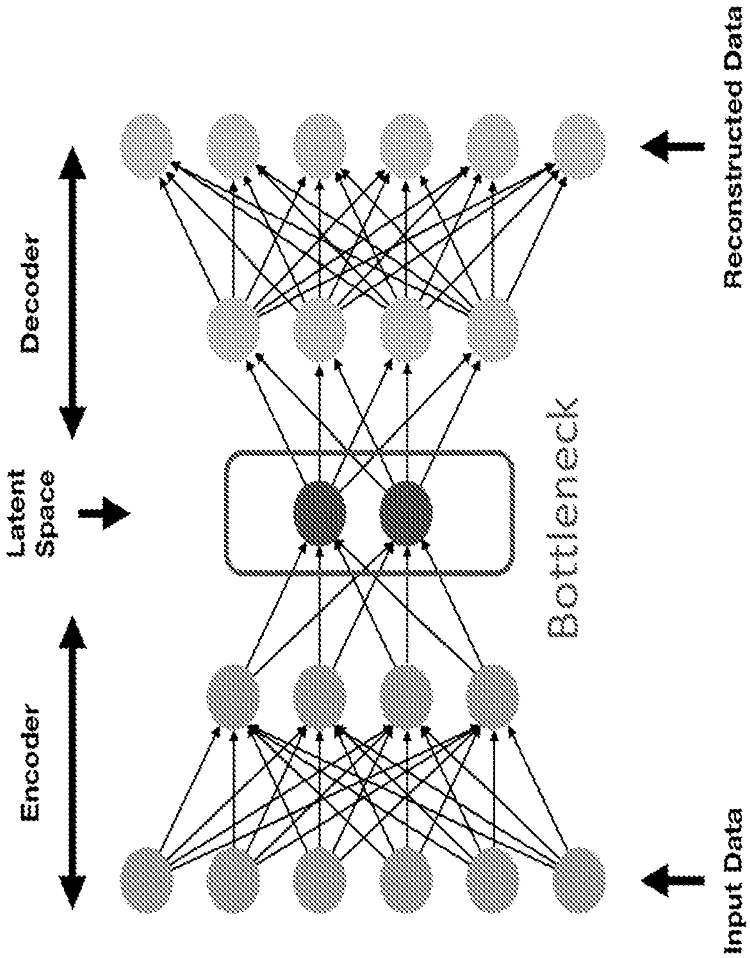
FIG. 5 shows a schematic depiction of encoding and decoding of an input.

The general principle of compression is exemplified in FIG. 5. The latent space, which is the output of the encoder and input of the decoder, represents the compressed data. It is noted that the size of the latent space may be much smaller than the input signal size. Here, the term size may refer to resolution, e.g. to a number of samples of the feature map(s) output by the encoder. The resolution may be given as a product of number of samples per each dimension (e.g. width×heighth×number of channels of an input image or of a feature map).

The reduction in the size of the input signal is exemplified in the FIG. 5, which represents a deep-learning based encoder and decoder. In the FIG. 5, the input image x corresponds to the input Data, which is the input of the encoder. The transformed signal y corresponds to the Latent Space, which has a smaller dimensionality or size in at least one dimension than the input signal. Each column of circles represent a layer in the processing chain of the encoder or decoder. The number of circles in each layer indicate the size or the dimensionality of the signal at that layer.

One can see from the FIG. 5 that the encoding operation corresponds to a reduction in the size of the input signal, whereas the decoding operation corresponds to a reconstruction of the original size of the image.

One of the methods for reduction of the signal size is downsampling. Downsampling is a process where the sampling rate of the input signal is reduced. For example if the input image has a size of h and w, and the output of the downsampling is h2 and w2, at least one of the following holds true:

$h2<h$ $w2<w$

The reduction in the signal size usually happens step by step along the chain of processing layers, not all at once. For example if the input image x has dimensions (or size of dimensions) of h and w (indicating the height and the width), and the latent space y has dimensions h/16 and w/16, the reduction of size might happen at 4 layers during the encoding, wherein each layer reduces the size of the signal by a factor of 2 in each dimension.

Some deep learning based video/image compression methods employ multiple downsampling layers. As an example the VAE framework, FIG. 6, utilizes 6 downsampling layers that are marked with 801 to 806. The layers that include downsampling is indicated with the downward arrow in the layer description. The layer description "Conv N×5×5/2↓" means that the layer is a convolution layer, with N channels and the convolution kernel is 5×5 in size. As stated, the 2↓ means that a downsampling with a factor of 2 is performed in this layer. Downsampling by a factor of 2 results in one of the dimensions of the input signal being reduced by half at the output. In FIG. 6, the 2↓ indicates that both width and height of the input image is reduced by a factor of 2. Since there are 6 downsampling layers, if the width and height of the input image 814 (also denoted with x) is given by w and h, the output signal i 813 is has width and height equal to w/64 and h/64 respectively. Modules denoted by AE and AD are arithmetic encoder and arithmetic decoder, which are explained above already with respect to FIGS. 4, 7 and 8. The arithmetic encoder and decoder are specific implementations of entropy coding. AE and AD (as part of the component 813 and 815) can be replaced by other means of entropy coding. In information theory, an entropy encoding is a lossless data compression scheme that is used to convert the values of a symbol into a binary representation which is a revertible process. Also the "Q" in the figure corresponds to the quantization operation that was also referred to above in relation to FIG. 4 and is further explained above in the section "Quantization". Also, the quantization operation and a corresponding quantization unit as part of the component 813 or 815 is not necessarily present and/or can be replaced with another unit.

In FIG. 6, there is also shown the decoder comprising upsampling layers 807 to 812. A further layer 820 is provided between the upsampling layers 811 and 810 in the processing order of an input that is implemented as convolutional layer but does not provide an upsampling to the input received. A corresponding convolutional layer 830 is also shown for the decoder. Such layers can be provided in NNs for performing operations on the input that do not alter the size of the input but change specific characteristics. However, it is not necessary that such a layer is provided.

According to some embodiments, the layers 801 to 804 of the encoder may be considered one sub-network of the encoder and the layers 830, 805 and 806 may be considered to be a second sub-network of the encoder. Similarly, the layers 812, 811 and 820 may be (in processing order through the decoder) considered a first sub-network of the decoder while the layers 810, 809, 808, 807 may be considered a second-subnetwork of the decoder. Sub-networks may be considered to be accumulations of layers of the neural network, specifically of downsampling layers of the encoder and upsampling layers of the decoder. The accumulation could be arbitrary. However, it may be provided that a sub-network is an accumulation of layers of the neural network that process an input and provide, after processing the input, an output bitstream or that receive a bitstream as input that is potentially not received by all other sub-networks of the neural network. In this context, the sub-networks of the encoder are the ones that output the first bitstream (first sub-network) and the second bitstream (second sub-network). The sub-networks of the decoder are those that receive the second bitstream (first sub-network) and the first bitstream (second sub-network).

This relation of the sub-networks is not mandatory. For example, layers 801 and 802 may be one sub-network of the encoder and layers 803 and 804 may be considered another sub-network of the encoder. Various other configurations are possible.

When seen in the processing order of bitstream2 through the decoder, the upsampling layers are run through in reverse order, i.e. from upsampling layer 812 to upsampling layer 807. Each upsampling layer is shown here to provide an upsampling with an upsampling ratio of 2, which is indicated by the ↑. It is, of course, not necessarily the case that all upsampling layers have the same upsampling ratio and also other upsampling ratios like 3, 4, 8 or the like may be used. The layers 807 to 812 are implemented as convolutional layers (conv). Specifically, as they may be intended to provide an operation on the input that is reverse to that of the encoder, the upsampling layers may apply a deconvolution operation to the input received so that its size is increased by a factor corresponding to the upsampling ratio. However, the present disclosure is not generally limited to deconvolution and the upsampling may be performed in any other manner such as by bilinear interpolation between two neighboring samples, or by nearest neighbor sample copying, or the like.

Extending this to the above explained accumulation of layers to a sub-network, it may be considered that a sub-network has a combined downsampling ratio (or combined upsampling ratio) associated with it, where the combined downsampling ratio and/or the combined upsampling ratio may be obtained from the downsampling ratios and/or upsampling ratios of the downsampling layers or upsampling layers in the respective sub-network.

At the encoder, for example, the combined downsampling ratio of a sub-network may be obtained from calculating the product of the downsampling ratios of all downsampling layers of the sub-network. Correspondingly, at the decoder, the combined upsampling ratio of a sub-network of the decoder may be obtained from calculating the product of the upsampling ratios of all upsampling layers. Other alternatives, like for example obtaining the combined upsampling ratio from a table using the upsampling ratios of the upsampling layers of the respective sub-network, as already mentioned above, can also be applied to obtain the combined upsampling ratio.

In the first subnetwork, some convolutional layers (801 to 803) are followed by generalized divisive normalization (GDN) at the encoder side and by the inverse GDN (IGDN) at the decoder side. In the second subnetwork, the activation function applied is ReLu. It is noted that the present disclosure is not limited to such implementation and in general, other activation functions may be used instead of GDN or ReLu.

The image and video compression systems in general cannot process arbitrary input image sizes. The reason is that some of the processing units (such as transform unit, or motion compensation unit) in a compression system operate on a smallest unit, and if the input image size is not integer multiple of the smallest processing unit, it is not possible to process the image.

As an example, HEVC specifies four transform units (TUs) sizes of 4×4, 8×8, 16×16, and 32×32 to code the prediction residual. Since the smallest transform unit size is 4×4, it is not possible to process an input image that has a size of 3×3 using an HEVC encoder and decoder. Similarly if the image size is not a multiple of 4 in one dimension, it is also not possible to process the image, since it is not possible to partition the image into sizes that are processable by the valid transform units (4×4, 8×8, 16×16, and 32×32). Therefore, it is a requirement of the HEVC standard that the input image must be a multiple of a minimum coding unit size, which is 8×8. Otherwise the input image is not compressible by HEVC. Similar requirements have been posed by other codecs, too. In order to make use of existing hardware or software, or in order to maintain some interoperability or even portions of the existing codecs, it may be desirable to maintain such limitation. However, the present disclosure is not limited to any particular transform block size.

Some DNN (deep neural network) or NN (neural network) based image and video compression systems utilize multiple downsampling layers. In FIG. 6, for example, four downsampling layers are comprised in the first subnetwork (layers 801 to 804) and two additional downsampling layers are comprised in the second subnetwork (layers 805 to 806). Therefore, if the size of the input image is given by w and h respectively (indicating the width and the height), the output of the first subnetwork is w/16 and h/16, and the output of the second network is given by w/64 and h/64.

The term "deep" in deep neural networks usually refers to the number of processing layers that are applied sequentially to the input. When the number of the layers is high, the neural network is called a deep neural network, though there is no clear description or guidance on which networks should be called a deep network. Therefore for the purposes of this application there is no major difference between a DNN and an NN. DNN may refer to a NN with more than one layer.

During downsampling, for example in the case of convolutions being applied to the input, fractional (final) sizes for the encoded picture can be obtained in some cases. Such fractional sizes cannot be reasonably processed by a subsequent layer of the neural network or by a decoder.

Stated differently, some downsampling operations (like convolutions) may expect (e.g. by design) that the size of the input to a specific layer of the neural network fulfills specific conditions so that the operations performed within a layer of the neural network performing the downsampling or following the downsampling are still well defined mathematical operations. For example, for a downsampling layer having a downsampling ratio $r>1$, $r \in \mathbb{N}$ that reduces the size of the input in at least one dimension by the ratio r, a reasonable output is obtained if the input has a size in this dimension that is an integer multiple of the downsampling ratio r. The downsampling by r means that the number of input samples in one dimension (e.g. width) or more dimensions (e.g. width and height) is divided by two to obtain number of output samples.

To provide a numeric example, a downsampling ratio of a layer may be 4. A first input has a size 512 in the dimension to which the downsampling is applied. 512 is an integer multiple of 4 because 128×4=512. Processing of the input can thus be performed by the downsampling layer resulting in a reasonable output. A second input may have a size of 513 in the dimension to which the downsampling is applied. 513 is not an integer multiple of 4 and this input can thus not be processed reasonably by the downsampling layer or a subsequent downsampling layer if they are, e.g. by design, expecting certain (e.g. 512) input size. In view of this, in order to ensure that an input can be processed by each layer of the neural network in a reasonable way (in compliance with a predefined layer input size) even if the size of the input is not always the same, a rescaling may be applied before processing the input by the neural network. This rescaling comprises changing or adapting the actual size of the input to the neural network (e.g. to the input layer of the neural network), so that it is fulfilling the above condition with respect to all of the downsampling layers of the neural network. This rescaling is done by increasing or decreasing a size of the input in the dimension to which the downsampling is applied so that the size $S=K\Pi_i r_i$, where $r_i$ are the downsampling ratios of the downsampling layers and K is an integer greater than zero. In other words, the input size S of the input picture (signal) in the downsampling direction is adapted to be an integer multiple of a product of all downsampling ratios applied to the input picture (signal) in the network processing chain in the downsampling direction (dimension).

Thereby, the size of the input to the neural network has a size that ensures that each layer can process its respective input, e.g. in compliance with a layer's predefined input size configuration.

By providing such rescaling, however, there are limits to the reduction in the size of a picture that is to be encoded and, correspondingly, the size of the encoded picture that can be provided to a decoder for, for example, reconstructing the encoded information also has a lower limit. Furthermore, with the approaches provided so far, a significant amount of entropy may be added to the bitstream (when increasing its size by the rescaling) or a significant amount of information loss can occur (if reducing the size of the bitstream by the rescaling). Both can have negative influence on the quality of the bitstream after the decoding.

It is, therefore, difficult to obtain high quality of encoded/decoded bitstreams and the data they represent while, at the same time, providing encoded bitstreams with reduced size.

Since the size of the output of a layer in a network cannot be fractional (there needs to be an integer number of rows and columns of samples), there is a restriction in the input image size. In FIG. 6, for ensuring reliable processing, the input image size may be resized to or may already be an integer multiple of 64 in both horizontal and vertical directions. Otherwise, the output of the second sub-network will not be integer.

In order to solve this problem, it would be possible to use the method of padding the input image with zeros to make it a multiple of 64 samples in each direction. According to this solution the input image size can be extended in width and height by the following amount:

$$w_{diff} = \mathrm{Int}\left(\frac{w+63}{64}\right)\cdot 64 - w$$

$$h_{diff} = \mathrm{Int}\left(\frac{h+63}{64}\right)\cdot 64 - h$$

where "Int" is an integer conversion. The integer conversion may calculate the quotient of a first value a and a second value b and may then provide an output that ignores all fractional digits, thus only being an integer number. The newly generated sample values can be set equal to 0.

The other possibility of solving the issue described above is to crop the input image, i.e. discard rows and columns of samples from ends of the input image, to make the input image size a multiple of 64 samples. The minimum amount of rows and samples that needs to be cropped out can be calculated as follows:

$$w_{diff} = w - \mathrm{Int}\left(\frac{w}{64}\right)\cdot 64$$

$$h_{diff} = h - \mathrm{Int}\left(\frac{h}{64}\right)\cdot 64$$

where $w_{diff}$ and $w_{diff}$ correspond to an amount of sample rows and columns respectively, that need to be discarded from sides of the image.

Using the above, the new size of the input image in horizontal ($h_{new}$) and vertical ($w_{new}$) dimensions is as follows:

In the case of padding:

$h_{new}=h+h_{diff}$ $w_{new}=w+w_{diff}$

In the case of cropping:

$h_{new}=h-h_{diff}$ $w_{new}=w+w_{diff}$

Figure 10:
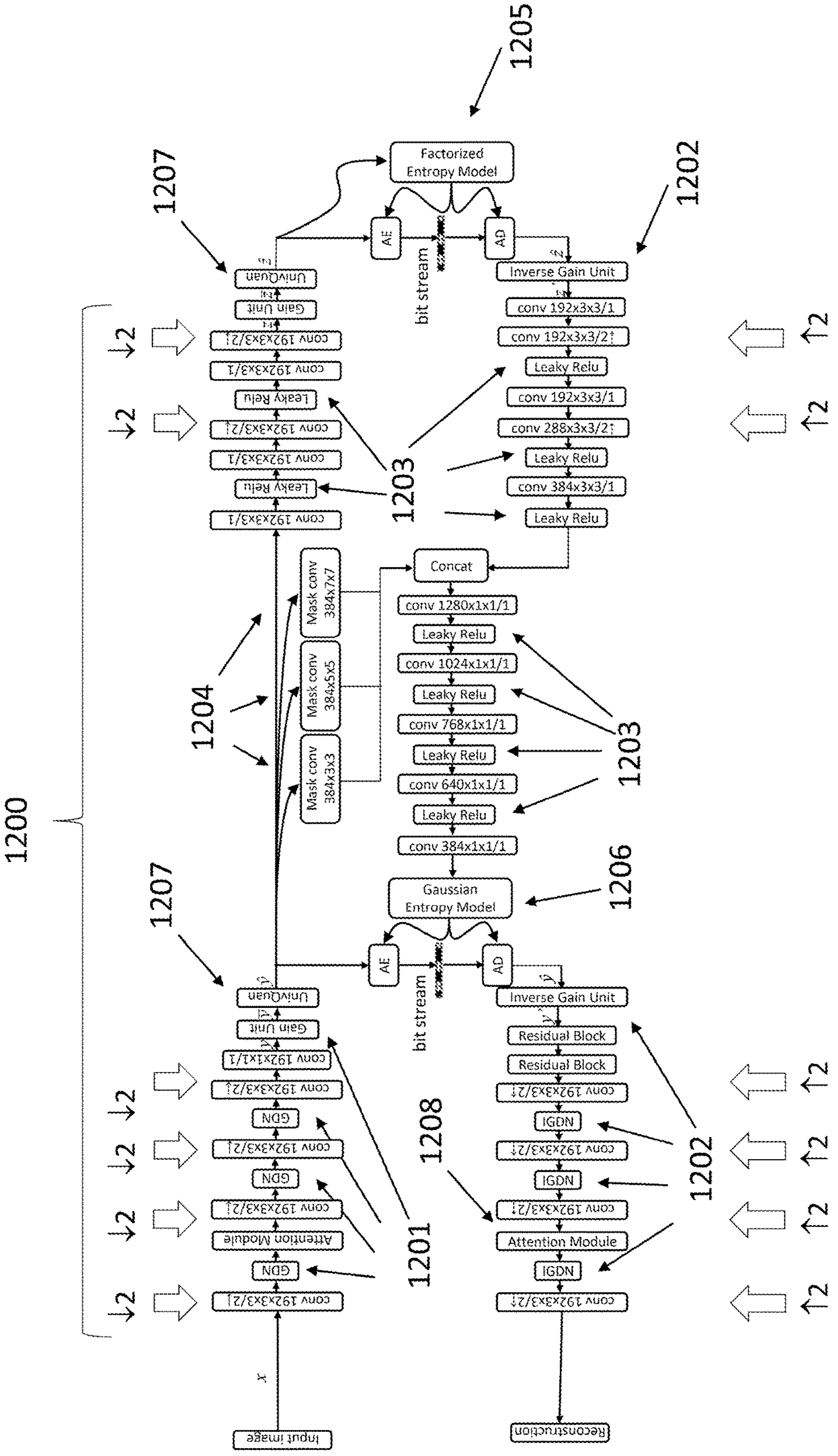
FIG. 10 shows an encoder and a decoder.
Figure 11:
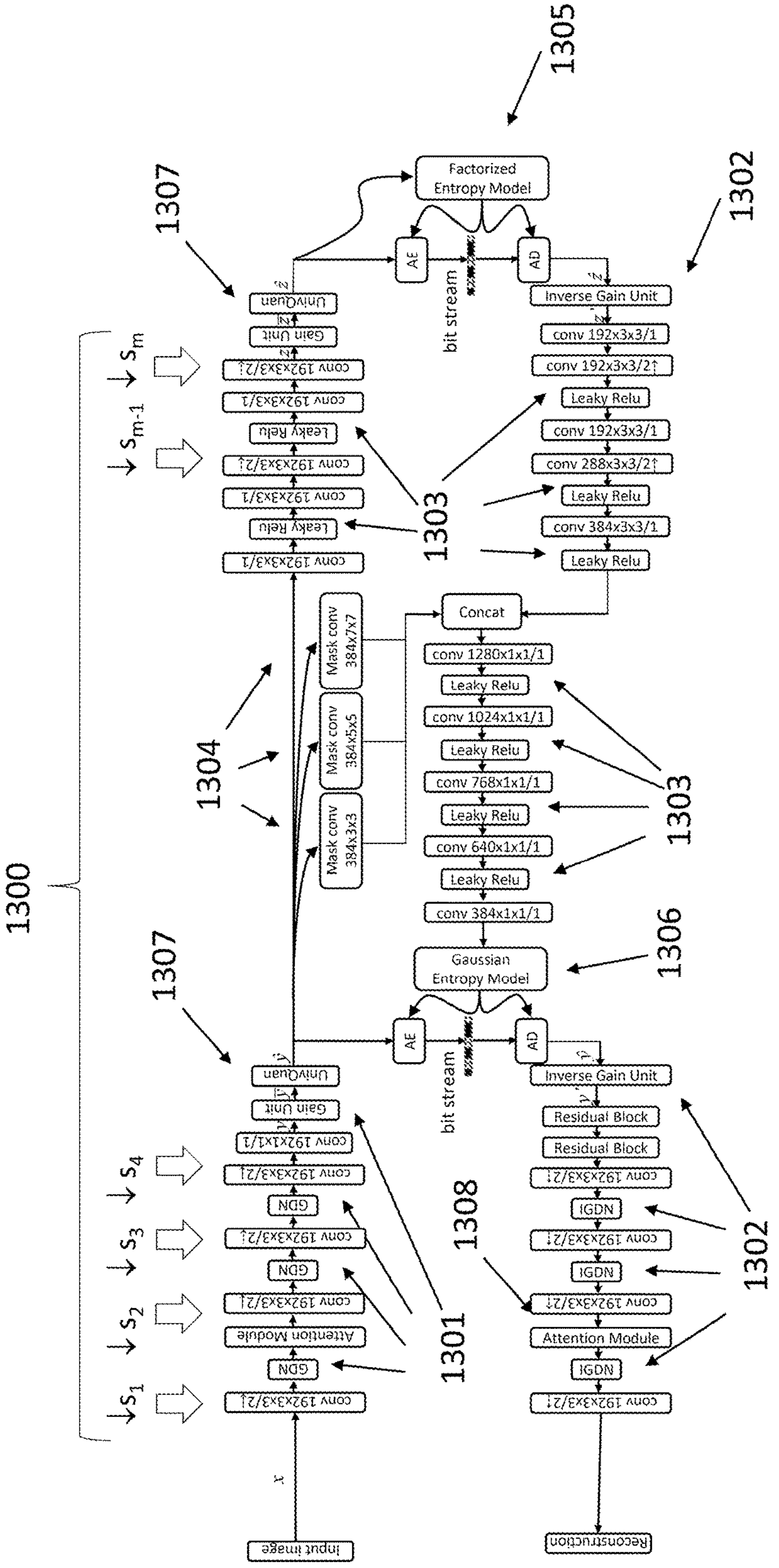
FIG. 11 shows a further encoder and a further decoder.

This is also shown in the FIGS. 10 and 11. In FIG. 10, it is shown that the encoder and the decoder (together denoted with 1200) may comprise a number of downsampling and upsampling layers. Each layer applies a downsampling by a factor of 2 or an upsampling by a factor of 2. Furthermore, the encoder and the decoder can comprise further components, like a generalized divisive normalization (GDN) 1201 at the encoder side and by the inverse GDN (IGDN) 1202 at the decoder side. Furthermore, both the encoder and the decoder may comprise one or more ReLus, specifically, leaky ReLus 1203. There can also be provided a factorized entropy model 1205 at the encoder and a Gaussian entropy model 1206 at the decoder. Moreover, a plurality of convolution masks 1204 may be provided. Moreover, the encoder includes, in the embodiments of FIGS. 10 and 11, a universal quantizer (UnivQuan) 1207 and the decoder comprises an attention module 1208. For ease of reference, functionally corresponding components have corresponding numerals in FIG. 11.

The total number of downsampling operations and strides defines conditions on the input channel size, i.e. the size of the input to the neural network.

Here, if input channel size is an integer multiple of 64=2×2×2×2×2×2, then the channel size remains integer after all proceeding downsampling operations. By applying corresponding upsampling operations in the decoder during the upsampling, and by applying the same rescaling at the end of the processing of the input through the upsampling layers, the output size is again identical to the input size at the encoder.

Thereby, a reliable reconstruction of the original input is obtained.

In FIG. 11, a more general example of what is explained in FIG. 10 is shown. This example also shows an encoder and a decoder, together denoted with 1300. The m downsampling layers (and corresponding upsampling layers)

have downsampling ratios $s_i$ and corresponding upsampling ratios. Here, if the input channel size is an integer multiple of $$S = \prod_{i=1}^{m} s_i,$$

the channel size remains integer after all m proceeding (also referred to as consecutive or subsequent or cascaded) downsampling operations. A corresponding rescaling of the input before processing it by the neural network in the encoder ensures that the above equation is fulfilled. In other words, the input channel size in the downsampling direction is a product of all downsampling ratios applied to the input by the respective m downsampling layers of the (sub-network).

This mode of changing the size of the input as explained above may still have some drawbacks:

In FIG. 6, the bitstreams indicated by "bitstream 1" and "bitstream 2" have sizes equal to:

$$A\left(\frac{h_{new}}{16}\right)\left(\frac{w_{new}}{16}\right) \text{ and } B\left(\frac{h_{new}}{64}\right)\left(\frac{w_{new}}{64}\right)$$

when the rescaling is applied before processing the input with the neural network and when the rescaling is applied in a way that allows processing the input without further rescaling between layers of the neural network, respectively. A and B are scalar parameters that describe the compression ratio. The higher the compression ratio, the smaller the numbers A and B. The total size of the bitstream is therefore given as $$A\left(\frac{h_{new}}{16}\right)\left(\frac{w_{new}}{16}\right) + B\left(\frac{h_{new}}{64}\right)\left(\frac{w_{new}}{64}\right).$$

Since the goal of the compression is to reduce the size of the bitstream while keeping the quality of the reconstructed image high, it is apparent that the $h_{new}$ and $w_{new}$ should be as small as possible to reduce the bitrate.

Therefore, the problem of "padding with zero" is the increase in the bitrate due to an increase in the input size. In other words, the size of the input image is increased by adding redundant data to the input image, which means that more side information must be transmitted from the encoder to the decoder for reconstruction of the input signal. As a result, the size of the bitstream is increased.

As an example, using the encoder/decoder pair in FIG. 6, if the input image has a size 416×240, which is the image size format commonly known as WQVGA (Wide Quarter Video Graphics Array), the input image must be padded to be equal to size 448×256, which equals a 15% increase in bitrate due to inclusion of redundant data.

The problem with the second approach (cropping of the input image) is the loss of information. Since the goal of compression and decompression is the transmission of the input signal while keeping the fidelity high, it is against the purpose to discard part of the signal. Therefore, cropping is not advantageous unless it is known that there are some parts of the input signal that are unwanted, which is usually not the case.

According to one embodiment, the size adjustment of the input image is performed in front of every sub-network of the DNN based picture or video compression system as explained above with relation to FIG. 6. More specifically, if a combined downsampling ratio of a sub-network is, for example, 2 (input size is halved at the output of the sub-network), input resizing is applied to the input of the sub-network if it has an odd number of sample rows or columns and padding is not applied if the number of sample rows or columns are even (multiple of 2).

Additionally, a resizing operation can be applied at the end, e.g. at the output of an upsampling layer, if a corresponding downsampling layer has applied resizing at the (its) input. The corresponding layer of a downsampling layer can be found by counting the number of upsampling layers starting from the reconstructed image and counting the number of downsampling layers starting from the input image. This is exemplified by FIG. 18, wherein upsampling layer 1 and downsampling layer 1 are corresponding layers, and upsampling layer 2 and downsampling layer 2 are corresponding layers and so on.

The resizing operation applied at the input of a downsampling layer (or corresponding sub-network comprising one or more downsampling layers) and the resizing operation applied at the output of an upsampling layer (or corresponding sub-network comprising one or more upsampling layers) are complementary, such that the size of the data at the output of both is kept the same.

Figure 9:
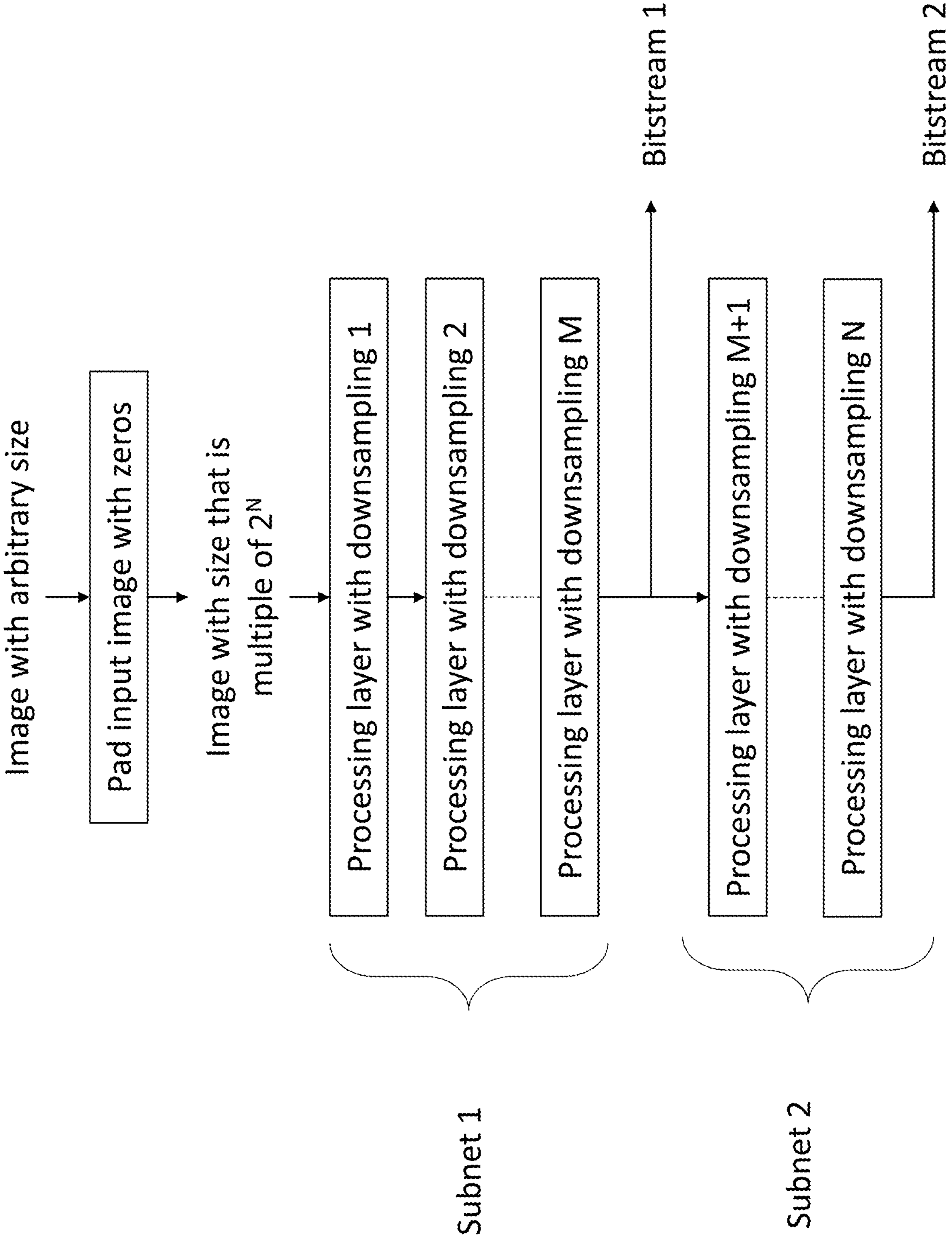
FIG. 9 shows rescaling and processing of an input.

As a result, the increase in the size of the bitstreams is minimized. An exemplary embodiment can be explained with reference to FIG. 12, in contrast with FIG. 9, which describes another approach. In FIG. 9, the resizing of the input is done before the input is provided to the DNN, and is done so that the resized input can be processed through the whole DNN. The example shown in FIG. 9 may be realized (implemented) with the encoder/decoder as described in FIG. 6.

Figure 12:
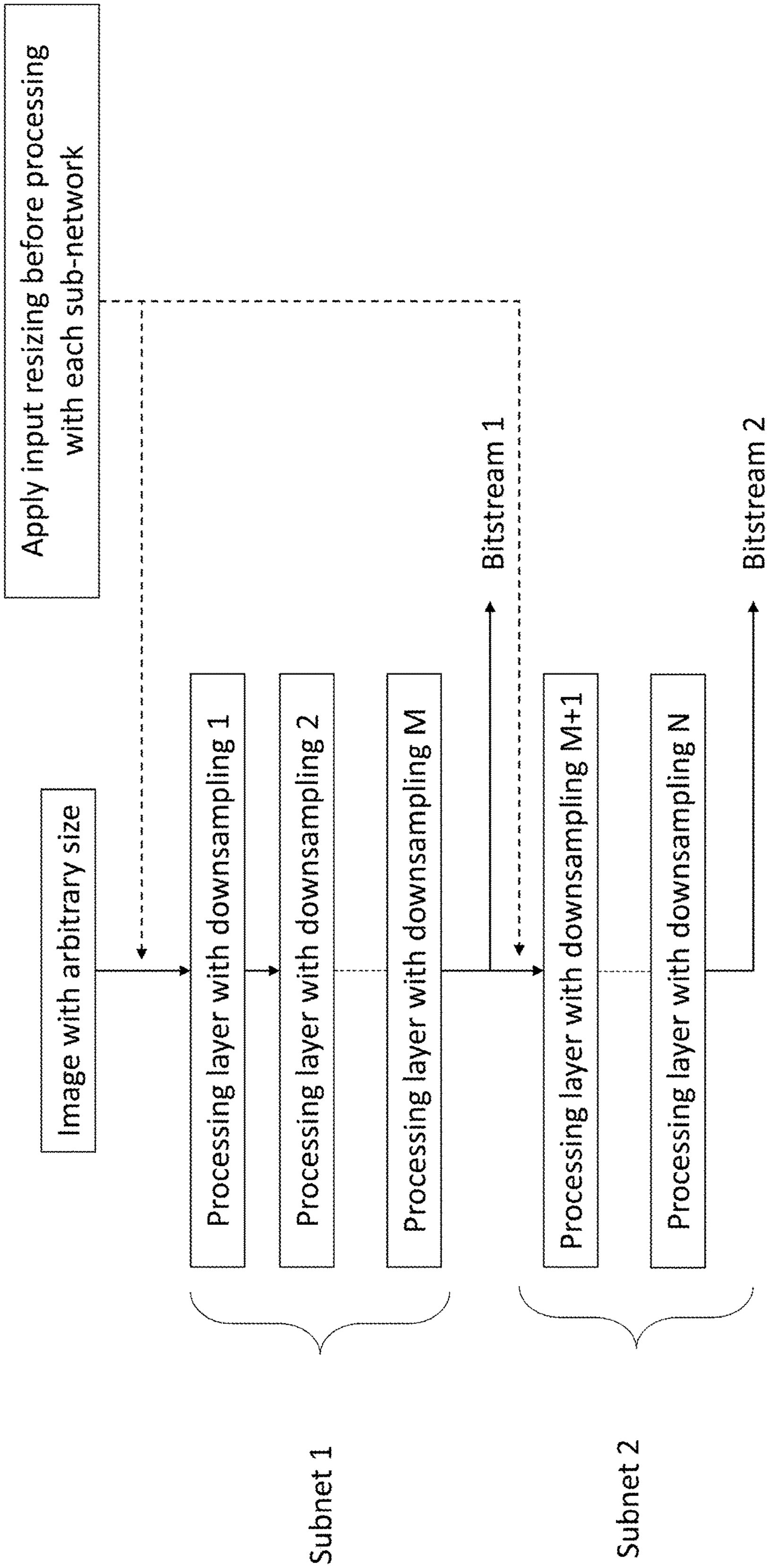
FIG. 12 shows a rescaling and processing of an input in accordance with one embodiment.

In FIG. 12, an input image having an arbitrary size is provided to the neural network. The neural network in this embodiment comprises N downsampling layers, each layer i (1<=i<=N) having a downsampling ratio $r_i$. The "<=" denotes smaller than or equal to. The downsampling ratios $r_i$ are not necessarily the same for different values of i, but, in some embodiments, may be all equal and can, for example, all be $r_i$=r=2. In FIG. 12, the downsampling layers 1 to M are summarized as subnet 1 of downsampling layers. The subnet 1 (or sub-network 1) provides as output the bitstream1. Associated with the sub-network 1, a combined downsampling ratio obtained from the product of downsampling ratios of the downsampling layers may be provided. As all downsampling ratios are equal to 2, the sub-network 1 has a combined downsampling ratio of $R_1=2^M$. For example, assuming M=4, then the combined downsampling ratio of the sub-network 1 is 16, because $2^4=16$. The second subnet 2 (or sub-network 2), comprising the layers M+1 to N provides as output the bitstream2. Also the second sub-network has a combined downsampling ratio associated therewith which may be denoted with $R_2$. The combined downsampling ratio $R_2$ may be $R_2=2^{N-M}$.

In this embodiment, before an input to a sub-network, for example the sub-network 2, is provided to the sub-network, but after it has been processed by the previous sub-network (in this case, the sub-network 1), the input is resized by applying a resizing operation so that the input to the sub-network 2 has a size that is an integer multiple of $R_2$. $R_2$ represents the combined downsampling ratio of the sub-network 2 and may be a preset value and may thus be already available at the encoder. In this embodiment, this resizing operation is performed before each sub-network so that the above condition is fulfilled for the specific sub-network and its respective combined downsampling ratio. In other words, the size S of the input is adapted to or set as an integer multiple of the combined downsampling ratio of the following (following the downsampling in the sequence of processing) sub-network.

In FIG. 9, the input image is padded (which is a form of image resizing) to account for all downsampling layers of all sub-networks (shown here for ease of explanation only) that are going to process the data one after the other. In FIG. 9, the downsampling ratio is exemplarily selected to be equal to 2 for all downsampling layers for demonstration purpose. In this case, since there are N layers that perform downsampling with a ratio of 2, the input image size is adjusted by padding (with zeros) to be an integer multiple of $2^N$. It is noted that herein, an integer "multiple" may still be equal to 1, i.e. the multiple has the meaning of multiplication (e.g. by one or more) rather than the meaning of a plurality.

An embodiment is demonstrated in FIG. 12. In the FIG. 12, input resizing is applied in front of each sub-network. The input is resized to be an integer multiple of the combined downsampling ratio of each sub-network. For example, if the combined downsampling ratio of a sub-network is 9:1 (input size:output size), the input of the layer is resized to become a multiple of 9.

Some embodiments can be applied to FIG. 6 also. In FIG. 6, there are 6 layers with downsampling, namely the layers 801, 802, 803, 804, 805 and 806. All of the downsampling layers may have a factor of 2. According to one embodiment, the input resizing is applied before each sub-network as explained in relation to FIG. 6 above. In FIG. 6 the resizing is applied also after each sub-network out of the sub-networks of the decoder which comprise corresponding upsampling layers (807, 808, 809, 810, 811 and 812) in a corresponding manner (which is explained in the above paragraph). This means that a resizing applied before a sub-network comprising one or more downsampling layers at a specific order or position in the neural network of the encoder is applied at a corresponding position in the decoder.

In some embodiments, two options for rescaling the input may exist and one of them may be chosen depending, for example, on the circumstance or a condition as will be explained further below. These embodiments are described with reference to FIGS. 13 to 15.

The first option 1501 may comprise padding the input, for example with zeros or redundant information from the input itself in order to increase the size of the input to a size that matches an integer multiple of the combined downsampling ratio. At the decoder side, in order to rescale, cropping may be used in this option in order to reduce the size of the input to a size that matches, for example, a target input size of the proceeding sub-network.

This option can be implemented computationally efficient, but it is only possible to increase the size at the encoder side.

The second option 1502 may utilize interpolation at the encoder and interpolation at the decoder for rescaling/resizing the input. This means, interpolation may be used to increase the size of an input to an intended size, like an integer multiple of the combined downsampling ratio of a proceeding sub-network of the encoder, or a target input size of a proceeding sub-network of the decoder, or interpolation may be used to decrease the size of the input to an intended size, like an integer multiple of the combine downsampling ratio of a proceeding sub-network comprising at least one downsampling layer, or a target input size of a proceeding sub-network comprising at least one upsampling layer. Thereby, it is possible to apply resizing at the encoder by either increasing or decreasing the size of the input. Further, in this option 1502, different interpolation filters may be used, thereby providing spectral characteristics control.

The different options 1501 and 1502 can be signaled, for example in the bitstream as side information. The differentiation between the first option (option 1) 1501 and the second option (option 2) 1502 can be signaled with an indication, such as a syntax element methodIdx, which may take one of two values. For example a first value (e.g. 0) is for indicating padding/cropping, and a second value (e.g. 1) is for indicating interpolation being used for the resizing. For example, a decoder may receive a bitstream encoding a picture and comprising, potentially, side information including an element methodIdx. Upon parsing this bitstream, the side information can be obtained and the value of methodIdx derived. Based on the value of methodIdx, the decoder can then proceed with a corresponding resizing or rescaling method, using padding/cropping if methodIdx has a first value or using interpolation of methodIdx has a second value.

Figure 13:
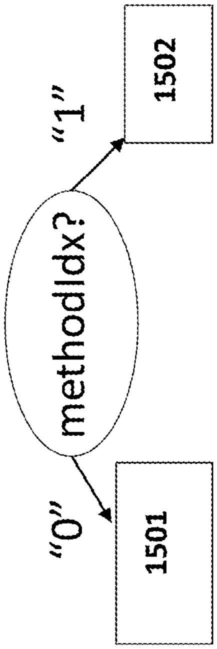
FIG. 13 shows an embodiment of signalling rescaling options according to one embodiment.

This is shown in FIG. 13. Depending on the value of methodIdx being 0 or 1, either clipping (comprising either padding or cropping) or interpolation is chosen.

It is noted that, even though the embodiment of FIG. 13 refers to a selection or decision, based on methodIdx, between clipping (including one of padding/cropping) and interpolation as the methods used for realizing the resizing, the invention is not limited in this regard. The method explained in relation to FIG. 13 can also be realized where the first option 1501 is interpolation to increase the size during the resizing operation and the second option 1502 is interpolation to decrease the size during the resizing operation. Any two or even more (depending on the binary size of methodIdx) different resizing methods as explained above and below can be chosen amongst and can be signaled with methodIdx. In general, the methodIdx does not need to be a separate syntax element. It may be indicated or coded jointly with another one or more parameters.

Figure 14:
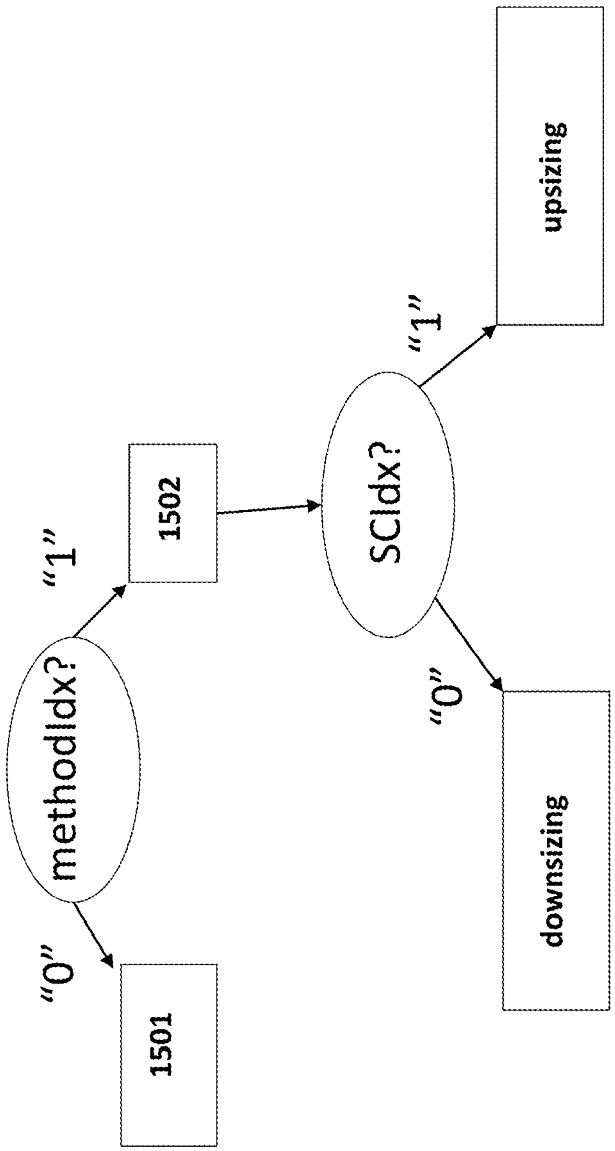
FIG. 14 shows a more specific realization of the embodiment according to FIG. 13.

A further indication or flag may be provided as shown in FIG. 14. In addition to methodIdx, a Size Change flag (1 bit), SCIdx, may be signaled conditionally only for the case of the second option 1502. In the embodiment of FIG. 14, the second option 1502 comprises the use of interpolation for realizing the resizing. In FIG. 14, the second option 1502 is chosen in the case where methodIdx=1. The Size Change Flag, SCIdx, may have a third or fourth value, which may be values of either 0 (e.g. for the third value) or 1 (e.g. for the fourth value). In this embodiment, "0" may indicate downsizing and "1" may indicate upsizing. If SCIdx is thus 0, the interpolation for realizing the resizing will be done in a way so that the size of the input is decreased. If SCIdx is 1, the interpolation for realizing the resizing may be done so as to increase the size of the input. The conditional coding of the SCIdx may provide for a more concise and efficient syntax. However, the present disclosure is not limited by such conditional syntax and SCIdx may be indicated independently of the methodIdx or indicated (coded) jointly with the methodIdx (e.g. within a common syntax element that may be capable of taking only a subset of values out of values indicating all combinations of SCIdx and methodIdx).

Like for the indication methodIdx, also SCIdx may be obtained by a decoder by parsing a bitstream that potentially also decodes the picture to be reconstructed. Upon obtaining the value for SCIdx, downsizing or upsizing may be chosen.

Figure 15:
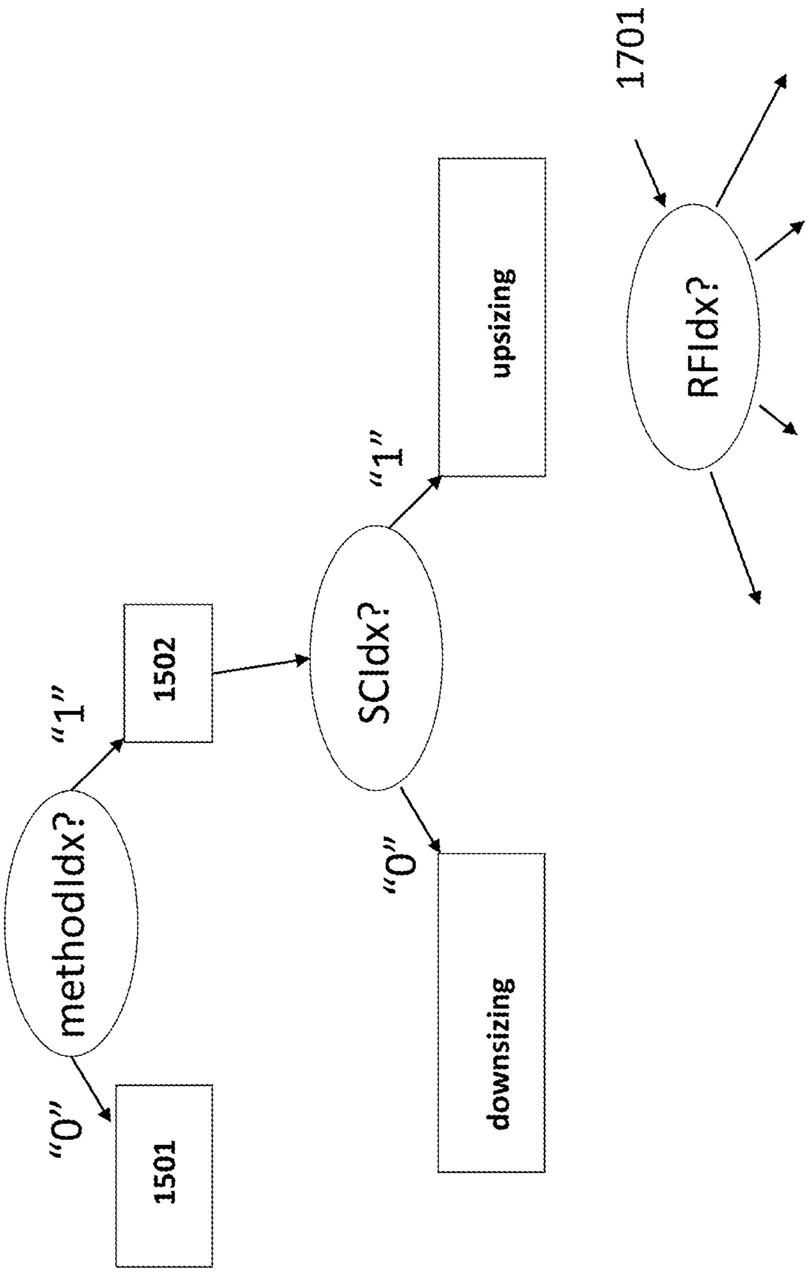
FIG. 15 shows a more specific realization of the embodiment according to FIG. 14.

In addition or alternatively to the above described indications, as shown in FIG. 15, an additional (side) indication for Resizing Filter Index, RFIdx, may be signaled (indicated within the bitstream).

In some exemplary implementations, the RFIdx may be indicated conditionally for the second option 1502, which may comprise that RFIdx is signaled if methodIdx=1 and not signaled if methodIdx=0. The RFIdx may have a size of more than one bit and may signal, for example, depending on its value, which interpolation filter is used in the interpolation for realizing the resizing. Alternatively or additionally, RFIdx may specify the filter coefficients from the plurality of interpolation filters. This may be, for instance, Bilinear, Bicubic, Lanczos3, Lanczos5, Lanczos8 among others.

As indicated above, at least one of methodIdx, SCIdx and RFIdx or all of them or at least two of them may be provided in a bitstream which may be the bitstream that also encodes the picture to be reconstructed or that is an additional bitstream. A decoder may then parse the respective bitstream and obtain the value of methodIdx and/or SCIdx and/or RFIdx. Depending on the values, actions as indicated above may be taken.

The filter used for the interpolation for realizing the resizing can, for example be determined by the scaling ratio.

As indicated in the lower right of FIG. 15 with item 1701, the values of RFIdx may be explicitly signaled. Alternatively or additionally, RFIdx may be obtained from a lookup-table so that RFIdx=LUT(SCIdx).

In another example there might be 2 lookup tables, one for the case of upsizing and one for the case of downsizing. In this case LUT1(SCIdx) might indicate the resizing filter when downsizing is selected, and LUT2(SCIdx) might indicate the resizing filter for the upsizing case.

In general, the present disclosure is not limited to any particular way of signaling for RFIdx. It may be individual and independent from other elements or jointly signaled.

Figure 16:
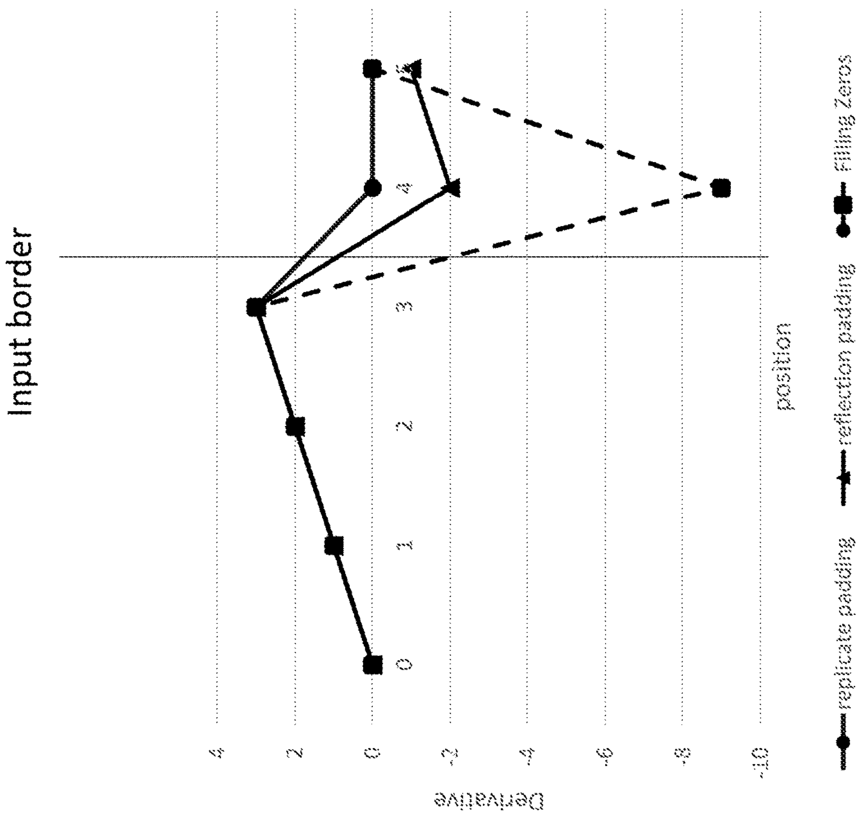
FIG. 16 shows a comparison of different possibilities of padding operations.
Figure 16:
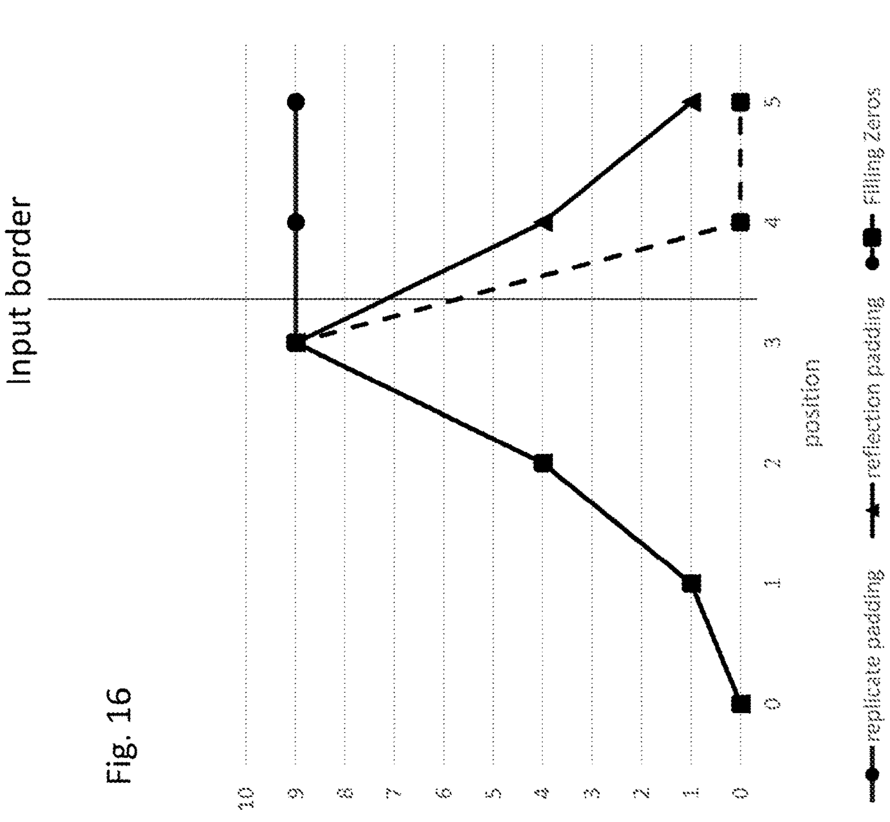
Figure 17:
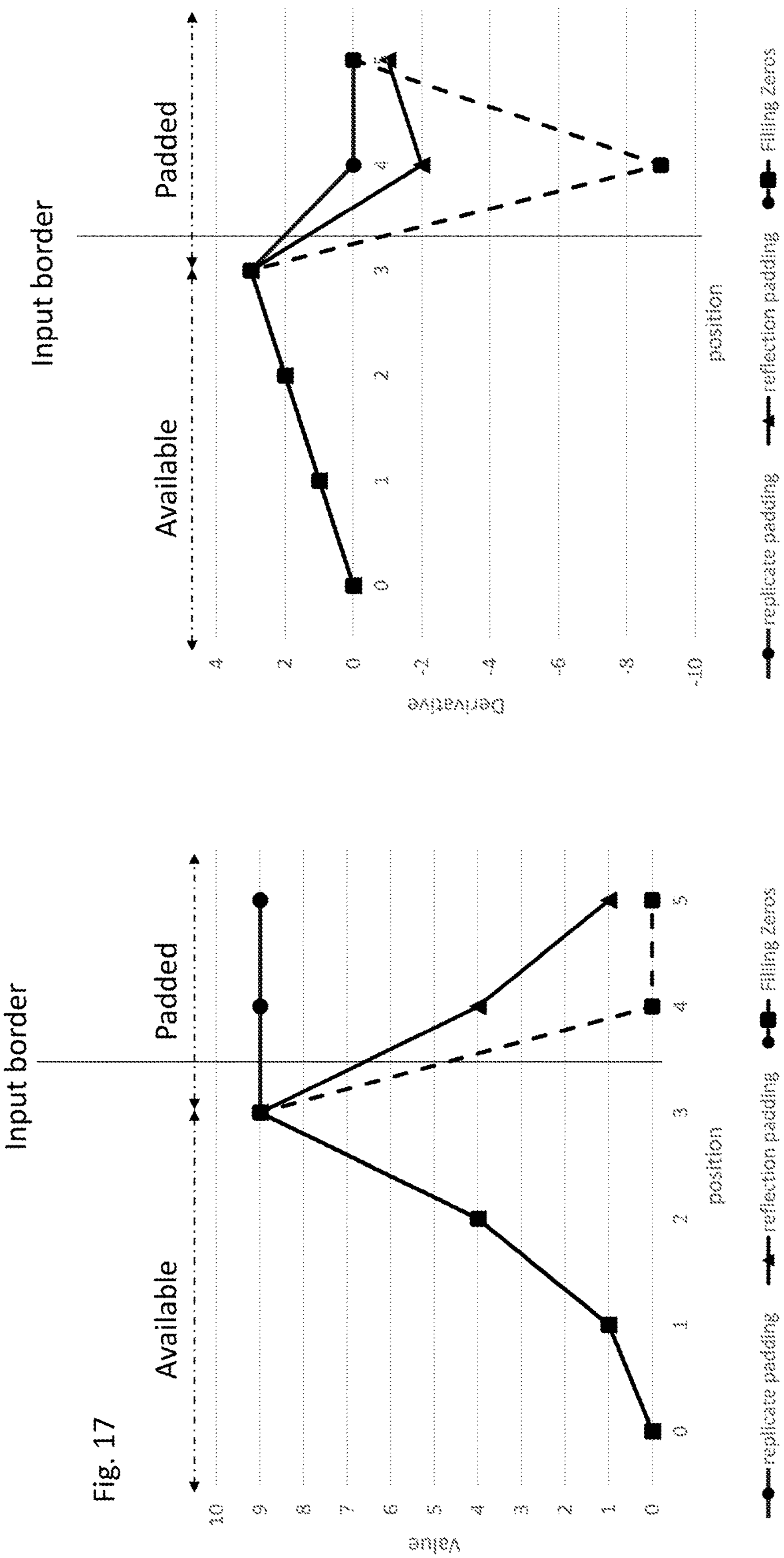
FIG. 17 shows a further comparison of different possibilities of padding operations.

FIGS. 16 and 17 show some examples of resizing methods. In the FIGS. 16 and 17, 3 different kinds of padding operations and their performance are depicted. The horizontal axis in the diagrams shown indicates the sample position. The vertical axis indicates the value of the respective sample.

It is noted that the explanations that follow are only exemplarily and is not intended to limit the invention to specific kinds of padding operations. The straight vertical line indicates the border of the input (a picture, according to embodiments), right hand side of the border are the sample positions where the padding operation is applied to generate new samples. These parts are also referred below as "unavailable portions" which means that these do not exist in the original input but are added by means of padding during the rescaling operation for the further processing. The left side of the input border line represents the samples that are available and are part of the input. The three padding methods depicted in the figure are replication padding, reflection padding and filling with zeros. In the case of a downsampling operation that is to be performed in line with some embodiments, the input to the sub-network of the NN will be the padded information, i.e. the original input extended by the applied padding.

In the FIG. 16, the positions (i.e. sample positions) that are unavailable and that may be filled by padding are positions 4 and 5. In the case of padding with zeros, the unavailable positions are filled with samples with value 0. In the case of reflection padding, the sample value at position 4 is set equal to sample value at position 2; the value at position 5 is set equal to value at position 1. In other words, reflection padding is equivalent to mirroring the available samples at position 3, which is the last available sample at the input boundary. In the case of replication padding, the sample value at position 3 is copied to positions 4 and 5. Different padding types might be preferred for different applications.

Specifically, the padding type that is applied may depend on task to be performed. For example:

The padding or filling with zeros can be reasonable to be used for Computer Vision (CV) tasks such as recognition or detection tasks. Thereby, no information is added in order not to change the amount/value/importance of information already existing in the original input.

Reflection padding may be a computationally easy approach because the added values only need to be copied from existing values along a defined "reflection line" (i.e. the border of the original input).

The repetition padding (also referred to as repetition padding) may be preferred for compression tasks with Convolution Layers because most sample values and derivative continuity is reserved. The derivatives of the samples (including available and padded samples) are described on the right hand side of FIGS. 16 and 17. For example in the case of reflection padding, the derivate of the signal exhibits an abrupt change at position 4, (a value of −9 is attained at this position for the exemplary values shown in the figures). Since signals that are smooth (signals with small derivative) are easier to compress, it might be undesirable to use reflection padding in the case of video compression tasks.

In the examples shown, the replication padding has the smallest change in the derivatives. This is advantageous in view of video compression tasks but results in more redundant information being added at the border. With this, the information at the border may become more weight than intended for other tasks and, therefore, in some implementations, the overall performance of padding with zeros may supersede reflection padding.

Figure 18:
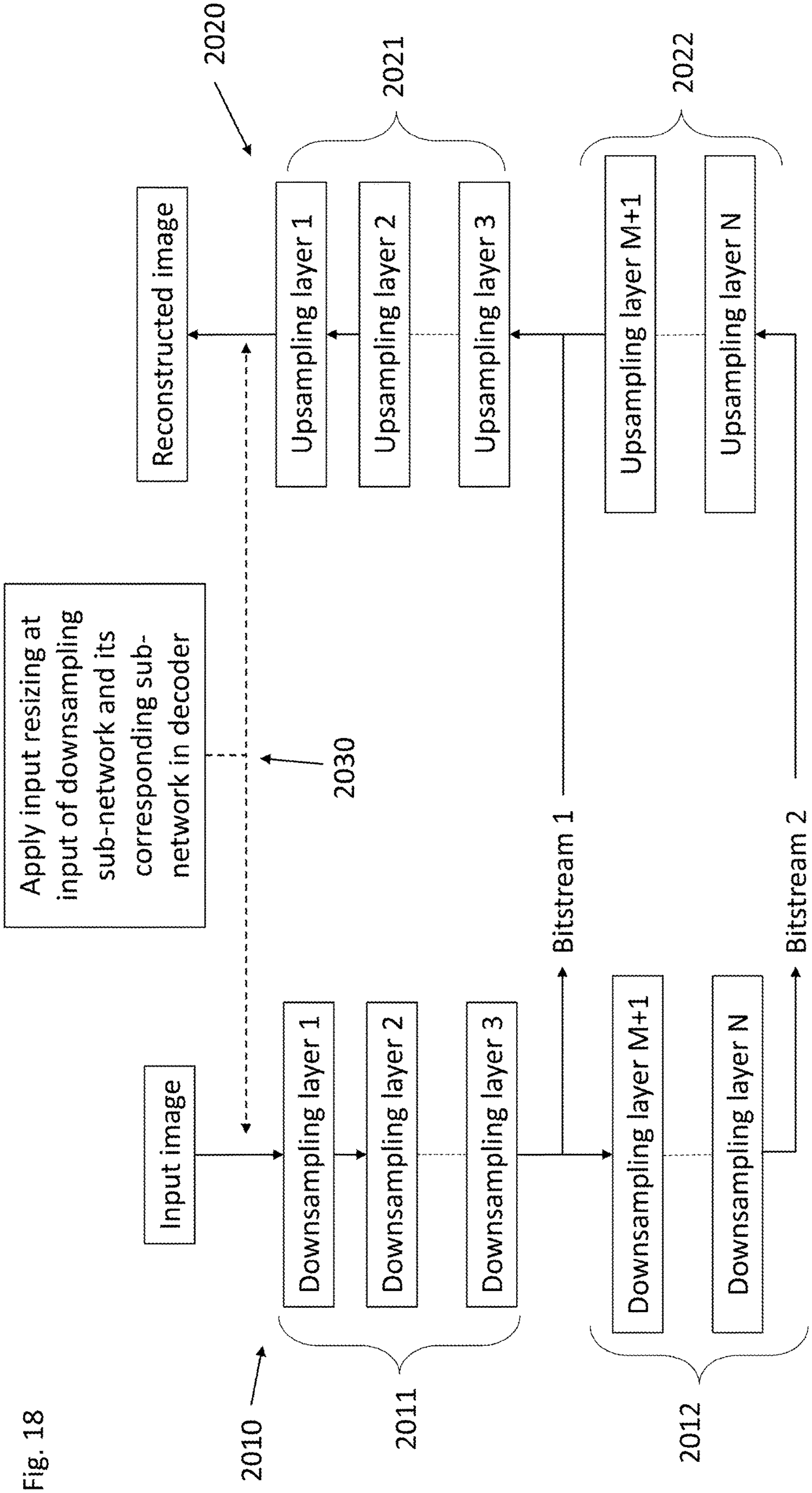
FIG. 18 shows an encoder and a decoder and the relationship in the processing of input to the encoder and the decoder in line with one embodiment.

FIG. 18 shows a further embodiment. Here the encoder 2010 and the decoder 2020 are shown side by side. In the depicted embodiment, the encoder comprises a plurality of downsampling layers 1 to N. The downsampling layers are, according to this embodiment, grouped together or form part of sub-networks 2011 and 2012 of the neural network within the encoder 2010. These sub-networks can, for example, be responsible for providing specific bitstreams 1 and 2 that may be provided to the decoder 2020. In this sense, the subnetworks of downsampling layers of the encoder may form a logical unit that cannot reasonably be separated. As shown in the FIG. 18, the first subnet 2011 (or sub-network 2011) of the encoder 2020 comprises downsampling layers 1 to 3, each having its respective downsampling ratio. The second subnetwork 2012 comprises the downsampling layers M to N with respective downsampling ratios.

The decoder 2020 has a corresponding structure of the upsampling layers 1 to N. One sub-network 2022 of the decoder 2020 comprises the upsampling layers N to M and the other sub-network 2021 comprises the upsampling layers 3 to 1 (here, in descending order so as to bring the numbering in line with the decoder when seen in the processing order of the respective input).

As indicated above, the rescaling applied to the input before the first sub-network 2011 of the encoder is correspondingly applied to the output of sub-network 2021 of the decoder. This means the size of the input to the first sub-network 2011 is the same as the size of the output of the sub-network 2021, as indicated above.

More generally, the rescaling applied to the input of a sub-network n of the encoder corresponds to the rescaling applied to the output of the sub-network n so that the size of the rescaled input is the same as the size of the rescaled output. The index n may denote the number of the sub-network in the order of processing an input through the encoder.

Figure 19:
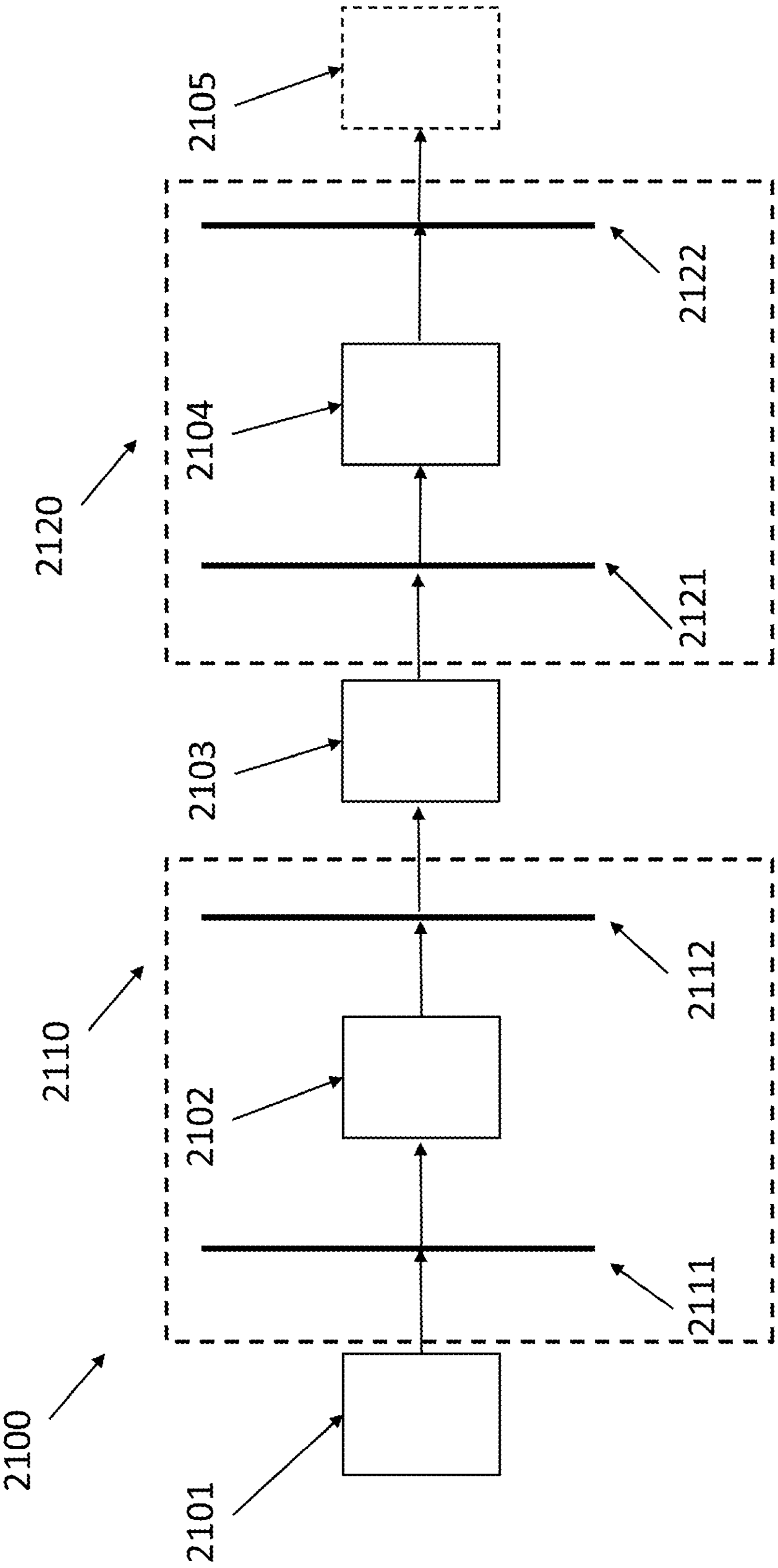
FIG. 19 shows a schematic depiction of an encoder according to one embodiment.
Figure 25:
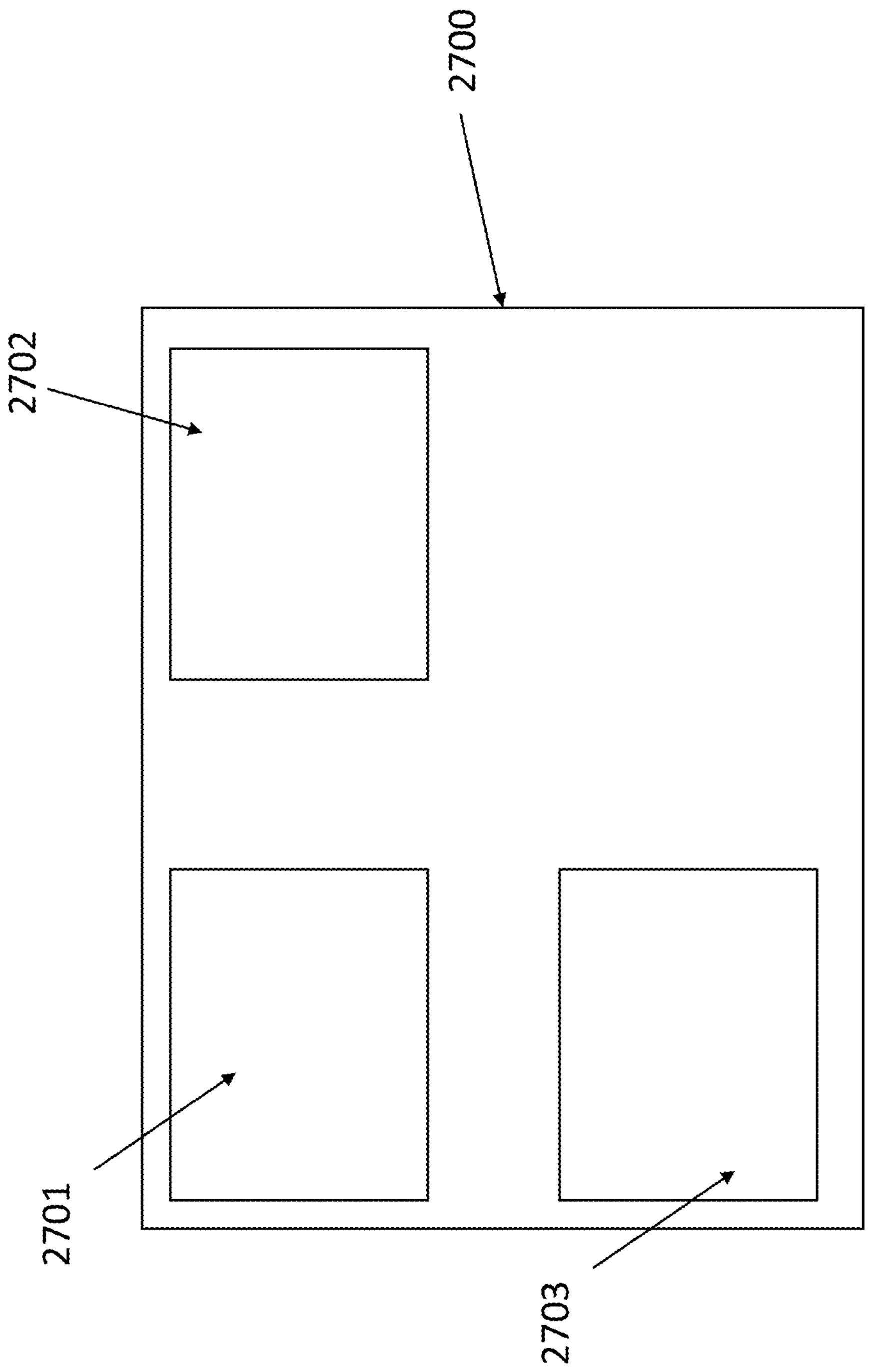
FIG. 25 shows a schematic depiction of an encoder according to one embodiment.

FIG. 19 shows an implementation of a neural network 2100 in an encoder (not further depicted here) like, for example, in the encoder according to FIG. 25. For ease of explanation, however, only the neural network 2100 is depicted here without regard to further components of the encoder.

The neural network 2100 comprises, as such, a plurality of layers 2111, 2112, 2121 and 2122. These layers are provided to process an input they receive. The respective input to the respective layers is denoted with 2101, 2102, 2103 and 2104. In the end, with a dashed line, an output of the neural network 2105 is provided after the original input 2101 has been processed by each of the layers of the neural network.

The neural network 2100 according to FIG. 19 is provided in order to encode a picture. In this regard, the input 2101 may be considered a picture or a pre-processed form of this picture. This pre-processed form of this picture may encompass that it has already been processed by preceding layers of the neural network 2100 which are not shown here and/or that the picture has been pre-processed in any other way by, for example, changing its resolution or the like. The pre-processing is not limited in this regard.

For further explanations, it will be assumed that the input 2101 has a given size in at least one dimension and may constitute an input having two dimensions which may, for example, be represented in the form of a matrix where each entry in the matrix constitutes a sample value of the input. In the sense of the input 2101 being a picture, the values in the matrix may correspond to values of samples of the picture, for example in a specific color channel. The picture may, as already explained above, be a still picture or a moving picture in the sense of a video sequence or a video. A picture of a video may also be referred to as an image or frame or the like.

During the processing of the input 2101 with the neural network 2100 and specifically by its respective layers, an output 2105 may be created that represents an encoded picture and may be provided in the form of a bitstream after binarization or encoding into the bitstream of an output from a NN layer. The binarization/encoding of the feature maps (channels) may be performed on the output of the NN. However, the binarization/encoding of the feature map may itself be considered a layer of the NN. Encoding may be, e.g. an entropy coding. The present disclosure encompasses that the size of the bitstream representing an encoded picture smaller than the size of the input picture.

This is achieved, according to some embodiments, by the layers 2111, 2112, 2121, 2122 comprising one or more downsampling layers. For ease of explanation, it will be assumed that each of the layers 2111, 2112, 2121, 2122 of the neural network 2100 depicted in FIG. 19 is a downsampling layer that applies a downsampling to a respective input it receives. This downsampling comprises reducing the size of an input the downsampling layer receives by a downsampling ratio associated with the respective downsampling layer. The downsampling ratio associated with a given downsampling layer m, m being a natural number, may be denoted with $r_m$ and is a natural number.

The downsampling encompasses that the size of the output of a downsampling layer multiplied by the downsampling ratio $r_m$ equals the size of the input provided to the downsampling layer.

The downsampling can be provided by applying a convolution to an input of the downsampling layer.

Such a convolution comprises the element-wise multiplication of entries in the original matrix of the input (for example, a matrix with 1024×512 entries, the entries being denoted with $M_{ij}$) with a kernel K that is run (shifted) over this matrix and has a size that is typically smaller than the size of the input. The convolution operation of 2 discrete variables can be described as:

$$(f*g)[n]=\sum_{m\in K} f[m]g[n-m]$$

Therefore, calculation of the function (f*g) [n] for all possible values of n is equivalent to running (shifting) the kernel or filter f[ ] over the input array g[ ] and performing element-wise multiplication at each shifted position.

In the above example, the kernel K would be a 2×2 matrix that is run over the input by a stepping range of 2 so that the first entry $D_{11}$ in the downsampled bitstream D is obtained by multiplying the kernel K with the entries $M_{11}$, $M_{12}$, $M_{21}$, $M_{22}$. The next entry $D_{12}$ in the horizontal direction would then be obtained by calculating the inner product of the kernel with the entries or the reduced matrix with the entries $M_{13}$, $M_{14}$, $M_{23}$, $M_{24}$. In the vertical direction, this will be performed correspondingly so that, in the end, a matrix D is obtained that has entries $D_{ij}$ obtained from calculating the respective inner products of M with K and has only half as many entries per direction or dimension.

In other words the shifting amount, which is used to obtain the convolution output determines the downsampling ratio. If the kernel is shifted 2 samples between each computation steps, the output is downsampled by a factor of 2. The downsampling ratio of 2 can be expressed in the above formula as follows:

$$(f*g)[n]=\sum_{m\in K} f[m]g[(2n)-m]$$

The transposed convolution operation (as may be applied during a decoding as explained in the following) can be expressed mathematically in a same manner as a convolution operation. The term "transposed" corresponds to the fact that the said transposed convolution operation corresponds to inverting of a specific convolution operation. However implementation-wise, the transposed convolution operation can be implemented similarly by using the formula above. An upsampling operation by using a transposed convolution can be implemented by using the function:

$$(f*g)[n]=\sum_{m\in K} f[m]g\left[\mathrm{int}(n/u)-m\right]$$

In the above formula the u corresponds to the upsampling ratio, and into function corresponds to conversion to an integer. The into operation for example can be implemented as a rounding operation.

In the above formula, the values m and n can be scalar indices when the convolution kernel or filter f( ) and the input variable array g( ) are one dimensional arrays. They can also be understood as multiple dimensional indices when the kernel and the input array are multi-dimensional.

The invention is not limited to downsampling or upsampling via convolution and deconvolution. Any possible way of downsampling or upsampling can be implemented in the layers of a neural network, NN.

In the context of the present disclosure, one or a plurality of the layers of the encoder 2100 are summarized in the form of a sub-network of the encoder. In FIG. 19, this is depicted with the dashed rectangles 2110 and 2120. The sub-network 2110 comprises the downsampling layers 2111 and 2112 whereas the sub-network 2120 comprises the downsampling layers 2121 and 2122. In the context of the present disclosure, the sub-networks are not restricted to encompassing the same number of downsampling layers. Providing sub-networks 2110 and 2120 with two downsampling layers each as in FIG. 19 is thus only provided for explanatory purposes. It is further encompassed by the present disclosure that at least one of the sub-networks comprises at least two downsampling layers whereas the number of downsampling layers in the other sub-networks is not restricted, but may also be at least two.

Moreover, one or more of the sub-networks may comprise even further layers that are no downsampling layers but perform different operations on the input. Additionally or alternative, the sub-networks may comprise further units, as was already exemplified above.

Furthermore, the layers of the neural network can comprise further units that perform other operations on the respective input and/or output of their corresponding layer of the neural network. For example, the layer 2111 of the sub-network 2110 may be a downsampling layer and, in the processing order of an input to this layer before the downsampling, there may be provided a rectifying linear unit (ReLu) and/or a batch normalizer.

Rectifying linear units are known to apply a rectification to the entries $P_{ij}$ of a matrix P so as to obtain modified entries $P'_{ij}$ in the form $$P'_{ij} = \begin{cases} 0 & \forall P_{ij} \leq 0 \\ P_{ij} & \forall P_{ij} > 0 \end{cases}$$

Thereby, it is ensured that values in the modified matrix are all equal or greater than 0. This may be necessary or advantageous for some applications.

The batch normalizer is known to normalize the values of a matrix by firstly calculating a mean value from the entries $P_{ij}$ of a matrix P having a size M×N in the form of $$V = \frac{\sum_{ij} P_{ij}}{N \cdot M}.$$

With this mean value V, batch normalized matrix P' with the entries $P'_{ij}$ is then obtained with by.

$$P'_{ij} = P_{ij} - V$$

Both, the calculations obtained by the batch normalizer and the calculations obtained by the rectified linear unit do not alter the number of entries (or the size) but only alter the values within the matrix.

Such units can be arranged before the respective downsampling layer or after the respective downsampling layer, depending on the circumstances. Specifically, as the downsampling layer reduces the number of entries in the matrix, it might be more appropriate to arrange the batch normalizer in the processing order of the bitstream after the respective downsampling layer. Thereby, the number of calculations necessary for obtaining V and $P'_{ij}$ can be reduced. As the rectified linear unit can simplify the multiplications to obtain the matrix of reduced size in the case of a convolution being used for the downsampling layer because some entries may be 0, it can advantageous to arrange the rectified linear unit before the application of the convolution in the downsampling layer.

However, the invention is not limited in this regard and the batch normalizer or the rectified linear unit may be arranged in another order with respect to the downsampling layer.

Furthermore, not each layer of the neural network necessarily has one of these further units or other further units may be used that perform other modifications or calculations.

While the provision of the sub-networks may be arbitrary in general with respect to the number of downsampling layers they comprise, two different sub-networks do have distinct layers in that no layer of the neural network (irrespective of whether it constitutes a downsampling layer or any other layer) is part of two sub-networks.

Furthermore, even though the association of specific layers of the neural network to a specific sub-network may be arbitrary, layers of a neural network may be summarized to a sub-network preferably for cases where they process an input they receive and provide, after the processing with the layers of the sub-network, a bitstream as output. In the context of FIG. 19, this encompasses that the output 2103 which is the output of the layer 2112 may not only be provided to the subsequent sub-network 2120 and its downsampling layer 2121 as input, but may additionally be provided as output of the first sub-network as a first sub-bitstream. The subsequent sub-network 2120 may then process the input 2103 and provide a further sub-bitstream 2105 as output.

The size of the first sub-bitstream 2103 is preferably smaller than the size of the input 2101 and is larger than the size of the sub-bitstream 2105 in at least one dimension.

In order to ensure a reliable processing of an input (for example the input 2101) with the sub-network that processes this input, it is envisaged according to the present disclosure that, if necessary, a rescaling is applied to the input 2101 in at least one dimension. This rescaling encompasses a changing of the size of the input so that it matches an integer multiple of a combined downsampling ratio of all downsampling layers of the respective sub-network that is to process the input.

To explain this in more detail, it may be assumed that the sub-networks are numbered in the order they process an input, like the input 2101. The first sub-network that processes this input may be numbered 1, the second sub-network may be numbered 2 and so on up to the last sub-network K, where k is a natural number. Any sub-network may thus be denoted as the sub-network k, where k is a natural number. A downsampling layer within the sub-network k has, as explained above, an associated downsampling ratio. The sub-network k may comprise M downsampling layers, where M is a natural number. For reference, a downsampling layer m of a sub-network k then may be associated with a downsampling ratio denoted with $r_{k,m}$ where the index k associated this downsampling-ratio with the sub-network k and the index m indicates to which of the downsampling layers the downsampling ratio $r_{k,m}$ belongs.

Each of these sub-networks then has an associated combined downsampling ratio.

Specifically, the combined downsampling ratio $R_k$ of a sub-network k may be obtained by calculating the product of the downsampling ratios $r_{k,m}$ of all downsampling layers of the sub-network k.

Referring back to the rescaling mentioned above, it may be preferred that the rescaling applied to the input of a sub-network k only depends on the combined downsampling ratio $R_k$ of the respective sub-network k but does not depend on downsampling ratios of another sub-network l, where l is not equal k. Thereby, a rescaling is obtained that only changes the size of the input so that it can be reliably processed by the respective sub-network and its downsampling layers irrespective of whether the resulting output of this sub-network can reasonably be processed by another sub-network.

In the context of FIG. 19, this means that a first rescaling may be applied to the input 2101 for processing it with the first sub-network 2110. The output obtained after that processing is the output 2103 which may act as input to the subsequent sub-network 2120 and/or as an output sub-bitstream. In the sense that the output 2103 is further used as input to the subsequent sub-network 2120, the size of this output 2103 may then be rescaled so that it matches an integer multiple of the combined downsampling ratio R of the sub-network 2120 where this combined downsampling ratio may be obtained in the same way as explained previously for the sub-network 2110. This process can be repeated for the output 2105 of the sub-network 2120 in case a further sub-network is to process this output 2105.

More generally speaking, an input to a sub-network k may be considered. This input may be represented in the form of a matrix having, in at least one of its dimensions, a size $S_k$, where k denotes that this is the input to the sub-network k. As the input has the form of a matrix, $S_k$ is an integer value that is at least 1. A reasonable processing of the input with the sub-network k is possible, if the size $S_k$ of the input is an integer multiple of the combined downsampling ratio $R_k$ already defined above, i.e. if $S_k=nR_k$, where n is a natural number. If this is not the case, a rescaling may be applied to the input with the size $S_k$, thereby changing its size to a new size $\overline{S_k}$ that then fulfills this requirement, i.e. is an integer multiple of the combined downsampling ratio $R_k$ of the sub-network k.

Figure 20:
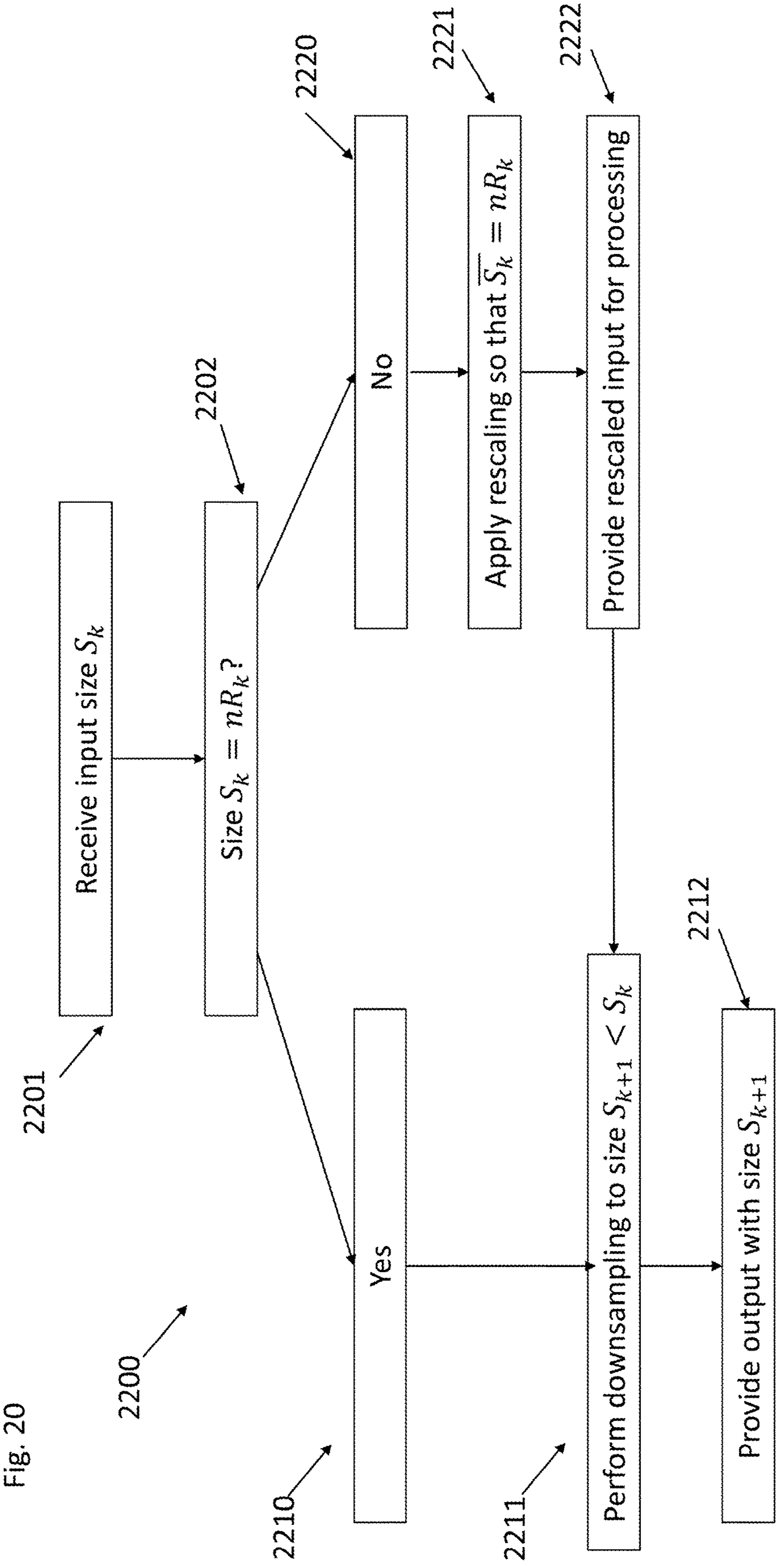
FIG. 20 shows a flow diagram of a method of encoding a picture according to one embodiment.

FIG. 20 shows a more specific embodiment of how the rescaling is obtained and applied to an input of a sub-network k.

The method 2200 begins with a first step 2201 where an input with a size $S_k$ is received at the sub-network k. This input with a size $S_k$ may be received, for example, from a preceding sub-network of the neural network and may thus not constitute a size that is identical to the input picture to be encoded. However, the size $S_k$ can also constitute an input that corresponds to the original picture if the sub-network with index k is the first sub-network that processes the input picture.

In a subsequent step 2202, it may then be evaluated whether the size $S_k$ corresponds to an integer multiple of the combined downsampling ratio $R_k$ of the sub-network k that is to process the input with the size $S_k$.

This determination may comprise, for example, comparing the size $S_k$ to a function depending on the combined downsampling ratio $R_k$ and the size $S_k$. Specifically, the value $$\text{ceil}\left(\frac{S_k}{R_k}\right)\cdot R_k$$

may be compared to the size $S_k$. Alternatively or additionally, the value $$\text{floor}\left(\frac{S_k}{R_k}\right)\cdot R_k$$

may be compared to the size $S_k$. This comparison may specifically comprise calculating the difference $$\text{ceil}\left(\frac{S_k}{R_k}\right)\cdot R_k - S_k \text{ and/or floor}\left(\frac{S_k}{R_k}\right)\cdot R_k - S_k.$$

If these values are 0, then $S_k$ already is an integer multiple of the combined downsampling ratio $R_k$ because both, the functions ceil and floor provide the closest integer of the result of the division $$\frac{S_k}{R_k}.$$

If this closest integer is multiplied with the combined downsampling ratio, it will only be equal to $S_k$ if $S_k$ already is an integer multiple of the combined downsampling ratio $R_k$.

Using the result of this comparison, it can then be determined whether a rescaling is to be applied to the input with the size $S_k$ to change its size to a new size $\overline{S_k}$ before performing the processing of the input with the respective sub-network k.

In this situation, two cases can occur. If it is already determined in step 2202 that the size $S_k$ is an integer multiple of the combined downsampling ratio $R_k$ of the sub-network k and, therefore, corresponds to an allowed input size of the sub-network that allows for reasonably processing the input with this sub-network k, the determination in step 2210 can be made. In this case, in the subsequent step 2211, the downsampling operation can be performed on the input with the size $S_k$ with the respective sub-network k. This encompasses reducing the size $S_k$ to a size $S_{k+1}$ during the downsampling with the sub-network k, where $S_{k+1}$ is smaller than $S_k$ due to the downsampling being applied to the input to the sub-network. In this case, the size $S_k$ and the size $S_{k+1}$ are related by the combined downsampling ratio $R_k$ of the sub-network k. $S_k$ corresponds, in this case, to the product of $S_{k+1}$ and the combined downsampling ratio $R_k$.

Having performed this downsampling with the sub-network, an output with the size $S_{k+1}$ 1 can be provided in step 2212.

For computational efficiency, it can be provided that even though it is determined that the size $S_k$ already corresponds to an integer multiple of the combined downsampling ratio $R_k$ of the respective sub-network k, a resizing of the original input with the size $S_k$ is performed. This resizing will, however, not result in a change of the size $S_k$ when applying because the size $S_k$ already corresponds to the allowed input size.

In case it is determined in step 2202 that the size $S_k$ does not correspond to an integer multiple of the combined downsampling ratio $R_k$, a rescaling that changes the size $S_k$ to a size $\overline{S_k}$ that is an allowed input size to the sub-network k is performed to ensure reliable processing of the input by the sub-network. This is indicated with the processing flowing from the decision 2220 to the step 2221.

In this context, in step 2221, a rescaling is applied to the input with the size $S_k$ to change the input size to the allowed input size for the sub-network which may be considered to be $\overline{S_k}$. This allowed input size is in any case an integer multiple of the combined downsampling ratio $R_k$. By applying this rescaling to the original input, its size is thus changed to a rescaled input size $\overline{S_k}$. This is indicated in step 2222 in FIG. 20.

This rescaled input is then processed in step 2211 by applying the downsampling in the respective sub-network. The rescaling is preferably selected so that when applying the processing in step 2211, the downsampling applied by the sub-network nevertheless results in a reduced size $S_{k+1}$ that is still smaller than the input size $S_k$ even though potentially the rescaling comprises increasing the size $S_k$ to a size $\overline{S_k}$. This can be ensured as will be explained in the following by, for example, changing the size $S_k$ to a size $\overline{S_k}$ that corresponds either to the closest smaller integer multiple of the downsampling ratio $R_k$ of the sub-network k or to the closest largest integer multiple of the combined downsampling ratio $R_k$ of the sub-network k.

This can be achieved by, for example, using a function $$\mathrm{ceil}\left(\frac{S_k}{R_k}\right)\cdot R_k$$

to obtain the closest larger integer multiple of the combined downsampling ratio. This value may be set or considered the allowed input size of the sub-network k and may be denoted with $\overline{S_k}$. If the size $S_k$ was no integer multiple of the combined downsampling ratio, then $\overline{S_k}$ is larger than the size $S_k$ and the rescaling may comprise increasing the size of the input to the size $\overline{S_k}$. Alternatively, the closest smaller integer multiple of the combined downsampling ratio may be obtained by using $$\mathrm{ceil}\left(\frac{S_k}{R_k}\right)\cdot R_k.$$

If the size $S_k$ is no integer multiple of the combined downsampling ratio $R_k$, this value will be smaller than $S_k$. The size $S_k$ may then be rescaled to this value, thereby reducing the size $S_k$.

The determination whether to increase the size $S_k$ to the closest larger integer multiple of the combined downsampling ratio or reducing the size $S_k$ to the closest smaller integer multiple of the combined downsampling ratio may depend on further considerations.

For example, when encoding pictures, it is of importance to ensure that when decoding a bitstream constituting the encoded picture again, the quality of the decoded picture obtained from the bitstream is comparable to that of the picture originally input to the encoder. This can be achieved, for example, by only increasing size of an input to a sub-network k to the closest larger integer multiple of the combined downsampling ratio of this sub-network, thereby ensuring that no information is lost. This may encompass, as was already explained above with relation to, for example, the embodiments of FIGS. 13 to 17, to apply a padding with zeros or using reflection padding or repetition padding to create new samples that are then used to increase the size of the input to the size $\overline{S_k}$. Furthermore, interpolation may be used which may encompass creating new samples as mean values between already existing adjacent samples.

On the other hand, as this padding will result in information being added to the input which can have negative effects on the borders of a picture when it is decoded again, it can be envisaged to reduce the size $S_k$ to the closest smaller integer multiple of the combined downsampling ratio $R_k$ of the sub-network k by using either cropping or interpolation in a way that reduces the size. The cropping comprises deleting samples from the original input, thereby reducing its size. The interpolation to decrease the size may comprise calculating a mean value for one or more adjacent samples in the original input with the size $S_k$ and using this mean value as a single sample instead of the original samples.

By applying this rescaling on a sub-network basis, a reduction in the size of the resulting bitstream that is finally output by the encoder is obtained. This will be explained in the following with respect to a numerical example that also makes use of the description associated with FIG. 19.

In FIG. 19, there were two sub-networks 2110 and 2120. In the following, it will be assumed that the neural network 2100 comprises exactly these two sub-networks. Furthermore, for explanatory purposes, it is assumed that the first sub-network 2110 comprises two downsampling layers with a respective downsampling ratio of 2. The second sub-network may be assumed in the following to be a sub-network comprising four downsampling layers, each having a downsampling ratio of 2 as well.

Furthermore, as exemplified in FIG. 19, after the first sub-network 2110, a sub-bitstream 2103 may be output. This sub-bitstream 2103 may form part of the bitstream finally output by the encoder. Furthermore, a second sub-bitstream 2105 may be output by the second sub-network 2120 after having processed the original input through the whole neural network comprising the first and the second sub-network.

Coming back to the above numerical examples, the whole downsampling that is applied to an input to the neural network is actually independent from the separation of the neural network into sub-networks. It is obtained by calculating the whole downsampling ratio of the whole network, being the product of all downsampling ratios. This means, as there are six downsampling layers having a downsampling ratio of 2 each, the downsampling ratio of the whole neural network is 64. An input will thus be reduced in size by a factor of 64 after having it processed with the whole neural network.

In the prior art, a rescaling was applied to an input before processing it with the neural network so that it can be processed by the whole neural network. In other words, this requires that the input size is rescaled to a value that corresponds to an integer multiple of the overall downsampling ratio of the whole neural network. In the context of this example, this means that only an input size being an integer multiple of 64 would be allowed according to the prior art.

Taking as example an input size of 540. It is seen that this is no integer multiple of all downsampling ratio 64. For ensuring reliable processing in the prior art, a rescaling to either 576 or 512 is performed because these are integer multiples of the overall downsampling ratio 64 that come closest to the original size.

Assuming for the following discussion that the size of the input is increased to 576 and then processed by the downsampling layers according to the prior art and creating a first bitstream at the position 2103 (i.e. after having processed the input with two of the downsampling layers) and the second bitstream after having processed the input with all the downsampling layers. The first bitstream is obtained by processing the input with the rescaled size 576 with the first two downsampling layers. After the first downsampling layer, the input of the size 576 is reduced by the downsampling ratio 2 to the size 288. The next downsampling layer reduces this size to the value 144. The first output bitstream 2103 according to the prior art will thus have a size of 144.

This is then further processed by the remaining downsampling layers which, together, have a downsampling ratio of 16. By this, the size of the input 2103 to the subsequent downsampling layers according to the prior art will first be reduced to 72, then to 36, then to 18 and finally to 9. The second bitstream 2105 output after having processed the input with a neural network according to the prior art will thus have a size of 9.

Combining the first output 2103 and the second bitstream 2105 to a combined bitstream as output of the encoder, this will result in a size of 153=144+9.

According to the present disclosure, however, the situation is different.

As indicated above, the rescaling applied to the input is obtained such that a rescaling is applied in a way that changes the size of the input if the size $S_k$ of the input does not equal an integer multiple of the combined downsampling ratio $R_k$ of the sub-network k with which the respective input is to be processed.

In keeping with the above example, according to one embodiment, the first sub-network comprises two downsampling layers that each have a downsampling ratio of 2, resulting in a combined downsampling ratio $R_1$=4. The input has a size of 540 as indicated above. 540 is an integer multiple of 4 (4×135=540). This means that when processing the input with the first sub-network, no rescaling is necessary and the output 2103 has a size of 135 after having been processed with the first sub-network 2110. Consequently, the first bitstream has a size that is smaller than the size of the first bitstream that was obtained with a method according to the prior art. There, the size of the first bitstream was 144.

In the next step, this intermediate result in the form of the output 2103 of the first sub-network is provided as input to the second sub-network which has a combined downsampling ratio $R_2$=24=16 (4 downsampling layers with a downsampling ratio of 2 each). 135 is not an integer multiple of 16, thus requiring a rescaling of the input before processing the input 2103 with the second sub-network. Assuming again that the size will be increased to have a comparable result to the prior art, the closest larger integer multiple of the combined downsampling ratio $R_2$=16 to the input size 135 is 144. After increasing the size of the of input 2103 to 144, the further processing results in a second bitstream 2105 obtained by applying the downsampling in the second sub-network. This second bitstream then has a size that equals 9 (144/16=9).

This means that, in this example, the bitstream output after having processed the input with the neural network comprising the first bitstream and the second bitstream according to embodiments of the present disclosure has a size of 135+9=144. This is approximately 5% smaller than the output size according to the prior art as explained above resulting in a significant reduction of the size of the bitstream while encoding the same information.

To provide a more specific example, the sub-networks 2110 and 2120 can, for example, be the networks that form the encoder 601 and the hyper encoder 603 according to FIG. 4. The encoder 601 provides a first bitstream as an output while the hyper encoder 603 provides a second bitstream. This can also be transferred to the embodiments of a neural network in line with FIG. 6 and FIG. 7 as well as FIG. 10 and FIG. 11. In this context, the first sub-network 2110 may be the one on the left side of the encoder in FIGS. 10 and 11 (before the application of the mask convolution), respectively, whereas the second sub-network 2120 of FIG. 19 may be implemented as the right side of FIG. 10 or FIG. 11, respectively, after having applied the mask convolutions 1204.

Figure 21:
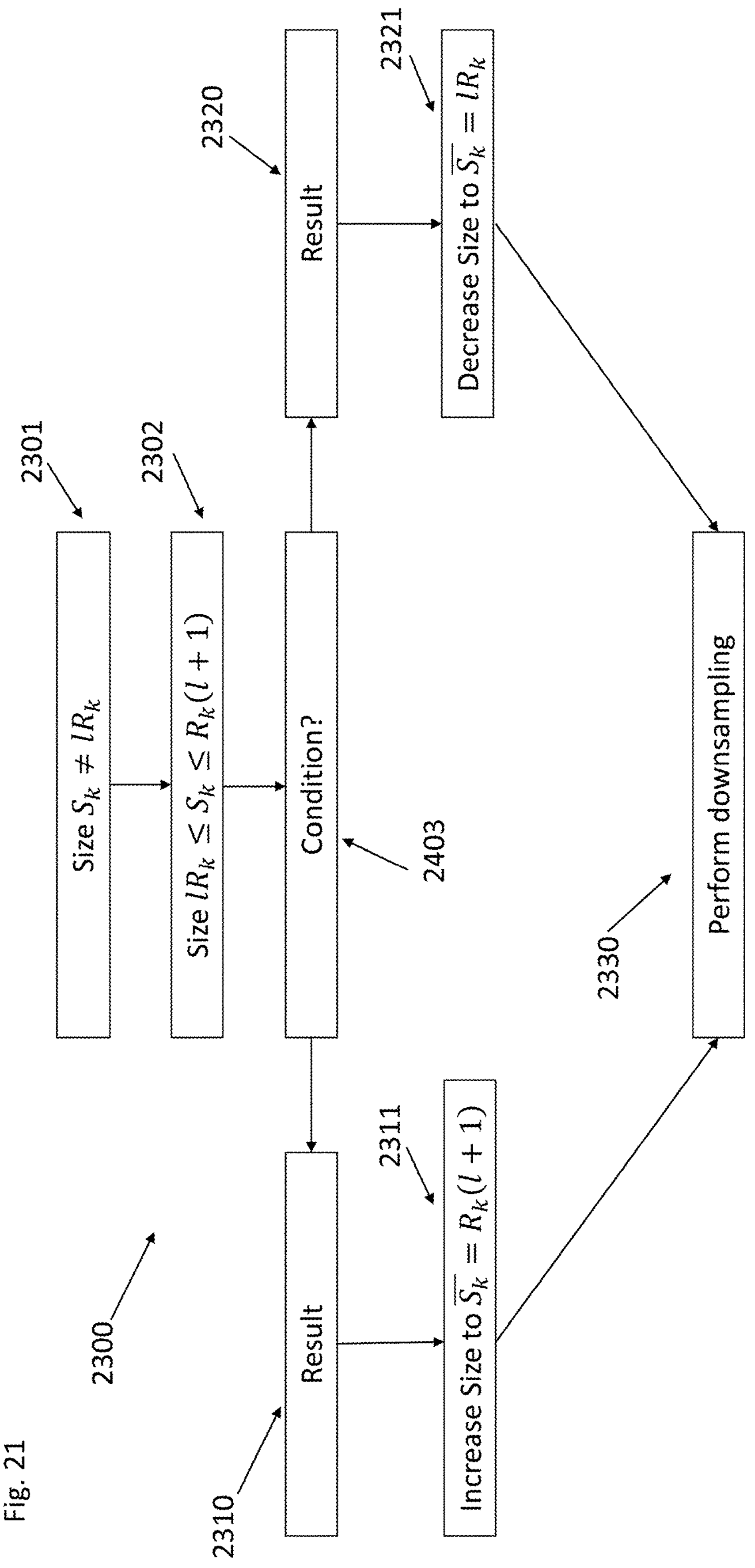
FIG. 21 shows a flow diagram of obtaining a rescaling according to one embodiment.

FIG. 21 shows a further embodiment regarding how the necessary rescaling to an input that does not equal an integer multiple of the combined downsampling ratio $R_k$ of a sub-network k is obtained.

The method 2300 for determining whether the input with the size $S_k$ needs to be rescaled begins with a step 2301 where an input with the size $S_k$ not equal to $lR_k$ (l being a natural number and $R_k$ being the combined downsampling ratio of the sub-network k) is received at the sub-network. In the next step 2302, a determination may be made what the closest smaller integer multiple of the combined downsampling ratio $R_k$ and the closest larger integer multiple of the combined downsampling ratio $R_k$ are. The step 2302 may comprise calculating the function $$\text{floor}\left(\frac{S_k}{R_k}\right)$$

to obtain the value l that indicates the closest smaller integer multiple of the combined downsampling ratio to the size $S_k$. Alternatively or additionally, the value l+1 may be obtained by calculating $$\text{ceil}\left(\frac{S_k}{R_k}\right).$$

Instead of floor, also the function $$\text{int}\left(\frac{S_k}{R_k}\right)$$

may be used as both, floor and int, result in the closest smaller integer multiple of this division.

These calculations may be used instead of explicitly obtaining the values for l and l+1. Furthermore, it may be envisaged that only one of the functions floor, int and ceil is used in order to obtain the values l and l+1. For example, using ceil, the value l+1 can be obtained. From this, the value l can be obtained by subtracting 1. Likewise, by using either int or floor, the value l can be obtained and the value l+1 can be obtained by adding the value 1.

Depending on a further condition, it may then be determined in step 2403, whether the size $S_k$ is to be increased or decreased, depending on an evaluation of the condition and the corresponding result obtained in step 2310 or 2320. For example, the absolute value of the difference between $lR_k$ and $S_k$ on the one side and the absolute value of the difference of $(l+1)R_k$ and $S_k$ may be determined, i.e. $|S_k-lR_k|$ and $|S_k-R_k(l+1)|$ may be obtained. Depending on which of them is smaller (using for example the function Min that throws the smaller of two values), it can be determined that the size of the input $S_k$ is closer to the closest smaller integer multiple of the combined downsampling ratio $R_k$ or closer to the closest larger integer multiple of the combined downsampling ratio $R_k$.

If the condition 2403 comprises that as few as possible modifications to the original input with the size $S_k$ are applied, the determination whether to increase or decrease the size may then be made by evaluating the outcome of the above-explained comparison. This means that if $S_k$ is closer to the closest smaller integer multiple of the combined downsampling ratio than to the closest larger integer multiple of the combined downsampling ratio, then it may be determined in step 2320 that the size $S_k$ is to be decreased to the closest smaller integer multiple of the downsampling ratio $R_k$, i.e. to the closest smaller integer multiple $lR_k$ in step 2321.

With this rescaled input that is decreased in size, the downsampling may be performed in step 2330 by the sub-network, thereby obtaining an output as already explained above.

Correspondingly, if the difference between the closest larger integer multiple $(l+1)R_k$ and the input size $S_k$ is smaller than the difference to the closest smaller integer multiple of the combined downsampling ratio $R_k$, the size may be increased depending on this result 2310 in the step 2311 to the size $\overline{S_k}$ that equals $(l+1)R_k$, i.e. the closest larger integer multiple of the combined downsampling ratio $R_k$.

Also after having increased the original input size $S_k$ to the size $\overline{S_k}$, the processing of the input by the respective sub-network k may be performed in the step 2330.

As already explained above, applying the rescaling may comprise (if rescaling to a larger size) applying for example padding or interpolation. If the size $S_k$ is decreased to a size $\overline{S_k}$, then the rescaling may be performed by applying for example cropping or interpolation.

As was already explained above with relation to the FIGS. 13 to 15, specific information on how the rescaling is to be applied may be signaled already to the encoder that performs the encoding. This can be provided as part of an additional bitstream or together with the information pertaining to the picture.

Figure 22:
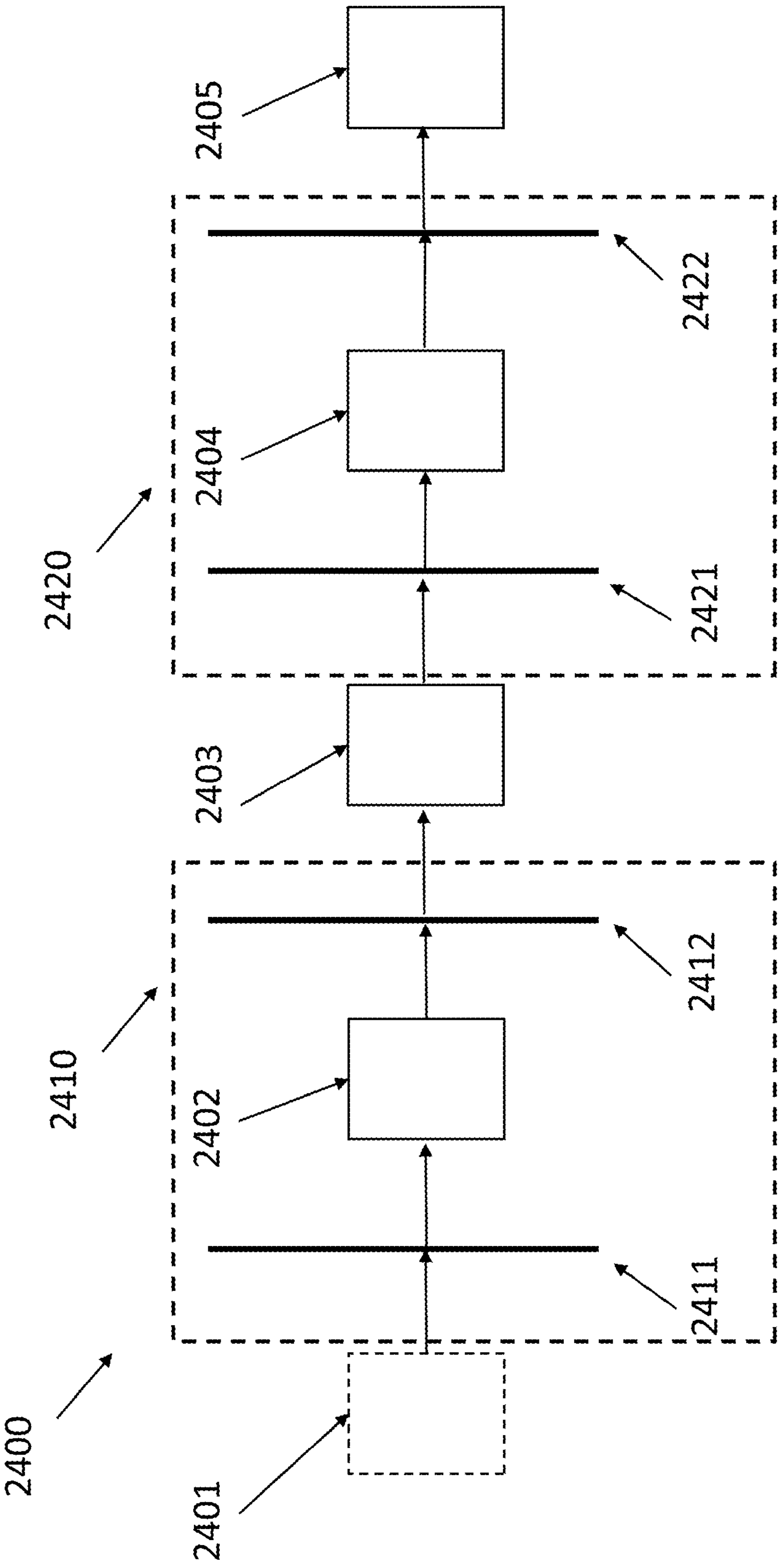
FIG. 22 shows a schematic depiction of a decoder according to one embodiment.

FIG. 22 shows an embodiment of a neural network 2400 that may be implemented on an encoder comprising one or more processing units or processors to apply a method of encoding a bitstream that represents a picture. The decoder may be implemented for example in line with the embodiments described in relation to FIG. 4 or 8 comprising a hyper decoder and a decoder.

The details explained above with respect to FIGS. 4 and 8 are thus encompassed also with respect to the now explained embodiments.

As can be seen in FIG. 22, the neural network 2400 comprises a plurality of layers 2411, 2412, 2421 and 2422. These layers are not limited in their functionality but it is envisaged, in some embodiments, that at least some of them are provided as upsampling layers that can apply an upsampling to an input. For ease of explanation, it will be assumed that all layers 2411, 2412, 2421 and 2422 are upsampling layers, without this being intended to limit the present disclosure in any way. Indeed, other layers may be provided as part of the neural network and also further units, like the batch normalizer and the rectified linear unit referred to above in regards to FIG. 19 may be provided.

The input to the neural network 2400 is indicated with the item 2401. This may be a bitstream that encodes a picture or may be an input provided from a previous layer of the neural network or may be an input processed or pre-processed in any reasonable way.

In any case, the input may preferably be representable in the form of a two-dimensional matrix which has a size T in at least one dimension. The layers of the neural network 2400 and specifically the upsampling layers perform a processing on the input. This means that the input 2401 may be processed by the layer 2411 and an output 2402 of this layer may be provided to a subsequent layer 2412 and so on. Finally, an output 2405 of the neural network 2400 may be obtained. If this output 2405 is the output of the last layer of the neural network 2400, it may be considered to represent or be the decoded picture obtained from the bitstream.

According to the present disclosure, the neural network 2400 may be separated into sub-networks 2410 and 2420 in a manner corresponding to what was already described with respect to the encoder in FIG. 19. This means that a plurality of sub-networks 2410 and 2420 (or even further sub-networks) are provided that each comprise one or more layers, specifically one or more upsampling layers.

In line with some embodiments, it is envisaged that at least one of these sub-networks comprises at least two upsampling layers. In this context, for example the sub-network 2410 may comprise two upsampling layers 2411 and 2412. Apart from that, embodiments provided in this disclosure are not limited with respect to the number of upsampling layers or additional layers being provided in the respective sub-networks.

It is also encompassed by the present disclosure that there may be more than a single bitstream provided to the neural network. In this context, the input 2401 may be processed by all sub-networks 2410 and 2420 and potentially further sub-networks of the neural network while at least one further input bitstream, for example an input provided at the position 2403, may not be processed by all sub-networks of the neural network but may only be processed by the sub-network 2420 and potential subsequent sub-networks but not the sub-network 2410.

At the end of the processing of all inputs through the neural network 2400, an output 2405 for example with the size $T_{output}$ may be obtained, where this output may correspond to the decoded picture. In line with the present disclosure, the size $T_{output}$ of the output will generally be larger than the size T of the input. As the size T of the input may not be predefined and can vary depending on what information has been originally encoded by an encoder, for example, it can be advantageous to indicate the output size $T_{output}$ in the bitstream or in an additional bitstream so that the reconstruction of a picture that originally had the size $T_{output}$ can be performed reliably.

Based on such information, it is also encompassed that, after having processed an input with a sub-network, a potential rescaling is applied to the output obtained from this sub-network before processing the output (also encompassing a potentially rescaled output) with the next sub-network in the processing order of the neural network.

This information that may be used in order to determine a potential rescaling to be applied before the processing of an output of a sub-network by the subsequent sub-network may not only encompass the final target output size $T_{output}$, but may also encompass additional information or may alternatively encompass additional information like, for example, an intended output size to be obtained after the processing with the respective sub-network or an intended input size for the input in the subsequent sub-network. This information can either be available at the decoder performing the decoding method or it can be provided in the bitstream provided to the decoder or an additional bitstream.

In line with embodiments of the present disclosure, each sub-network k (for example, the sub-networks 2410, 2420) has associated with it a combined upsampling ratio $U_k$ where the index k enumerates the number of the sub-network in the processing order of the input through the neural network and may, as already explained above, be of integer value greater than 0 though other enumerations are also possible In the case k is an integer value beginning with 1 and running to the value K being the last sub-network, k may be considered to denote the position of a sub-network in the processing order of the bitstream through the neural network.

This enumeration may be chosen to be in line with the enumeration of sub-networks of an encoder as explained above. However, for matching of the processing performed by the respective sub-networks on the encoder and the decoder, respectively, it may be envisaged that the order of the indexing is different. This means that an inverse order is applied for the enumeration of the sub-networks in the decoder compared to what was applied at the encoder. For example, the first sub-network of the encoder may be denoted with the index k=1. The corresponding sub-network at the decoder that inverses the processing applied to the input at the encoder, is, in the processing order of the input of the neural network at the decoder, the last sub-network. This may be denoted with the index k=1 as well or it may be denoted with the index K where K denotes the number of all sub-networks of the neural network. In the first case, a mapping between the sub-networks of a decoder and the corresponding sub-networks of an encoder is possible. In the latter case, a transformation may be applied to obtain the respective mapping.

Figure 23:
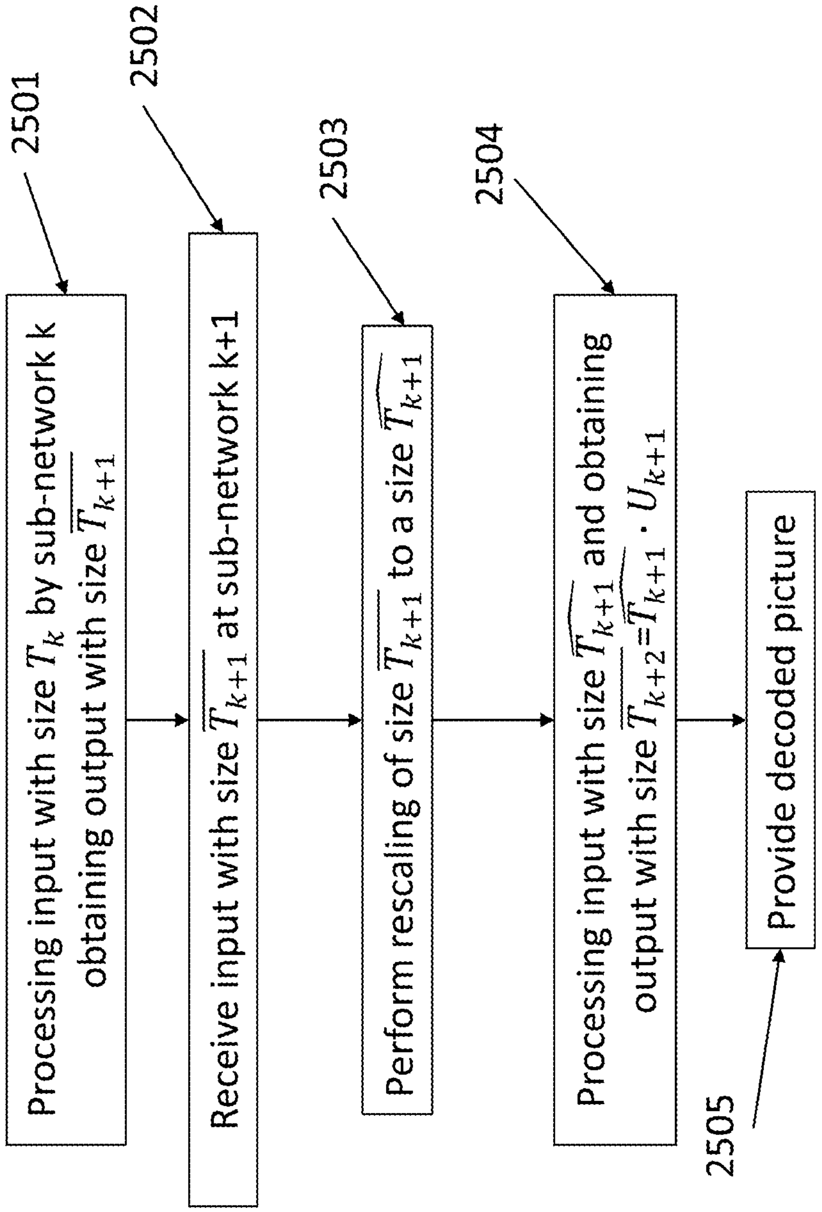
FIG. 23 shows a flow diagram of a method of decoding a bitstream according to one embodiment.

FIG. 23 now provides an exemplary embodiment of a method performed in order to provide a potential rescaling to an output of a sub-network of the neural network.

The method begins with a first step 2501 where an input having a size $T_k$ is processed by a sub-network k. This processing encompasses an upscaling of the input with the size $T_k$ to an output having a size $\overline{T_{k+1}}$. This upsampling may be obtained by processing the input with the size $T_k$ through the upsampling layers m of the sub-network k with their respective upsampling ratios $u_{k,m}$. Here, k and m may denote natural numbers and m may indicate the position of the upsampling layer m in the processing order of an input through the sub-network k and k denotes the number of the sub-network as already discussed above. The size $T_k$ is, by this upsampling, increased to a size $\overline{T_{k+1}}$. As the sub-network applies an upsampling with each of its upsampling layers where each upsampling layer increases the size of an input it receives by its respective upsampling ratio (for example by applying a deconvolution), the size $T_k$ of an input to a sub-network k and the size $\overline{T_{k+1}}$ of an output of a sub-network k have a relation to each other. This relation means that the size $\overline{T_{k+1}}$ of the output of a sub-network k equals the product of the size $T_k$ of the input to the sub-network multiplied with the product of the upsampling ratios of all upsampling layers of this sub-network. This is independent from which layer provides which upsampling. Therefore, instead of the explicit product, a combined downsampling ratio $U_k$ may therefore be used to describe this relation, wherein $U_k$ may be the product of the upsampling ratios $u_{k,m}$ of all upsampling layers of the sub-network k. This may be denoted with $U_k=\Pi_m u_{k,m}$. This combined upsampling ratio $U_k$ may be obtained by, for example, calculating the product of all upsampling ratios $u_{k,m}$ of a given sub-network k explicitly. Alternatively, the combined upsampling ratio $U_k$ may also be preset or specified in a way that it can be immediately used by the decoder.

Preferably, the upsampling performed by a sub-network k is independent from an upsampling that may be performed by other sub-networks within the neural network.

Coming back to FIG. 23, the output with the size $\overline{T_{k+1}}$ is received at the subsequent sub-network with index k+1 in step 2502. As was already indicated above, as part of the method, some additional or further information may be obtained and this information is then used in order to determine whether this size $\overline{T_{k+1}}$ has a size that matches an intended input size for the subsequent sub-network k+1. The intended or allowed input size may be denoted with $\widehat{T_{k+1}}$ hat. The $\widehat{T_{k+1}}$ can be preset or provided in the bitstream or in any other reasonable way to the decoder.

Alternatively or additionally, it can also be envisaged that the size $\widehat{T_{k+1}}$ is determined based on a formula depending on the combined upsampling ratio $U_{k+1}$ of the sub-network k+1 and a target output size of this sub-network where this target output size is then potentially denoted with $\widehat{T_{k+2}}$. The target output size may likewise constitute a target input size to the subsequent sub-network k+2.

For example, the target input size $\widehat{T_{k+1}}$ may be obtained using the target input size of the next sub-network k+2 and the combined upsampling ratio of the current sub-network k+1. For example, the target input size $\widehat{T_{k+1}}$ may be obtained from the division of the target input size of the next sub-network k+2 by the combined upsampling ratio $U_{k+1}$ of the current sub-network k+1. Specifically, this may be represented as $$\widehat{T_{k-1}} = \frac{\widehat{T_{k-2}}}{U_{k+1}}.$$

Alternatively, the siz $\widehat{T_{k+1}}$ may be obtained using either of $$\text{ceil}\left(\frac{\widehat{T_{k-2}}}{U_{k+1}}\right) \text{ or floor}\left(\frac{\widehat{T_{k-2}}}{U_{k+1}}\right).$$

This ensures that the obtained value for $\widehat{T_{k+1}}$ always is an integer value.

Having determined $\widehat{T_{k+1}}$, the rescaling of the size $\overline{T_{k+1}}$ to the size $\widehat{T_{k+1}}$ can be applied by either increasing or decreasing the size $\overline{T_{k+1}}$, depending on whether the target input size to the sub-network k+1 is smaller or larger than $\overline{T_{k+1}}$. This rescaling is applied in step 2503.

The rescaled output of the sub-network k (or, correspondingly, the rescaled input to the sub-network k+1) with the rescaled size $\widehat{T_{k+1}}$ matching the target input size of the sub-network k+1 is then processed in step 2504 by the sub-network k+1. Thereby, like for the sub-network k, an upsampling is applied to the input with the size $\widehat{T_{k+1}}$ and an output with a size $\overline{T_{k+2}}$ is obtained. Preferably, the rescaling is applied in a way that the size $\overline{T_{k+2}}$ of the output of the sub-network k+1 is larger than the original size $\overline{T_{k+1}}$ of the input before the rescaling was applied to change the size $\overline{T_{k+1}}$ to the target input size $\widehat{T_{k+1}}$. Even though in some embodiments it may be preferred to apply a rescaling that reduces the size $\overline{T_{k+1}}$ to the size $\widehat{T_{k+1}}$, this reduction in size may thus be provided in a way that, when processing the input with the size $\widehat{T_{k+1}}$ in the sub-network k+1, the output obtained after the processing has a size $\overline{T_{k+2}}$ that is still larger than the size $\overline{T_{k+1}}$.

The output with the size $\overline{T_{k+2}}$ may then be provided as input to the subsequent sub-network k+2, potentially again requiring a rescaling to a size $\widehat{T_{k+2}}$ that matches an intended target input size of the sub-network k+2. When the target input size $\widehat{T_{k+2}}$ is calculated in the same way as indicated above and if the final output size $T_{output}$ is known, it is possible to iteratively obtain the target input size $\widehat{T_k}$ for a general sub-network k (or $\widehat{T_{k+2}}$ for the specific sub-network k+2) from the final output size $T_{output}$ and the combined upsampling ratios of the proceeding sub-networks, including the sub-network k (or k+2, respectively). Specifically, assuming that no rescaling would be necessary and processing the input by the neural network with all sub-network would immediately lead to a final output having a size $T_{output}$ In that case, the input size $\widehat{T_k}$ to a sub-network k, multiplied with the combined upsampling ratios of all sub-networks that are still to process the input, will be equal to the target output size $T_{output}$. This means $\widehat{T_k}\ \Pi_{i,i=k\ldots K}U_i=T_{output}$, where the index i for the combined upsampling ratios runs from k (for the current sub-network k) up to K, wherein K is the last sub-network of the neural network.

As mentioned, this holds true for the case that the input size $\widehat{T_k}$ to the sub-network k is of a size that can, without applying rescaling, be processed by the subsequent sub-networks, immediately resulting in the target output size $T_{output}$. In any other case, the target input size $\widehat{T_k}$ to a sub-network k may rather be obtained from $$\widehat{T_k}=\text{ceil}\left(\frac{T_{output}}{\prod_{i,i=k\ldots K}U_i}\right)\text{ or }\widehat{T_k}=\text{floor}\left(\frac{T_{output}}{\prod_{i,i=k\ldots K}U_i}\right).$$

The actual input size $\overline{T_k}$ may thus be set to either of these values before each sub-network. If the combined upsampling ratios of all sub-networks are identical, which may be considered a special case of the general calculation shown here, then the product of all combined upsampling ratios (which may in that case all be denoted with U) can be simplified to a term $U^N$ where N then denotes the number of sub-networks that are still to process the input having the size $\overline{T_k}$.

In general the target size $\widehat{T_k}$ the size that will be obtained by rescaling $\overline{T_k}$ and that will be the input of the $k^{th}$ sub-network) can be obtained as a function of the target output size $T_{output}$ and at least one of the combined upsampling ratios of the $k^{th}$ sub-network and the sub-networks that follow it in processing order. For example such function might have the form $\widehat{T_k}=f(T_{output}, U_k, U_{k+1}, U_{k+2}, \ldots)$, where $U_k, U_{k+1}, U_{k+2}, \ldots$ indicate the combined upsampling ratios of the sub-networks k, k+1, k+2, . . . respectively.

The target size at the output of a current sub-network might also be calculated according to a function as follows:

$$\widehat{T_k}=f(T_{output}, U, N)$$

where the U denotes a scalar (which might be a predefined number indicating an upsampling ratio) and N denotes the number of sub-networks including and following the $k^{th}$ subnetwork in the processing order. This function might especially be useful if the upsampling ratio of the sub-networks are all equal to U.

In another example the target size $\widehat{T_k}$ can be calculated according to a function such as $\widehat{T_k}=f(T_{output}, \text{Scale}_k)$. The $\text{Scale}_k$ is a scalar number that might be pre-calculated or predefined. Generally the structure of decoder network, which consists of multiple sub-networks, is fixed during the design and cannot change later on. In such a case (when the decoder structure is fixed) all of the sub-networks that follow the current sub-network and their upsampling ratios are known during the design of the decoder. This means that the total upsampling ratio which depends on the combined upsampling ratios of individual sub-networks can be pre-calculated for each $k^{th}$ sub-network. In such a case, the obtaining of $\widehat{T_k}$ might be performed according to $\widehat{T_k}=f(T_{output}, \text{Scale}_k)$ where $\text{Scale}_k$ is the pre-calculated scalar corresponding to sub-network k that is determined (and stored as a constant-valued parameter) during the design of the decoder. In this example, instead of individual upsampling ratios of the sub-networks including and following the $k^{th}$ subnetwork, the pre-calculated scale ratio ($\text{Scale}_k$) corresponding to the $k^{th}$ sub-network is used in the function.

Figure 8A:
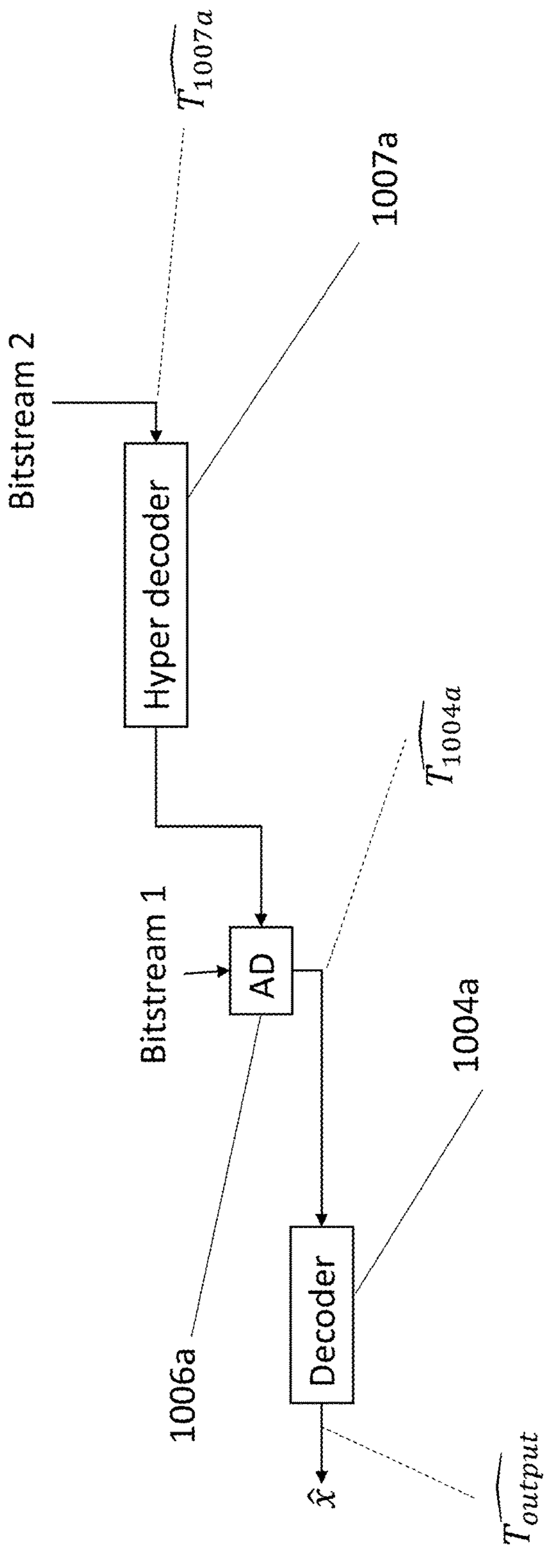
FIG. 8*a* shows a more specific embodiment of the decoder of FIG. 8.

For example in FIG. 8*a*, which may be a more specific example of the decoder shown in FIG. 8, a decoder neural network is depicted that comprises two subnetworks, 1007*a* and 1004*a*. Furthermore, assume that 1007*a* comprises two upsampling layers with upsampling ratios of 2 each and 1004*a* comprises 4 upsampling layers with upsampling ratios of 2 each. The combined upsampling ratio of 1007*a* is equal to 4 (2×2=4) and the combined upsampling ratio of the 1004*a* is equal to 16 (2×2×2×2=16). In this example the target input size at the input of 1007*a* $\widehat{T_{1007a}}$) can be calculated according to the target output size $T_{output}$ (which is equal to the intended size of x) and the scalar factor 64 (16×4=64). The scalar factor 64 here corresponds to the total upsampling ratio of the combined upsampling ratios of the sub-networks 1004*a* and sub-network 1007*a*. In other words the $\text{Scale}_{1007a}$ corresponding to sub-network 1007*a* is equal to 64 in this case. According to this example one can calculate the $\widehat{T_{1007a}}$ which is the target input size of sub-network 1007*a* according to formula: $\widehat{T_{1007a}}=f(T_{output}, \text{Scale}_{1007a})=f(T_{output}, 64)$. Similarly the target input size of sub-network 1004*a* can be calculated according to $\widehat{T_{1004a}}=f(T_{output}, 16)$, where 16 is the $\text{Scale}_{1004a}$ of sub-network 1004*a*.

The target output size $T_{output}$ can be obtained from a bitstream. In the example of FIG. 8*a*, the $T_{output}$ corresponds to the size of the decoded picture, that would be displayed on a viewing device.

The function f( ) may be ceil( ), floor( ), into etc.

Having processed the input or inputs received at the decoder 2400 according to FIG. 22 with the whole neural network, an output can be provided in step 2505 that corresponds to or is the decoded picture.

Figure 24:
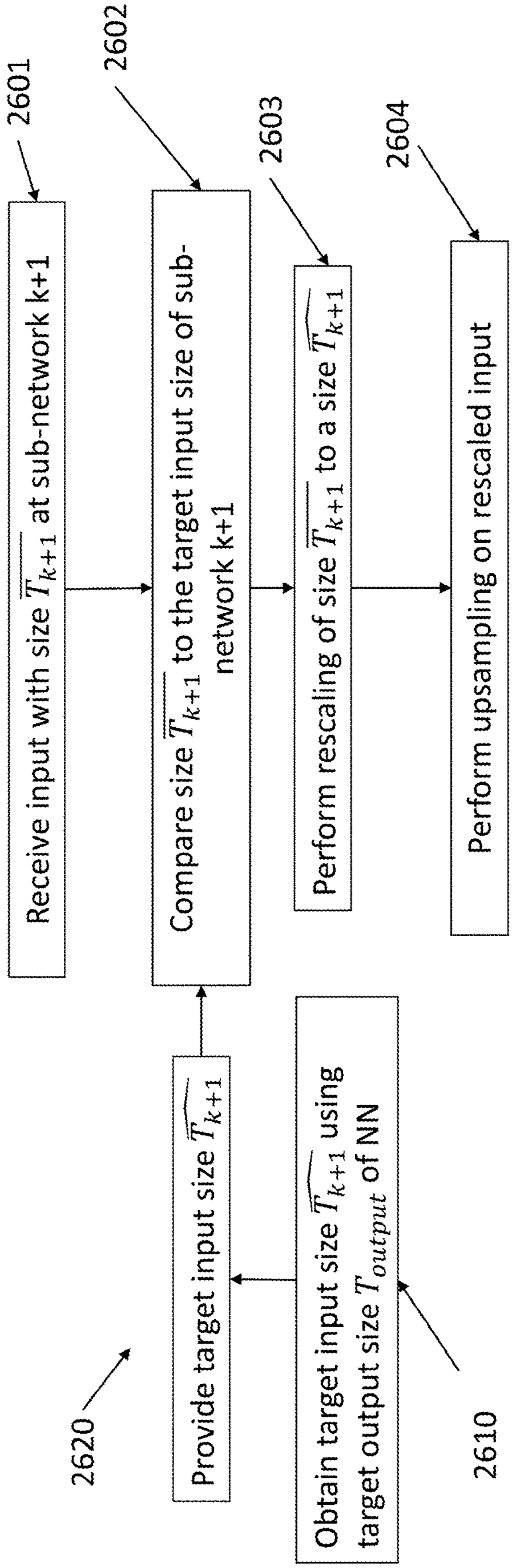
FIG. 24 shows a flow diagram of obtaining a rescaling according to one embodiment.

FIG. 24 provides a further embodiment in line with the present disclosure that indicates how an output of a preceding sub-network k, before being processed by the sub-network k+1, is rescaled.

In this embodiment, additional information provided to the decoder comprises the target output size $T_{output}$ of the neural network where this target output size may be identical to the size of the picture originally encoded in the bitstream.

The method in FIG. 24 begins with receiving 2601 an input with the size $\overline{T_{k+1}}$ as output from a previous sub-network k.

In a next step 2602, this size $\overline{T_{k+1}}$ may be compared to a target input size $\widehat{T_{k+1}}$ for the sub-network k+1. This comparing may comprise calculating a difference between $\overline{T_{k+1}}$ and $\widehat{T_{k+1}}$.

The target input size $\widehat{T_{k+1}}$ may be obtained in line with what was described already above. Specifically, the target input size $\widehat{T_{k+1}}$ may be obtained in step 2610 using the target output size $T_{output}$ of the neural network. The target output size $T_{output}$ of the neural network may be identical to the size of the originally encoded picture. Having obtained the target input size $\widehat{T_{k+1}}$, it may be provided in step 2620 for the use in the comparison in step 2602.

Returning to the comparison step 2602, if it is determined (by, for example, explicitly calculating the difference between $\widehat{T_{k+1}}$ and $\overline{T_{k+1}}$) that $\overline{T_{k+1}}$ is larger than $\widehat{T_{k+1}}$, then a rescaling may be applied so as to reduce the size $\overline{T_{k+1}}$ to the size $\widehat{T_{k+1}}$ in step 2603 as part of performing the rescaling. This reduction in size may comprise a cropping or using interpolation to reduce the number of samples, thereby reducing the size of the input to the sub-network k+1, as was already explained above.

Alternatively, if it is determined that the size $\overline{T_{k+1}}$ is smaller than the size $\widehat{T_{k+1}}$ hat, a rescaling may be applied in step 2603 resulting in an increase of the size $\overline{T_{k+1}}$ to the size $\widehat{T_{k+1}}$.

After that, in step 2604, the upsampling of the input with the size $\widehat{T_{k+1}}$ may be performed with the sub-network k+1, thereby providing, as part of the step 2604, an output that has a size $\overline{T_{k+2}}$. This output may already constitute or correspond to the decoded picture or may be processed by a subsequent sub-network beginning with step 2601 where, now, an input with a size $\overline{T_{k+2}}$ and is to be evaluated against a target input size for the sub-network k+2. This may then encompass repeating all further steps described in relation to FIG. 24.

It is noted that when using an iterative process to obtain the target input sizes by applying, for example $$\widehat{T_k} = \text{ceil}\left(\frac{T_{output}}{\prod_{i,i=k \ldots K} U_i}\right) \text{ or } \widehat{T_k} = \text{floor}\left(\frac{T_{output}}{\prod_{i,i=k \ldots K} U_i}\right)$$

as explained above, the values fo$\widehat{T_k}$ can either be provided as part of the bitstream or can be calculated at the decoder or can be provided for example in a lookup table where the index i of the sub-network that is to process the input may be used to derive the respective value for the product $\Pi_{i,i=k \ldots K} U_i$ (thus not explicitly calculating it for each sub-network) or, if the target output size $T_{output}$ has already a fixed value, even the values for $\widehat{T_k}$ can be taken from a lookup table. In this context, the index k of the sub-network to process the input can be used as indicator to a value in the lookup-table. Additionally or alternatively to the lookup table, the pre-calculated values of the product $\text{Scale}_k = \Pi_{i,i=k \ldots K} U_i$ corresponding to each sub-network k can be defined as constant value. Therefore the operation of obtaining a target size becomes $\widehat{T_k} = f(\text{Scale}_k, T_{output})$, wherein the f( ) may be a floor operation, a ceil operation, a rounding operation or like. The function f( ) for instance might be in the form of f(x,y)=(y+x−1)>>log 2(x). The equation presented here is equivalent to ceil(y/x) when x is a number that is power of 2. In other words when x is an integer number that can be represented as a power of 2, the function (y/x) can be implemented as equivalently (y+x−1)>>log 2(x). As another example the function f(x,y) might be y>>log 2(x). Here, ">>" indicates a downshift operation, also referred to as right shift operation, as explained below.

FIG. 25 shows an embodiment of an encoder 2700 that is adapted to perform any of the above described embodiments for encoding a picture and providing an output for example in the form of a bitstream.

The encoder 2700 may, for this purpose, comprise a receiver 2701 for receiving a picture and potentially any additional information that pertains to how the encoding is to be performed as was already explained above. Furthermore, the encoder 2700 may comprise one or more processors denoted here with 2702 that are configured to implement a neural network wherein the neural network comprises, in the processing order of a picture through the neural network, at least two sub-networks wherein at least one of these sub-networks comprises at least two downsampling layers and the one or more processors are additionally further adapted to encode a picture by using the neural network by performing the following steps:

applying, before processing the input with the at least one sub-network comprising at least two downsampling layers, a rescaling to the input, wherein the rescaling comprises changing a size $S_1$ of the input in the at least one dimension to be $S_1$ so that $S_1$ is in an integer multiple of a combined downsampling ratio $R_1$ of the at least one sub-network process the input by the at least one sub-network comprising at least two downsampling layers and providing an output with a size $S_2$, wherein the size $S_2$ is smaller than $S_1$ providing, after processing the picture using the neural network, a bitstream as output, e.g. as output of the neural network.

Additionally, the encoder may comprise a transmitter 2703 for providing an output like the bitstream and/or an additional bitstream or a plurality of bitstreams as was already discussed above. One of those bitstreams may comprise or represent the encoded picture whereas another bitstream may pertain to additional information as was already discussed above.

Figure 26:
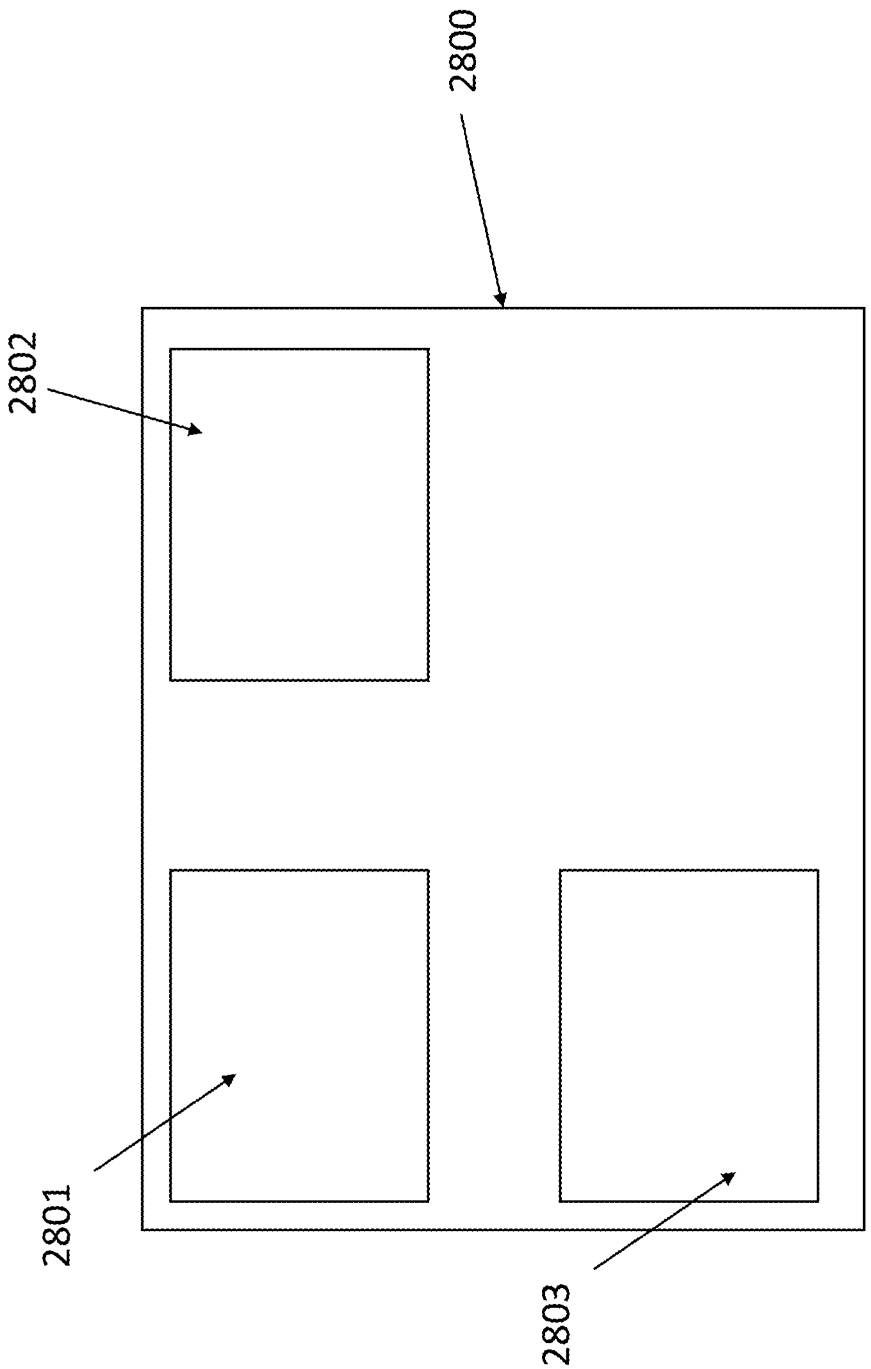
FIG. 26 shows a schematic depiction of a decoder according to one embodiment.

FIG. 26 shows an embodiment of the present disclosure that shows a decoder for decoding a bitstream representing a picture.

The decoder 2800 may, for this purpose, comprise a receiver 2801 for receiving a bitstream representing a picture (specifically representing an encoded picture). Furthermore, the decoder 2800 may comprise one or more processors 2802 that are configured to implement a neural network where this neural network comprises, in the processing order of a bitstream through the neural network, at least two sub-networks. One of these two sub-networks comprises at least two upsampling layers. Furthermore, the processors 2802, by using the neural network, are configured to apply an upsampling to an input representing the matrix (like the bitstream or something put off a preceding sub-network) where the matrix has a size $T_1$ in at least one dimension and the processors and/or the encoder are further configured to decode a bitstream by:

processing the input by a first sub-network of the at least two sub-networks and providing an output of the first sub-network, wherein the output has a size $\overline{T_2}$ that corresponds to the product of the size $T_1$ with $U_1$, wherein $U_1$ is a combined upsampling ratio $U_1$ of the first sub-network;

applying, before processing the output of the first sub-network by the proceeding sub-network in the processing order of the bitstream through the NN, a rescaling to the output of the first sub-network, wherein the rescaling comprises changing the size $T_2$ of the output in the at least one dimension to a size $\hat{T}_2$ in the at least one dimension based on information obtained;

processing the rescaled output by the second sub-network and providing an output of the second sub-network, wherein the output has a size $\overline{T_3}$ that corresponds to the product of $\hat{T}_2$ and $U_2$, wherein $U_2$ is the combined upsampling ratio of the second sub-network;

providing, after processing the bitstream using the NN, a decoded picture as output, e.g. as output of the NN.

Furthermore, the encoder 2800 or an additionally provided transmitter 2803 may be adapted to provide, after processing the bitstream using the neural network, a decoded picture as output of the neural network.

In embodiments of encoding methods or encoders described herein the bitstream output, e.g. output by the NN, may be, for example, the output or bitstream of the last subnetwork or network layer of the NN, e.g. bitstream 2105.

In further embodiments of encoding methods or encoders described herein the bitstream output, e.g. output by the NN, may be, for example, a bitstream formed by or comprising two sub-bitstreams, e.g. sub-bitstreams bitstream1 and bitstream2 (or 2103 and 2105), or more general, a first sub-bitstream and a second sub-bitstream (e.g. each sub-bitstream being generated and/or output by a respective sub-network of the NN). Both sub-bitstreams may be transmitted or stored separately or combined, e.g. multiplexed, as one bitstream.

In even further embodiments of encoding methods or encoders described herein the bitstream output, e.g. output by the NN, may be, for example, a bitstream formed by or comprising more than two sub-bitstreams, e.g. a first sub-bitstream, a second sub-bitstream, a third subbitstream, and optionally further sub-bitstreams (e.g. each sub-bitstream being generated and/or output by a respective sub-network of the NN). The sub-bitstreams may be transmitted or stored separately or combined, e.g. multiplexed, as one bitstream or more than one combined bitstream.

In embodiments of decoding methods or decoders described herein the received bitstream, e.g. received by the NN, may be, for example, used as input of the first subnetwork or network layer of the NN, e.g. bitstream 2401.

In further embodiments of decoding methods or decoders described herein the received bitstream may be, for example, a bitstream formed by or comprising two sub-bitstreams, e.g. sub-bitstreams bitstream1 and bitstream2 (or 2401 and 2403), or more general, a first sub-bitstream and a second sub-bitstream (e.g. each sub-bitstream being received and/or processed by a respective sub-network of the NN). Both sub-bitstreams may be received or stored separately or combined, e.g. multiplexed, as one bitstream, and demultiplexed to obtain the sub-bitstreams.

In even further embodiments of decoding methods or decoders described herein the received bitstream may be, for example, a bitstream formed by or comprising more than two sub-bitstreams, e.g. a first sub-bitstream, a second sub-bitstream, a third subbitstream, and optionally further sub-bitstreams (e.g. each sub-bitstream being received and/or processed by a respective sub-network of the NN). The sub-bitstreams may be received or stored separately or combined, e.g. multiplexed, as one bitstream or more than one combined bitstream, and demultiplexed to obtain the sub-bitstreams.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

+ Addition

− Subtraction (as a two-argument operator) or negation (as a unary prefix operator)

* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators

The following logical operators are defined as follows:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Relational Operators

The following relational operators are defined as follows:

> Greater than

>= Greater than or equal to

< Less than

<= Less than or equal to

== qual to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

– – Decrement, i.e., x– – is equivalent to x=x–1; when used in an array index, evaluates to the value of the variable prior to the decrement operation.

+= Increment by amount specified, i.e., x+=3 is equivalent to x=x+3, and x+=(–3) is equivalent to x=x+(–3).

–= Decrement by amount specified, i.e., x–=3 is equivalent to x=x–3, and x–=(–3) is equivalent to x=x–(–3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x & ; \quad x >= 0 \\ -x & ; \quad x < 0 \end{cases}$$

Asin(x) the trigonometric inverse sine function, operating on an argument x that is in the range of –1.0 to 1.0, inclusive, with an output value in the range of –π÷2 to η÷2, inclusive, in units of radians Atan(x) the trigonometric inverse tangent function, operating on an argument x, with an output value in the range of –π÷2 to π÷2, inclusive, in units of radians $$Atan2(y, x) = \begin{cases} Atan\left(\frac{y}{x}\right) & ; \quad x > 0 \\ Atan\left(\frac{y}{x}\right) + \pi & ; \quad x < 0 \ \&\& \ y >= 0 \\ Atan\left(\frac{y}{x}\right) - \pi & ; \quad x < 0 \ \&\& \ y < 0 \\ +\frac{\pi}{2} & ; \quad x == 0 \ \&\& \ y >= 0 \\ -\frac{\pi}{2} & ; \quad \text{otherwise} \end{cases}$$

Ceil(x) the smallest integer greater than or equal to x.

$$\text{Clip1}_Y(x) = \text{Clip3}(0, (1 \ll BitDepth_Y) - 1, x)$$

$$\text{Clip1}_C(x) = \text{Clip3}(0, (1 \ll BitDepth_C) - 1, x)$$

$$\text{Clip3}(x, y, z) = \begin{cases} x & ; \quad z < x \\ y & ; \quad x > y \\ z & ; \quad \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d & ; \quad b - a >= d/2 \\ c - d & ; \quad a - b > d/2 \\ c & ; \quad \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x & ; \quad x <= y \\ y & ; \quad x > y \end{cases}$$

$$\text{Max}(x, y) = \begin{cases} x & ; \quad x >= y \\ y & ; \quad x < y \end{cases}$$

$$\text{Round}(x) = \text{Sign}(x) * \text{Floor}(\text{Abs}(x) + 0.5)$$

$$\text{Sign}(x) = \begin{cases} 1 & ; \quad x > 0 \\ 0 & ; \quad x == 0 \\ -1 & ; \quad x < 0 \end{cases}$$

Sin(x) the trigonometric sine function operating on an argument x in units of radians Sqrt(x)=$\sqrt{x}$ Swap(x,y)=(y,x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
| --- |
| operations (with operands x, y, and z) |
| "x++", "x− −" |
| "!x", "−x" (as a unary prefix operator) |
| $x^y$ |
| "$x * y$", "$x/y$", "$x \div y$", "$\frac{x}{y}$", "$x \% y$" |
| "x + y", "x − y" (as a two-argument operator), |
| "$\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \| \| y" |
| "x ? y : z" |
| "x..y" |
| "x = y", "x += y", "x −= y" |

Text Description of Logical Operations

In the text, a statement of logical operations as would be described mathematically in the following form:

```
if( condition 0 )
  statement 0
else if( condition 1 )
  statement 1
...
else /* informative remark on remaining condition */
  statement n
```

may be described in the following manner:

. . . as follows / . . . the following applies:

If condition 0, statement 0

Otherwise, if condition 1, statement 1

. . .

Otherwise (informative remark on remaining condition), statement n

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
  statement 0
else if( condition 1a | | condition 1b )
  statement 1
...
else
  statement n
```

may be described in the following manner:

. . . as follows / . . . the following applies:

If all of the following conditions are true, statement 0:

condition 0a condition 0b

Otherwise, if one or more of the following conditions are true, statement 1:

condition 1a condition 1b

. . .

Otherwise, statement n

In the text, a statement of logical operations as would be described mathematically in the following form:

if(condition 0)

statement 0 if(condition 1)

statement 1 may be described in the following manner:

When condition 0, statement 0

When condition 1, statement 1

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304. In general, the embodiments of the present disclosure may be also applied to other source signals such as an audio signal or the like.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method for encoding a picture using a neural network (NN) wherein the NN comprises at least two sub-networks, wherein at least one subnetwork of the at least two sub-networks comprises at least two downsampling layers, wherein the at least one sub-network applies a downsampling to an input representing a matrix having a size $S_1$ in at least one dimension, the method comprising:

applying, before processing the input with the at least one sub-network comprising at least two downsampling layers, a rescaling to the input, wherein the rescaling comprises changing the size $S_1$ in the at least one dimension to be $\overline{S_1}$ so that $\overline{S_1}$ is an integer multiple of a combined downsampling ratio $R_k$ of the at least one sub-network;

after the rescaling, processing the input by the at least one sub-network comprising at least two downsampling layers and providing an output with the size $S_2$, wherein $S_2$ is smaller than $S_1$; and providing, after processing the picture using the NN, a bitstream as output, wherein the NN comprises a number of $K \in \mathbb{N}$ sub-networks k, $k \le K$, $k \in \mathbb{N}$, that each comprise at least two downsampling layers, wherein the method further comprises:

before processing an input representing a matrix having a size $S_k$ in at least one dimension with a sub-network k, applying, based on determining that the size $S_k$ is not an integer multiple of the combined downsampling ratio $R_k$ of the sub-network, a rescaling to the input, wherein the rescaling comprises changing the size $S_k$ in the at least one dimension so that $\overline{S_k} = nR_k$, $n \in \mathbb{N}$; or wherein, before applying the rescaling to the input with the size $S_k$, a determination is made whether $S_k$ is an integer multiple of the combined downsampling ratio $R_k$ of the sub-network k, and, based on determining that $S_k$ is not an integer multiple of the combined downsampling ratio $R_k$ of the sub-network k, the rescaling is applied to the input so that the size $S_k$ is changed in the at least one dimension so that $\overline{S_k} = n \cdot R_k$, $n \in \mathbb{N}$.

2. The method according to claim 1, wherein the size $\overline{S_k}$ is determined using a function comprising at least one of ceil, int, floor.

3. The method according to claim 2, wherein:

the size $\overline{S_k}$ is determined using $$\text{floor}\left(\frac{S_k}{R_k}\right) \cdot R_k = \overline{S_k};$$

or the size $\overline{S_k}$ is determined using $$\text{ceil}\left(\frac{S_k}{R_k}\right) \cdot R_k = \overline{S_k};$$

or the size $\overline{S_k}$ is determined using $$\text{int}\left(\frac{S_k}{R_k}\right) \cdot R_k = \overline{S_k};$$

or, the size $\overline{S_k}$ is determined using $$\text{int}\left(\frac{S_k + R_k - 1}{R_k}\right) \cdot R_k = \overline{S_k}.$$

4. The method according to claim 1, wherein the input to a sub-network k has a size $S_k$ in the at least one dimension that has a value that is between a closest smaller integer multiple of the combined downsampling ratio $R_k$ of the sub-network k and a closest larger integer multiple of the combined downsampling ratio $R_k$ of the sub-network k and wherein, depending on a condition, the size $S_k$ of the input is changed during the rescaling to either match the closest smaller integer multiple of the combined downsampling ratio $R_k$ or to match the closest larger integer multiple of the combined downsampling ratio $R_k$.

5. The method according to claim 1, wherein the input to a sub-network k has a size $S_k$ in the at least one dimension that has a value that is not an integer multiple of the combined downsampling ratio $R_k$ of the sub-network k, wherein the size $S_k$ of the input is changed during the rescaling to either match the closest smaller integer multiple of the combined downsampling ratio $R_k$ or to match the closest larger integer multiple of the combined downsampling ratio $R_k$.

6. The method according to claim 1, wherein, based on determining that the size $S_k$ of the input to the sub-network k is closer to the closest larger integer multiple of the combined downsampling ratio $R_k$ of the sub-network k than to the closest smaller integer multiple of the combined downsampling ratio $R_k$, the size $S_k$ of the input is increased to a size $\overline{S_k}$ that matches the closest larger integer multiple of the combined downsampling ratio $R_k$, wherein increasing the size $S_k$ of the input to the size $\overline{S_k}$ comprises padding the input with the size $S_k$ with zeros or with padding information obtained from the input with the size.

7. The method according to claim 6, wherein the padding information obtained from the input with the size $S_k$ is applied as redundant padding information to increase the size $S_k$ of the input to the size $\overline{S_k}$, and wherein the padding with redundant padding information comprises at least one of reflection padding and repetition padding.

8. A method for decoding a bitstream representing a picture using a neural network (NN) wherein the NN comprises at least two sub-networks, wherein at least one sub-network of the at least two sub-networks comprises at least two upsampling layers, wherein the at least one sub-network applies an upsampling to an input representing a matrix having a size $T_1$ in at least one dimension, the method comprising:

processing the input by a first sub-network of the at least two sub-networks and providing an output of the first sub-network, wherein the output has a size $\overline{T_2}$ that corresponds to the product of the size $T_1$ with $U_1$, wherein $U_1$ is a combined upsampling ratio $U_1$ of the first sub-network;

applying before processing the output of the first sub-network by the proceeding sub-network in the processing order of the bitstream through the NN, a rescaling to the output of the first sub-network, wherein the rescaling comprises changing the size $\overline{T_2}$ of the output in the at least one dimension to a size $\hat{T}_2$ in the at least one dimension based on information obtained;

processing the rescaled output by the second sub-network and providing an output of the second sub-network, wherein the output has a size $\overline{T_3}$ that corresponds to the product of $\hat{T}_2$ and $U_2$, wherein $U_2$ is the combined upsampling ratio of the second sub-network;

providing, after processing the bitstream using the NN, a decoded picture as output, wherein at least one upsampling layer of at least one sub-network comprises a transposed convolution or convolution layer.

9. The method according claim 8, wherein the information comprises at least one of a target size of the decoded picture comprising at least one of a height H of the decoded picture and a width W of the decoded picture, the combined upsampling ratio $U_1$, the combined upsampling ratio $U_2$, at least one upsampling ratio um of an upsampling layer of the first sub-network, at least one upsampling ratio $u_{2m}$ of an upsampling layer of the second sub-network, a target output size $\hat{T}_3$ of the second sub-network, the size $\hat{T}_2$.

10. The method according to claim 8, wherein the information is obtained from at least one of: the bitstream, a second bitstream, information available at a decoder.

11. The method according to claim 10, wherein $$\hat{T}_2 = \text{ceil}\left(\frac{T_{output}}{U^N}\right),$$

wherein $T_{output}$ is the target size of the output of the NN and U is a combined upsampling ratio.

12. The method according to claim 8, wherein the method further comprises determining whether $\overline{T_2}$ is larger than $\hat{T}_2$ or whether $\overline{T_2}$ is smaller than $\hat{T}_2$; and wherein:

based on determining that $\overline{T_2}$ is larger than $\hat{T}_2$, the rescaling comprises applying a cropping to the output with the size $\overline{T_2}$ such that the size $\overline{T_2}$ is reduced to the size $\hat{T}_2$; and based on determining that $\overline{T_2}$ is smaller than $\hat{T}_2$, the rescaling comprises applying a padding to the output with the size $\overline{T_2}$ such that the size $\overline{T_2}$ is increased to the size $\hat{T}_2$, wherein the padding comprises padding the output with the size $\overline{T_2}$ with zeros or with padding information obtained from the output with the size $\overline{T_2}$ and wherein the padding comprises reflection padding or repetition padding.

13. The method according to claim 1, wherein the NN comprises, in the processing order of the bitstream through the NN, a further unit that applies a transformation to the input that does not change the size of the input in the at least one dimension, wherein the method comprises applying the rescaling after the processing of the input by the further unit and before processing the input by the following sub-network of the NN, based on determining that the rescaling results in an increase of the size of the input in the at least one dimension, and/or wherein the method comprises applying the rescaling before the processing of the input by the further unit, based on determining that the rescaling comprises a decrease of the size of the input in the at least one dimension, and wherein the further unit is or comprises a batch normalizer and/or a rectified linear unit, ReLU.

14. An encoder for encoding a picture, wherein the encoder comprises one or more processors for implementing a neural network (NN), wherein the one or more processors are adapted to perform a method according to claim 1.

15. A decoder for decoding a bitstream representing a picture, wherein the decoder comprises one or more processors for implementing a neural network (NN), wherein the one or more processors are adapted to perform a method according to claim 8.

* * * * *